US012691808B2

(12) United States Patent
Wickramasekera

(10) Patent No.: US 12,691,808 B2
(45) Date of Patent: Jul. 28, 2026

(54) VERTICALLY AND HORIZONTALLY TELESCOPING TRUCK CAMPER

(71) Applicant: Outlier Campers LLC, Cambridge, MA (US)

(72) Inventor: Ananda Wickramasekera, Cambridge, MA (US)

(73) Assignee: Outlier Campers LLC, Cambridge, MA (US)

( * ) Notice: Subject to any disclaimer, the term of this patent is extended or adjusted under 35 U.S.C. 154(b) by 229 days.

(21) Appl. No.: 18/771,525

(22) Filed: Jul. 12, 2024

(65) Prior Publication Data

US 2025/0065794 A1     Feb. 27, 2025

Related U.S. Application Data

(60) Provisional application No. 63/534,451, filed on Aug. 24, 2023.

(51) Int. Cl.
*B60P 3/34* (2006.01)
(52) U.S. Cl.
CPC ..................................... *B60P 3/34* (2013.01)
(58) Field of Classification Search
CPC .......................................................... B60P 3/34
See application file for complete search history.

(56) References Cited

U.S. PATENT DOCUMENTS 3,363,932 A * 1/1968 Mann ........................ B60P 3/34
296/26.05
5,788,319 A * 8/1998 Pruitt ...................... B60P 3/341
296/173

(Continued)

FOREIGN PATENT DOCUMENTS

CN       106274634       1/2017
CN       111959381       11/2020
(Continued)

OTHER PUBLICATIONS

Alaskan Camper, LLC, "Telescopic Truck Campers Website," Retrieved online: https://www.alaskancampers.com/, Jan. 9, 2023, 1-7 pages.
(Continued)

*Primary Examiner* — Lori Lyjak

(74) *Attorney, Agent, or Firm* — SOLID STATE LAW FIRM PLLC

(57) ABSTRACT

A truck camper comprising a top section, a bottom section, and a middle section, where the bottom section is configured to be vertically retracted into or extended from the top section and attached to a bed or frame of a truck. The middle section is configured to be horizontally retracted into or extended from the top section. In a fully expanded configuration, both the bottom and middle sections are extended from the top section, providing an enlarged camping space. In a fully collapsed configuration, both sections are retracted into the top section, making the camper compact for transportation and storage. The top section includes side walls, a rear wall, and a roof, while the bottom and middle sections can include additional walls and openings to form an enclosed space. The camper also features configurations such as a cab-over portion, track systems for extension and retraction, and attachments to ensure secure mounting to the truck. The modular and flexible design allows for easy expansion and contraction, catering to various camping needs and optimizing the use of space.

19 Claims, 36 Drawing Sheets

(56) References Cited

U.S. PATENT DOCUMENTS

| | | | |
|---|---|---|---|
| 6,017,080 | A | 1/2000 | Gill |
| 7,328,927 | B1 | 2/2008 | Crean |
| 11,584,289 | B2 | 2/2023 | Lee |
| 2008/0084089 | A1 | 4/2008 | Hanson |
| 2022/0162879 | A1 | 5/2022 | Davis et al. |

FOREIGN PATENT DOCUMENTS

| | | |
|---|---|---|
| CN | 214835282 | 11/2021 |
| CN | 216331701 | 4/2022 |
| EP | 3747696 | 12/2020 |
| FR | 2859955 | 3/2005 |
| KR | 200465681 | 3/2013 |
| KR | 102358082 | 2/2022 |
| WO | 2014115181 | 7/2014 |

OTHER PUBLICATIONS

Lance Camper MFG Corp., "Lance 1062 Truck Camper," Retrieved online: https://www.lancecamper.com/truck-campers/1062/, Jan. 9, 2023, 1-5 pages.
Host Industries, Inc., "Cascade 10'6," Retrieved online: https://www.hostcampers.com/product-details-cascade/, Jan. 9, 2023, 1-10 pages.
Cube Series, "Ultra-Lightweight Camper Design—QB Camper Cube Series," Retrieved online: https://cubeseries.com/camper/, Jan. 9, 2023, 1-6 pages.

* cited by examiner

VERTICALLY AND HORIZONTALLY TELESCOPING TRUCK CAMPER

CROSS-REFERENCE TO RELATED APPLICATION

This application claims the benefit of U.S. Provisional Patent Application No. 63/534,451, filed in the United States Patent and Trademark Office on Aug. 24, 2023, the entire contents of which are incorporated herein by reference.

BACKGROUND

Technical Field

The present disclosure relates to truck campers, and more particularly to a truck camper with multiple sections that are configurable to extend or retract to provide a flexible and expandable camping space. This invention pertains to truck campers that include a top section, a bottom section, and a middle section, where the bottom section can be vertically extended or retracted and the middle section can be horizontally extended or retracted. The design of the truck camper allows it to be fully expanded to maximize living space or fully collapsed to facilitate transportation and storage. Additionally, the disclosure covers configurations and structural components of the truck camper, such as walls, openings, and tracks for retraction and extension, ensuring the flexibility and functionality of the camper.

Background

Existing expanding, pop-up, or telescoping truck caps, truck canopies, truck toppers, camper shells, slide-in truck campers, flatbed truck campers, or chassis-cab truck campers that extend over the cab of a truck, maintain a lower profile or height when not in use or while in transit, and can expand to create additional interior height for use as a camper are referred to herein as "existing pop-up cab-over truck campers." These existing pop-up cab-over truck campers can extend upward to provide sufficient headroom in the portion over a truck cab for sleeping and/or to provide sufficient headroom in the portion behind the cab or in the bed area, referred to herein as the bed portion, of a truck to stand up or move about yet can maintain a lower profile or height when not in use or while in transit.

A low profile may be beneficial for better aerodynamics and fuel efficiency and may help to maintain a lower overall height of the vehicle with a camper of this type, which may be necessary to drive on certain roads and/or to fit under or into certain structures. Fixed height cab-over truck campers are often either substantially tall, preventing them from being driven on certain roads, do not fit under or into certain structures like garages, and may create more aerodynamic drag. Or they're shorter in height but do not provide much headroom over the cab-over portion; In some cases that height may be just enough to crawl onto a mattress in that portion and sleep but not to sit up comfortably.

Existing pop-up cab-over truck campers may be capable of expanding vertically for use, providing headroom above the mattress (which is often in the cab-over portion) sufficient for sleeping, and in some cases sitting up, by having collapsible or foldable side walls that may be expanded or unfolded, or sections of side walls that may be nested within other sections and capable of "telescoping" upward. Existing pop-up truck campers with expandable sections that are comprised partially or fully of soft, fabric, collapsible or foldable tent-like material may not provide the same level of weather protection, security, and comfort as campers with hard sides.

The soft material may flap around noisily in the wind, may not provide adequate insulation from cold or warm weather; may be easily cut, opened, or otherwise penetrated by human intruders or animals; and may not be comfortable or strong enough to lean against (e.g., to sit up and lean against as a person might use a headboard on a bed for). Existing pop-up cab-over truck campers with expandable sections that are comprised of hard-sided, foldable wall panels may provide better protection from the elements and provide better security from human intruders and animals as compared with existing soft-sided cab-over truck campers, however, they may require numerous joints between rigid panel sections, such as vertical, corner joints between two side panels or horizontal joints between horizontally bi-folding or multi-folding panels as well as between the section above and/or below the expandable side wall section.

Numerous joints require complex sealing against water and insects; and folding walls may require hinges which may add additional weight, cost, and complexity, and/or may require additional motors and/or manual labor to fold and unfold them. Openings across or spanning foldable, rigid wall sections (e.g., if a single section is not sufficiently tall and/or wide enough for an opening such as a door or window) may add further complexity and weight with additional seals and hinges.

Existing telescoping cab-over truck campers (i.e., pop-up cab-over truck campers with nested, hard-sided sections that can "telescope" to extend the camper's overall height and retract to lower the camper's overall height) may provide: better security and protection from weather as compared with existing soft-sided truck campers; better or less complex sealing against water and insects; and may require fewer motors and/or less manual labor to fold and unfold walls as compared with existing pop-up cab-over truck campers with foldable hard sides however, the expanded height of each nested section is limited by the height of the section below it, so that no separation may exist between the two sections.

For example, if a lower, nested section is only 12 inches tall, give or take a few inches, the upper or overlapping section may only be able to extend vertically by less than that height (i.e., less than 12 inches, give or take a few inches) so that it does not separate (completely) from the lower, nested section, creating an unsealed gap between sections. If there are only two sections, the extended height may only be roughly double the height or less of a single section. In some cases, that may not provide enough headroom to either sit up comfortably on a mattress in the cab-over portion of the camper or stand up comfortably in the bed portion of the camper when it is extended for use if the nested sections should be sufficiently short for the camper to have a low profile when not in use or while in transit.

If the sections are tall, then the camper may not have a sufficiently or desirably low enough profile when not in use or while in transit. An existing telescoping cab-over truck camper that may have a sufficiently or desirably low enough profile when not in use or during transit yet may extend enough to provide sufficient interior headroom while in use (e.g., to sit on a mattress in the cab-over portion and/or stand up in the bed portion) may achieve this by having multiple (e.g., more than two) shorter, nested sections.

However, this has additional disadvantages. Each nested section will decrease interior volume because each section will have to fit into the section above (or in some cases, below) it so the nested sections will get progressively smaller and, depending on wall thickness, that may substantially reduce space inside, or the sections can be made wider but that my substantially increase the overall width of the camper. Furthermore, any door or window openings may span two or more nested sections if each nested section is not tall enough to alone contain an opening; This may require additional complex sealing and hinges because the doors and windows may not be relatively flat as they typically are in solid, flat walls, and instead may have a staggered configuration (e.g., a door or window with one portion that fits into one nested section and another portion that fits into another nested section to create an opening that is taller than a single nested section may not be in the same plane or the multiple, divided portions of the door or window may not be flush with each other).

The vertically and horizontally telescoping truck camper provided herein may overcome some of the disadvantages of existing pop-up truck campers described above by being able to telescope in two axes. With the ability to telescope upward and outward to expand it for use as a camper, or retract it inward and downward to collapse it for storage or while in transit, the vertically and horizontally telescoping truck camper can store a portion of its taller side walls in the portion of the camper that sits in or over a truck bed or behind a truck cab (i.e., the bed portion), which may provide more height to store taller, non-foldable walls, rather than in the portion of the camper that sits over a truck cab (i.e., the cab-over portion), which may need to be relatively short to provide an overall lower profile for the collapsed camper. This configuration may allow the vertically and horizontally telescoping truck camper to have a relatively low profile which may be beneficial for better aerodynamics, fuel efficiency, and better handling; help meet maximum height limits on certain roads; or allow the vehicle to fit into or under certain structures such as garages, overpasses, or other structures, when closed or collapsed. And this configuration may enable the vertically and horizontally telescoping truck camper to open or expand to provide sufficient headroom for sleeping, sitting, and/or possibly standing (e.g., on a mattress in the camper) in the shortest portion of the camper which may be the portion over the cab of a truck (i.e., the cab-over portion) and provide sufficient headroom for sleeping, sitting, and/or standing in the portion over the bed or behind the cab of a truck (i.e., the bed portion) when positioned for use as a camper, without the disadvantages of having soft-sided walls, hard-sided foldable walls, short telescoping sections, or numerous telescoping sections as described above. The vertically and horizontally telescoping truck camper provided herein is comprised of three main sections, a fixed bottom section, a vertically (i.e., upward and downward) and horizontally (i.e., outward and inward) telescoping middle section, and a vertically telescoping top section. The fixed bottom section may be the section that is attached to, above, or over a pickup bed or bedsides, a flatbed, or directly to the chassis of a truck (i.e., the bed portion) and may extend above or over the cab of a truck (i.e., the cab-over portion). Like with many existing truck campers, it may be shorter in the portion over a truck cab and taller in the portion behind the cab or in the bed area of the truck (i.e., the top edge of both portions may be at the same height or roughly the same height and may be continuous across both portions however, a truck's cab typically sits higher than its bed or bedsides, flatbed, or chassis, depending on the truck configuration, so the bottom portions of the bottom section may be at different heights).

It may nest within a top section of the camper when it is in a stored configuration yet may sit below a middle section when the camper is expanded for use. A middle section that is a side wall section that is three-sided, vertical, continuous or non-folding (i.e., does not have any hinged or openable horizontal or vertical joints between the three sides), may nest within the portion of the bottom section that lies over or in the truck bed area (i.e., the bed portion) when stored yet may sit over the portion of the bottom section that lies over the truck cab (i.e., cab-over portion) when expanded for use. It may be attached to a top section so that it may move vertically as the top section moves and may move horizontally along guides in the top section without any further movement of the top section.

The middle section may provide the extended vertical wall height needed to expand the camper, particularly in the sleeping area which may be the portion over the cab of a truck (i.e., cab-over portion). A top section may overlap the bottom section above both the portions that are over the cab and over the bed area of a truck (i.e., the cab-over and bed portions) when the camper is in a stored configuration (i.e., the bottom section is nested within the top section) and may be capable of moving vertically to expand the camper for use. The top section may be attached to the middle section and may cause it to rise and lower with the top section as the top section moves vertically.

It may also contain guides that may allow the middle section to move horizontally (i.e., outward or inward) to complete expansion of the camper for use or to facilitate closing or collapsing of the camper for storage or while the vehicle it is attached to is in transit.

To expand the vertically and horizontally telescoping truck camper for use, the top section may partially separate and telescope vertically (i.e., upward) from the bottom section (i.e., it may separate fully at the portion over a truck cab yet may remain overlapped over the portion in the bed area because the cab-over portion has a shorter vertical height than the bed portion, allowing the top section to move vertically without fully separating from the portion of the bottom section over the bed or behind the cab, but fully separating from the portion of the bottom section over the cab).

After the top section has extended fully, the middle section, may telescope horizontally (i.e., outward) from a position above the truck bed or behind the cab (i.e., bed portion) to a position over the bottom section that lies above a truck cab (i.e. cab-over portion).

Once the middle section has fully extended outward, over the cab of a truck, the top section, together with the middle section, may lower slightly to connect with the bottom section, forming a tight seal with it.

In this expanded configuration, in the portion over the cab of the truck, the top section may overlap the joint between it and the middle section, and the middle section may overlap the joint between it and the bottom section, and in the portion behind the cab or over the bed or over the chassis of the truck, the top section may continue to overlap the joint between it and the bottom section, such that all horizontal joints may be overlapped and therefore may be well protected against falling water (e.g., rainwater), other weather, and insects, with or without additional sealing.

Because all or a majority of the middle section, in its stored configuration, may nest in the taller portion of the bottom section which sits in or over a truck bed or behind a truck cab (i.e., bed portion) rather than in the shorter portion which sits above the truck cab (i.e., cab-over portion), it may be substantially taller than nested portions of existing pop-up truck campers with portions that lie above the cab of a truck (i.e., cab-over portions), have a low-profile for storage or transit, and can be expanded for use.

As a result, the vertically and horizontally telescoping truck camper can provide substantial headroom that may be sufficient for sleeping, sitting, and/or possibly standing on a mattress in the portion above the cab (i.e., cab-over portion) of the truck as well as for sleeping, sitting, and/or standing in the truck bed portion or portion behind the cab (i.e., bed portion) of the camper.

Because the middle section is comprised of a three-sided, continuous wall (i.e., with no foldable or separable sections) that remains vertical, it may require less complex horizontal or vertical sealing and may not require any additional motors, manual labor, or complexity to lift, fold, and/or unfold the walls.

Other features of the vertically and horizontally telescoping truck camper may include: a middle section that takes up little cargo space in or above the bed area (or behind the cab) of a truck, except for the thickness of its vertical walls, which may not greatly limit the cargo carrying capacity of a truck bed; access to the bed portion of a truck (or interior of the camper) may be through openable doors and windows that are in alignment across portions of the top, middle, and/or bottom sections that are nested when in a stored configuration; the ability to maintain a clear rear view for a driver through an optional front window in the front facing portion of the middle section; the ability to add a floor section to the bottom section, which may otherwise be open below, to create a fully enclosed camper that may sit inside a truck bed or on or over a pickup bed without interfering with the normal use of the cargo area below; the ability to add a section to the bottom section that can be mounted to a truck with a flat bed, tray, or directly to a truck chassis; and/or the ability to add an adaptor to account for small variations in actual pickup bed lengths, widths, shapes, and/or other features between various makes, models, and years of pickups for pickups of certain nominal or categori-cal bed lengths (e.g., variations in "3.5 foot," "4 foot," "4.5 foot," "5 foot," "5.5 foot," "6 foot," "6.5 foot," "7 foot," "8 foot," or other nominal lengths of "compact," "mid-size," or "full-size" pickups).

The vertically and horizontally telescoping truck camper described herein may have a low-profile when not in use as a camper or during transit but may offer a substantial amount of headroom when expanded for use without the need for foldable walls, offering advantages over existing pop-up cab-over truck campers that expand by use of: foldable or collapsible soft-sided walls that may not offer good weather protection, security, or comfort; foldable or collapsible hard-sided walls that may require numerous or complex seals and/or additional motors or manual labor to fold/unfold the walls; short, vertically telescoping hard-sided sections that may offer limited expanded height; or numerous telescoping hard-sided sections that may result in limited interior vol-ume or complicated openings that span multiple sections.

SUMMARY

Described herein is a telescoping truck camper that may extend or expand both vertically and horizontally for use as a camper, has a lower height when not in use a camper or during transit, and is modular with various attachments for various installation types and purposes. Some existing truck caps, truck toppers, truck canopies, camper shells, slide-in truck campers, flatbed campers (i.e., those that attach to a flatbed truck), or chassis-cab campers (i.e., those that attach directly to a truck chassis) that fully or partially extend over the cab of a pickup, herein referred to as "existing cab-over truck campers," may be expandable, foldable, or telescoping such that they have a lower height when not in use as a camper or while in transit; and may expand, unfold, or telescope vertically so that they provide sufficient headroom for sleeping in the portion above a truck cab or for sitting or standing in the portion behind the cab of a truck, or the bed portion.

These campers can expand or collapse by having collaps-ible or foldable walls or by having nested sections that may telescope (e.g., a lower section that nests within an upper section). Those with foldable walls either have walls made of soft, tent-like material that collapses or folds; however, they may not be very secure or offer good weather protec-tion. Or they may have rigid foldable panels but require complex sealing at numerous horizontal and/or vertical joints.

Those existing cab-over truck campers that may be capable of telescoping (e.g., by having nested sections) typically have rigid walls and offer good weather sealing; however, the height a section may extend vertically is limited by the height of the section below it (i.e., so that a portion of the upper section continues to overlap a portion of the lower section to maintain a seal), and in the case of that portion over a truck cab, the height may be very low. Multiple nested sections may be required to achieve a sufficient interior height for more comfortable use, however, numerous nested sections may significantly reduce the inte-rior width (i.e., because each lower section must be smaller than the section it nests inside) and may require openings to span more than one nested section (e.g., if a single section isn't sufficiently tall enough to contain an opening such as a window or door).

The telescoping truck camper invention described herein, which may telescope or expand along two axes (i.e., verti-cally and horizontally), may be able to expand for use as a camper without the need for collapsible or foldable soft or rigid walls, thereby offering better weather protection and security, and the extended height may not be limited by the closed or collapsed height of the lower portion over the truck cab, which may be the shortest portion.

The telescoping truck camper described herein may have a section that may be stored in a taller portion of the camper (e.g., in a portion of the camper in, on, or over a bed or bare frame of a truck, behind its cab) that may extend upward and outward into a shorter portion of the camper (e.g., the portion above the cab of a truck) to expand the camper for use. This configuration may allow this movable section, which may move vertically and horizontally, to be tall without being foldable, thereby making the interior height of the camper comfortable enough for sleeping, sitting, and possibly standing in the cab-over portion of the camper as well as for sleeping, sitting, and standing in the bed portion of the camper when the camper is expanded for use, and sufficiently or desirably short enough when the camper is in a collapsed position for storage or transit, without the need for foldable walls.

The vertically and horizontally telescoping truck camper provided herein may be come in various lengths and widths to fit various categories of trucks (i.e., compact, mid-size, full-size, or other categories) and nominal pickup bed lengths within each category of truck (i.e., 8-foot, 7-foot, 6.5-foot, 6-foot, 5.5-foot, 5-foot, 4.5-foot, 4-foot, 3.5-foot, or other nominal lengths commonly available from truck manufacturers). It may be designed to specifically fit various makes, models, and years of pickup; or it may come in some standard widths and lengths to match the various categories of trucks and nominal pickup bed lengths mentioned above but attached by an adaptor that fits specific makes, models, and years of pickup (i.e., nominal bed lengths of 8 feet, 7 feet, 6.5 feet, 6 feet, 5.5 feet, 5 feet, 4.5 feet, 4 feet, 3.5 feet, or other nominal sizes within each category of truck, such as compact, mid-size, and full-size may have slight variations in bed dimensions between brands of pickup truck manufacturers, models from the same manufacturer, or different years of the same model).

For example, a version of the vertically and horizontally telescoping truck camper may have a length and width that fits most mid-size pickup trucks with a 5-foot nominal bed length, a common nominal bed length found in this category of pickups. The portions of a camper that are on or above the bedsides of a pickup may be slightly wider and longer in that portion of the camper than most mid-size pickup beds with a 5-foot nominal bed length but may fit the actual dimensions of each make, model, and year of this type and size of pickup by use of an optional adapter attachment which may be designed to precisely fit onto, into, or attach to each specific make, model, and year of mid-size pickup with a 5-foot nominal bed length.

Similarly, a version of the vertically and horizontally telescoping truck camper may have a width the same as or like a version made for mid-size pickups with a 5-foot nominal bed length, except it may be 12 inches or more or less longer to fit versions of mid-size pickups with a 6-foot nominal bed length. Mid-size pickups with either 5-foot or 6-foot nominal bed lengths are a common size of pickups.

Similarly, versions of the vertically and horizontally telescoping truck camper may have a single width that fits most full-size pickups with various lengths that fit full-size pickups with 5.5-foot, 6.5-foot, or 8-foot nominal bed lengths, which are common nominal lengths for full-size pickup beds. And similarly, versions of the vertically and horizontally telescoping truck camper may have a single width that fits most compact pickups with lengths that fit 4-foot, 4.5-foot, or 5-foot nominal bed lengths, which may be common nominal sizes for compact pickup beds.

The vertically and horizontally telescoping truck camper may additionally be attachable to other attachments that allow slide-in mounting onto or into a pickup bed, in which case the exact dimensions of the bed be may not be as crucial as long as the bottom of the camper fits in the bed; may allow mounting to a flatbed truck, in which case the exact dimensions of the bed may not be as crucial as long as it can sufficiently support the camper; and may allow mounting directly to the frame of a chassis-cab truck; The vertically and horizontally telescoping truck camper may also be attached to a floor attachment or other attachments that fully enclose the camper and separate its living area from that of the truck it may be mounted to.

The vertically and horizontally telescoping truck camper is comprised of three main sections: a bottom section, a middle section, and a top section. The first section may be a bottom section that may extend over the cab of a truck and may: attach directly to a pickup bed, attach to an adaptor attachment that attaches to a pickup bed, attach to a floor attachment that attaches to a pickup bed; attach to a flatbed (by use of an attachment); or attach to a truck chassis (by use of an attachment).

The bottom section may be comprised of a lower portion which sits in, on, or over a bed area of a truck or behind a truck cab (i.e., the bed portion) and is either fastened directly to the bed, bedsides, or truck frame or is fastened to: an adaptor to accommodate variances in bed dimensions within the same category and nominal bed length of pickup bed as mentioned above; or a floor attachment that may enclose the camper and may be used to attach it to the truck.

The bottom section may be further comprised of an upper portion which may extend over the cab (i.e., the cab-over portion) of a truck, without touching or being fixed to the cab. This is similar in configuration to many existing cab-over truck campers because the beds of pickup trucks, flatbeds of flatbed trucks, or rear portion of the frame of chassis-cab trucks (i.e., pickup, flatbed, and chassis-cab trucks built on a ladder-type frame as opposed to a unibody frame found in some trucks) may be independent of the trucks cabs and may therefore flex independently of the cabs while in motion, so anything attached to a truck bed or frame behind the cab that also extends over the cab, may usually not be attached to both the cab and the truck bed or frame behind the cab at the same time otherwise it may end up twisting and breaking as the rear of the truck moves independently of the cab.

Alternatively, the vertically and horizontally telescoping truck camper designed for use with unibody pickup trucks (or those with a bed that is not independent of the cab or with a bed that may not flex independently of the cab), may have a bottom section that may be attached to the cab or cab roof rack as well as the bed. The upper portion of the bottom section, that may lie above a truck cab (i.e., the cab-over portion), may contain a mattress and may be used as a sleeping area, when the camper is expanded for use.

Depending on the available space in that upper portion of the bottom section (i.e., the cab-over portion), the mattress, pillows, other bedding, or other items may remain in that section when the camper is collapsed for storage or while in transit. Like the bottom sections of many existing cab-over truck campers, the bottom section of the vertically and horizontally telescoping truck camper may be shorter in the portion above a truck cab (i.e., the cab-over portion) and taller in the portion above or in or on a truck bed or on the frame of a truck behind the cab (i.e., the bed portion) (i.e., the top edge of both portions of the bottom section may be at the same height or roughly the same height and may be continuous across both portions, however, a truck's cab typically sits higher than its bed, bedsides, or frame behind the cab so the bottom of both portions of the bottom section may be at different heights).

It or a portion of it may nest within a top section of the camper when it is in a stored configuration yet may sit below a middle section, as described below, when the camper is expanded for use. A portion of the bottom section which sits in, on, or above a pickup bed (i.e., the bed portion) may be open at the bottom and may attach directly to a pickup's bed, or bedsides, or may attach to an adaptor attachment that may adapt it for attachment to specific makes, models, and years of pickup trucks (as mentioned above).

In this configuration, except for providing a cover for the pickup bed, as many truck caps, toppers, canopies, and camper shells do, it may not interfere with the normal use of the pickup bed. The bottom section may optionally be attached to a floor section that sits on or above the bed or bedsides of a pickup, providing a camper that simply sits above a pickup bed, rather than in it, without otherwise interfering with the bed's normal use.

The bottom section may also optionally be attached to a slide-in section that fits inside the bed of most pickups (i.e., sized in such a way that for a particular category of pickup truck and nominal size of pickup bed, the floor section is small enough to fit inside most pickup beds in a particular category and nominal bed size, clearing a pickup's wheel wells, bed sides, and other features) turning the vertically and horizontally telescoping truck camper into a fully enclosed slide-in or demountable style of truck camper that may be placed inside the bed of a pickup permanently, semi-permanently, or temporarily. Or, the bottom section may be attached to attachments that may attach to a flatbed or tray of a flatbed truck, or directly to a chassis or frame of a chassis-cab truck.

A second main section may be a middle section that may be a side wall section that may be have three vertical, non-folding or continuous (i.e., does not have any hinged, openable, and/or separable horizontal or vertical joints or wall sections) sides (i.e., a left side, a right side, and a front side), and may nest within the portion of the bottom section that lies over, in, or on a truck bed area or area behind the cab (i.e., the bed portion) when stored yet may be capable of telescoping vertically (e.g., upward) as well as horizontally (e.g., outward) so that it may sit over the portion of the bottom section that lies over a truck cab (i.e., the cab-over portion) when expanded for use.

It may have components such as sliders, wheels, and/or other components along its top surface or edge that may attach to guides in a top section, as described below, that may hold the middle section captive except for the ability to slide or move horizontally. This configuration may allow the middle section to move vertically as the top section moves and may allow it to move horizontally without further movement of the top section, along one or more of the horizontal guides that may exist in the top section, as described below.

The middle section may have three sides, as mentioned, which may be a left side (i.e., a side on the left side of a pickup), a right side (i.e., a side on the right side of a pickup), and a front side (i.e., a side facing the front of a pickup), and may be open on the rear side (i.e., the side facing the rear of the pickup).

A third main section of the vertically and horizontally telescoping truck camper may be the top section that may fully or partially overlap the bottom section, above both or all portions of the bottom section (i.e., portions that extend over both the cab, the cab-over portion, as well as behind the cab, the bed portion, of a truck) so that the bottom section is fully or substantially nested within the top section when the camper is in a stored configuration.

The top section may be capable of moving vertically, pulling the middle section that may be attached to it and nested inside it, upward, to expand the camper for use, or moving the middle section downward to collapse the camper for storage or during transit.

The top section may contain one or more guides, tracks, rails, groves, or other similar mechanisms that the middle section may be attached to or correspond with (e.g., through sliders, wheels, and/or other components of a track/guide system) and which may allow the middle section to move along a horizontal axis.

When the camper is expanded for use, the top section may partially separate and telescope vertically from the bottom section (i.e., it may separate fully at the portion over a truck cab, the cab-over portion, yet may remain overlapped over the portion in or above the bed area or area behind the cab, also called the bed portion).

After the top section has extended fully, the middle section may telescope horizontally in a forward direction (e.g., outward, toward the front of a truck) until it is fully over the portion of the bottom section that lies above a truck cab (i.e., the cab-over portion).

Lastly, the top section, together with the middle section, may lower slightly, if necessary, to connect the middle section with the cab-over portion of the bottom section, forming a tight seal with it.

In this expanded configuration, in the cab-over portion, the top section may overlap the joint between it and the middle section, and middle section may overlap the joint between it and the bottom section and in the bed portion, the top section will continue to overlap the joint between it and the bottom section such that all horizontal joints may be overlapped and therefore well protected against falling water (e.g., rainwater).

Because most or all of the middle section, in its stored configuration, may nest in the taller portion of the bottom section that sits in or over a truck bed or behind the cab (i.e., the bed portion) rather than in the shorter portion that sits above the truck cab (i.e., the cab-over portion), it may be substantially taller than nested portions of existing truck campers with portions that lie above the cab of a truck, have a low-profile for storage or transit, and can be expanded for use.

As a result, the vertically and horizontally telescoping truck camper can offer substantial headroom that may be sufficient for sleeping, and/or sitting on a mattress in the portion above the cab of a truck (i.e., the cab-over portion) as well as for sleeping, sitting, and/or standing in the truck bed portion (i.e., the portion behind the truck cab) of the camper.

Because the middle section is comprised of a three-sided, non-folding or continuous wall that remains vertical, it may not require any horizontal or vertical seals between each side of the walls.

Because the middle section may have three, vertical sides (i.e., a left side, right side, and front side) and may be open toward the rear of the pickup, when the camper is expanded for use, the portion of the camper above the cab of a truck (i.e., the cab-over portion), which may be the sleeping area, may be accessible from the portion of the camper that is in or above the bed or rear portion of the frame of a truck (i.e., the bed portion) (which may offer standing height, when expanded for use) through the rear of the middle section, which may not have a wall and may be open.

For example, if a mattress stored in the bottom section of the camper that is above the cab of a truck (i.e., the cab-over portion) when the vertically and horizontally truck camper is in a stored position, as described previously, becomes accessible once the camper is expanded for use and the middle section is moved up and forward so that it forms 3 side walls above the mattress, a person may access the mattress by climbing up from the portion of the camper that is in the bed or behind the cab (i.e., the bed portion) of a truck.

Other features of the vertically and horizontally telescoping truck camper may include: a middle section that takes up very little cargo space in or above the bed area of a pickup, except for the thickness of its vertical walls, which may not interfere substantially with the cargo carrying capacity of the pickup bed; access to the bed portion of a pickup may be through openable doors and windows that are in alignment across portions of the top, middle, and/or bottom sections that are nested when in a stored configuration; the ability to maintain a clear rear view for a driver through an optional window in the front facing portion of the middle section; the ability to add a floor section to the bottom section, which may otherwise be open, to create a fully enclosed camper that may sit on or above a pickup bed; the ability to add a slide-in section that may be used to slide the camper into or onto a pickup bed (i.e., similar to existing slide-in or demountable truck campers); the ability to add a section to the bottom section that may be mounted to a truck with a flat bed or tray; and/or the ability to add a section for direct installation on a truck chassis (i.e., similar to existing chassis-cab truck campers).

As mentioned previously, the top section of the vertically and horizontally telescoping truck camper may have side doors, windows, and/or other openings that align with side doors, windows, and/or other openings in the middle and/or bottom sections of the camper that may be fully or partially nested inside the top section, such that when the camper is in a collapsed, stored configuration or a configuration for transit, the bed of a pickup truck or the interior of the camper may be easily accessible by opening the doors, windows, and/or other openings in each section of the camper (i.e., the bottom, middle, and top sections). For example, to access a pickup bed or the interior of the camper from the left or right side of the vehicle with a vertically and horizontally telescoping truck camper, a person may open all the doors on either the left or right of the top, bottom, and middle sections.

The middle section of the vertically and horizontally telescoping truck camper may be open toward the back of a truck or the area behind the cab of a truck (i.e., it may have three-sides, a left side, a right side, and a front side that faces the front of a truck but may be open on the side that faces the rear of the truck or have no rear side). Because the middle section may be open in the rear of that section, only the top section and bottom sections would need to have rear doors (i.e., doors facing the rear of a truck).

Like with the side doors, the rear door of the top section may align with the rear door of the bottom section or rear door attached to attachments that may have rear doors (e.g., slide-in, flatbed, and chassis-cab attachments), such that when the vertically and horizontally telescoping truck camper is in a stored configuration and the bottom section is nested within the top section, both doors may be opened to gain access to the area at the rear of the truck, behind the cab.

For trucks with tailgates, such as most pickup trucks, the tailgates are easily removable to allow easier access to the bed of a truck or to accommodate truck caps, toppers, canopies, or shells that have their down doors which may extend to the bottom of the pickup bed and/or to accommodate slide-in or demountable truck campers that may be fully enclosed and therefore have their own doors which may extend down to the floor of the camper (e.g., so there may no longer be a need for the stock pickup tailgate). Or many existing truck caps, toppers, canopies, or shells may have rear doors that extend to the tops (or slightly over the tops) of existing pickup tailgates, if they are designed to do so and the tailgates are not removed.

Similarly, the vertically and telescoping truck camper can be optionally fitted with a full-length door in its bottom section that extends from the top of the bottom section to the bottom of the pickup bed, if the tailgate is or can be removed, or it can have a partial length door that extends from the top of the bottom section to or just passed the tailgate of a pickup, if the tailgate remains attached.

If the tailgate on a pickup truck with a vertically and horizontally telescoping truck camper is removed and the rear door of the bottom section is a full-length door that is fully openable at the top (i.e., has no top door frame), when the camper is extended for use as a camper, and the rear doors or openings in both the top and bottom sections are opened, a full-height opening may be achieved that may allow a person to comfortably walk through it.

Alternatively, if the tailgate on a pickup with a vertically and horizontally telescoping truck camper is still in place and the rear door of the bottom section is a partial-length door that is fully openable at the top (i.e., has no top door frame), when the camper is extended for use as a camper, and the rear doors or openings in both the top and bottom sections of the camper are opened, and the tailgate of the pickup is opened or lowered, then the a full-height opening may be achieved that may allow a person to comfortably walk through it.

The vertically and horizontally telescoping truck camper described herein has a low-profile (i.e., a relatively low vertical height) when not in use as a camper or during transit but offers a substantial amount of headroom (i.e., interior height above a mattress for sleeping, sitting, and/or standing) when expanded for use as a camper without the need for foldable walls, because the non-folding, rigid middle section adds substantial interior height to the portion of the camper above the cab of a truck (i.e., the cab-over portion) when in use as a camper or in an expanded position and stores (or nests) in the taller portion of the camper in or above the bed of a truck or behind the cab of a truck (i.e., the bed portion) when not in use as a camper or in a collapsed position, offering advantages over existing truck campers that can expand only by use of soft walls, foldable soft or rigid walls, collapsible soft or rigid walls, or vertically telescoping rigid sections.

The vertically and horizontally telescoping truck camper can be directly attached to a bed of a pickup or attached by use of an adaptor to account for variations in actual dimensions of pickup truck beds in the same size category and with the same nominal bed length. The vertically and horizontally telescoping truck camper may be optionally fitted with a floor section that fully encloses the camper. And the vertically and horizontally telescoping truck camper's bottom section can be fitted with either a partial-height rear door that fits over a pickup tailgate or it can be fitted with a full-height rear door that extends to the bottom of a pickup bed, if the pickup tailgate is removed.

Overlapping doors, windows, or other openings in the top, middle, and bottom sections can be aligned such that they may be opened together, to allow access to the pickup bed, through overlapping sections, or to allow a full-height opening that may be tall enough for a person to walk through in the rear of the camper and pickup.

Other attachments of the vertically and horizontally telescoping truck camper such as a slide-in attachment, flatbed attachment, and chassis-cab attachment may also fully enclose the camper and come with different rear door options fitted to those sections or attachments.

In some embodiments, a truck camper is provided. The truck camper may include a top section; a bottom section configured to be vertically retracted into or extended from the top section and configured to be attached to a bed or frame of a truck; and a middle section configured to be horizontally retracted into or extended from the top section.

In a fully expanded configuration, the bottom section may be extended from the top section, and the middle section may be extended from the top section. In a fully collapsed configuration, the bottom section may be retracted into the top section, and the middle section may be retracted into the top section.

The top section may include two side walls, a rear wall, and a roof that provides a ceiling over the truck camper. At least one of the side walls and the rear wall may include an opening.

The middle section may include two sidewalls and a front wall. At least one of the side walls and the front wall may include an opening.

The bottom section may include a cab-over portion over a cab of the truck, and a bed portion attached to the bed or frame of the truck. The top section may include two side walls, a rear wall, and a roof that provides a ceiling over the top section and the cab-over portion. The cab-over portion may include two side walls and a front wall. The bed portion may include two side walls, a front wall, and a rear wall.

In the fully expanded configuration, two sidewalls, a front wall, and a rear wall of the bed portion; two side walls, a rear wall, and a roof of the top section; two side walls and a front wall of the cab-over portion; and a rear door of the truck may form an enclosure.

In the fully collapsed configuration, two sidewalls, a front wall, and a rear wall of the bed portion; a roof of the top section; two side walls and a front wall of the cab-over portion; and a rear door of the truck may form an enclosure.

The top section may include two side walls and a rear wall. A part of the roof may be positioned over the cab-over portion. The middle section may be configured to be horizontally retracted into or extended from the top section via a track system of the roof. The middle section may be configured to be horizontally retracted into or extended from the top section via two short tracks and two long tracks of the roof.

The truck camper may further include an attachment configured to fit between the bed portion and the truck. The attachment may include a door or a wall configured to form an enclosure with the bottom section, the top section, and the middle section in the fully expanded configuration. The attachment may include a door or a wall configured to form an enclosure with the bottom section, and the top section in the fully collapsed configuration.

In some embodiments, at least one of the sections may be separable into parts, and the parts are combinable to form a whole section. At least one of the sections may be configured to receive an additional part, attachment or section.

Also provided is a truck comprising the truck camper. In some embodiments, provided is a truck camper including a top section; a bottom section; and a middle section. The bottom section may include a cab-over portion over a cab of a truck, the bottom section being configured to be vertically retracted into or extended from the top section and configured to be attached to a bed or frame of the truck. The middle section may be configured to be horizontally retracted into or extended from the top section. In a fully expanded configuration, the bottom section may be extended from the top section, and the middle section may be extended from the top section. In a fully collapsed configuration, the bottom section may be retracted to the top section, and the middle section may be retracted to the top section.

Figure 1:
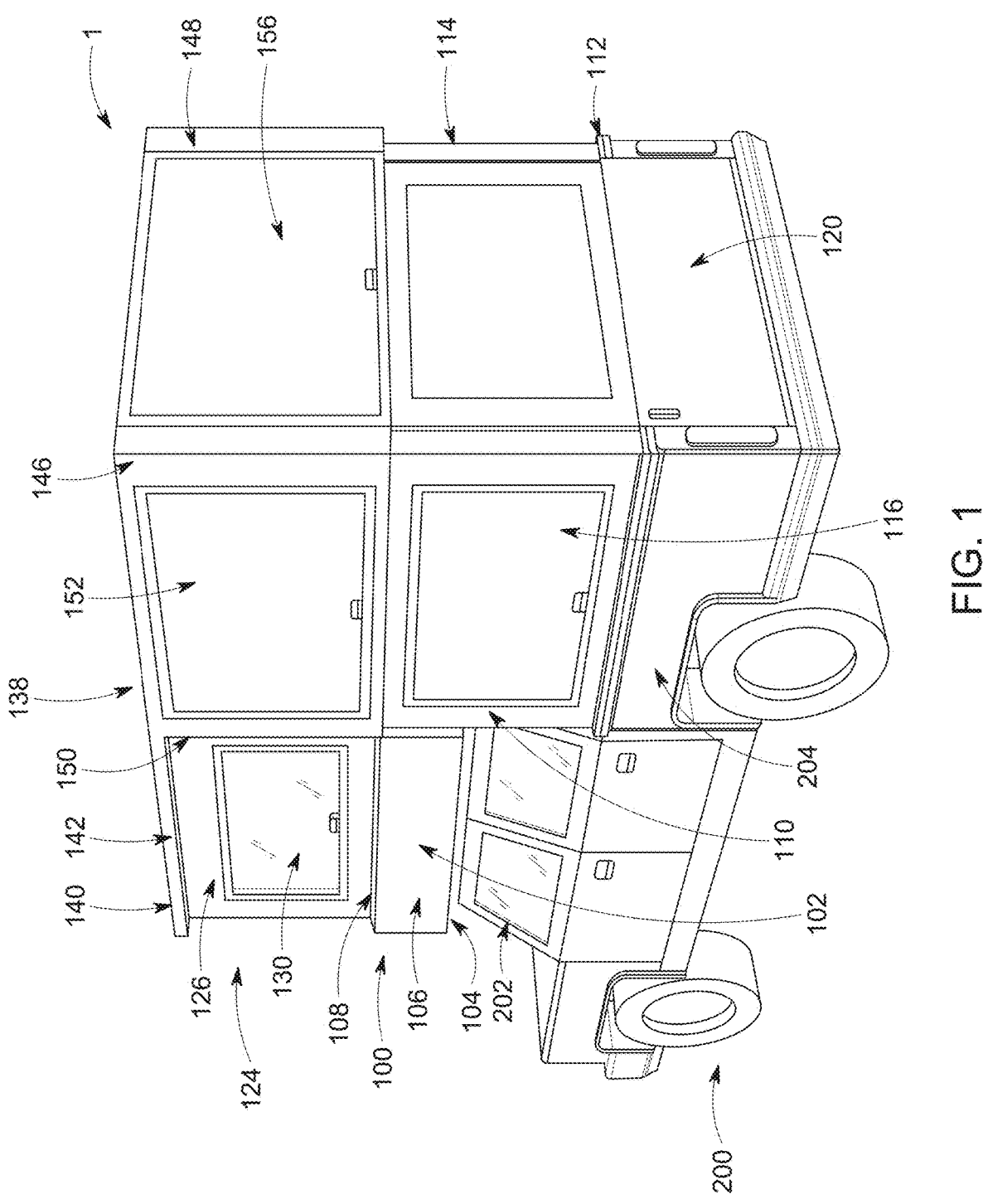
FIG. 1 shows a left, rear perspective view of an exemplary camper configured as a vertically and horizontally telescoping truck camper attached to an exemplary pickup truck in an expanded configuration.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Described herein are devices, components, assemblies, systems, methods, etc. for vertically and horizontally telescoping truck campers. The description and accompanying figures, which describe and show certain embodiments, are made to demonstrate, in a non-limiting manner, several possible configurations of vertically and horizontally telescoping truck campers, apparatuses, components, assemblies, systems, etc. and various methods of using them according to various aspects and features of the present disclosure.

Accordingly, the disclosure is not limited to the specific embodiments described. Rather, the inventive principles associated with the embodiments described herein, including with respect to the apparatuses, devices, components, assemblies, systems, methods, etc. described herein, may be applied in a variety of ways, including to other types of apparatuses, devices, components, assemblies, systems, methods, etc. General and specific apparatuses, devices, components, assemblies, systems, methods, etc. are described herein sufficiently to enable one to develop a variety of implementations/applications without undue experimentation. In the development of particular applications, numerous implementation-specific decisions will be made to achieve the design-specific goals, which will vary from one implementation/application to another. It will be appreciated that, having access to this disclosure and reading this disclosure, such a development effort would be a routine undertaking for persons of ordinary skill in the art.

This document does not intend to distinguish between components that differ in name but not function. In the following discussion and in the claims, the terms "including," "includes," "comprising," "have," and "has" are used in an open-ended fashion, and thus should be interpreted to mean "including, but not limited to." The word "or" is used in the inclusive sense (i.e., "and/or") unless a specific use to the contrary is explicitly stated.

Camper 1 may be configured to be a vertically and horizontally telescoping truck camper that may have cab-over portion (e.g., a portion over the cab of a truck) and a bed portion (e.g., a portion behind the cab of a truck and in, on, or over a bed or bare frame of a truck (e.g., pickup truck with a cab and pickup bed behind the cab, a flatbed truck with a cab and a flatbed behind the cab, or a chassis-cab truck with a cab and a bare chassis behind the cab). Throughout this document, "cab-over portion" may refer to the portion of camper 1 that is over the cab of a truck; "bed portion" may refer to the portion of camper 1 that is in, on, or over a bed or bare frame of a truck; "cab" may refer to the cab of a truck; and "bed," "bed portion," or "behind the cab" may refer to a pickup bed, flatbed, bare chassis, or area behind the cab of a truck.

Camper 1 described herein may have three main sections: a bottom section, a middle section, and a top section, wherein the bed portion of the top section and the middle section together can telescope upward (i.e., slide upward, while the bottom section remains in position, with the bed portion of the top section remaining connected to the bed portion of the bottom section while the cab-over portion of the top section fully separates from the cab-over portion of the bottom section), and the middle section can telescope outward (i.e., slide outward from the bed portion of the top section and into the cab-over portion of the top section, after the top section has moved fully upward), and the middle section, after it has fully extended outward, along with the top section can lower slightly until a bottom edge of the middle section overlaps fully with a raised edge of the bottom section to expand the camper for use.

Camper 1 in an expanded configuration, as described, may contain enough interior height in the cab-over portion of the camper for sleeping, sitting, and possibly standing and in the bed portion for sleeping, sitting, and standing while having rigid, weather-tight, and insect-proof movable walls.

To close or collapse the camper for storage or transit, the middle section along with the top section can first rise slightly to disconnect the middle section from the bottom section, then the middle section can retract inward (i.e., slide into the bed portion of the top section from the cab-over portion of the top section), then the top section along with the middle section can retract downward (i.e., slide downward with the bed portion of the top section being over (e.g., on the outside of) the bed portion of the bottom section and the middle section being inside the bed portion of the bottom section, while the cab-over portion of the top section partially overlaps and connects with the cab-over portion of the bottom section).

Figure 2:
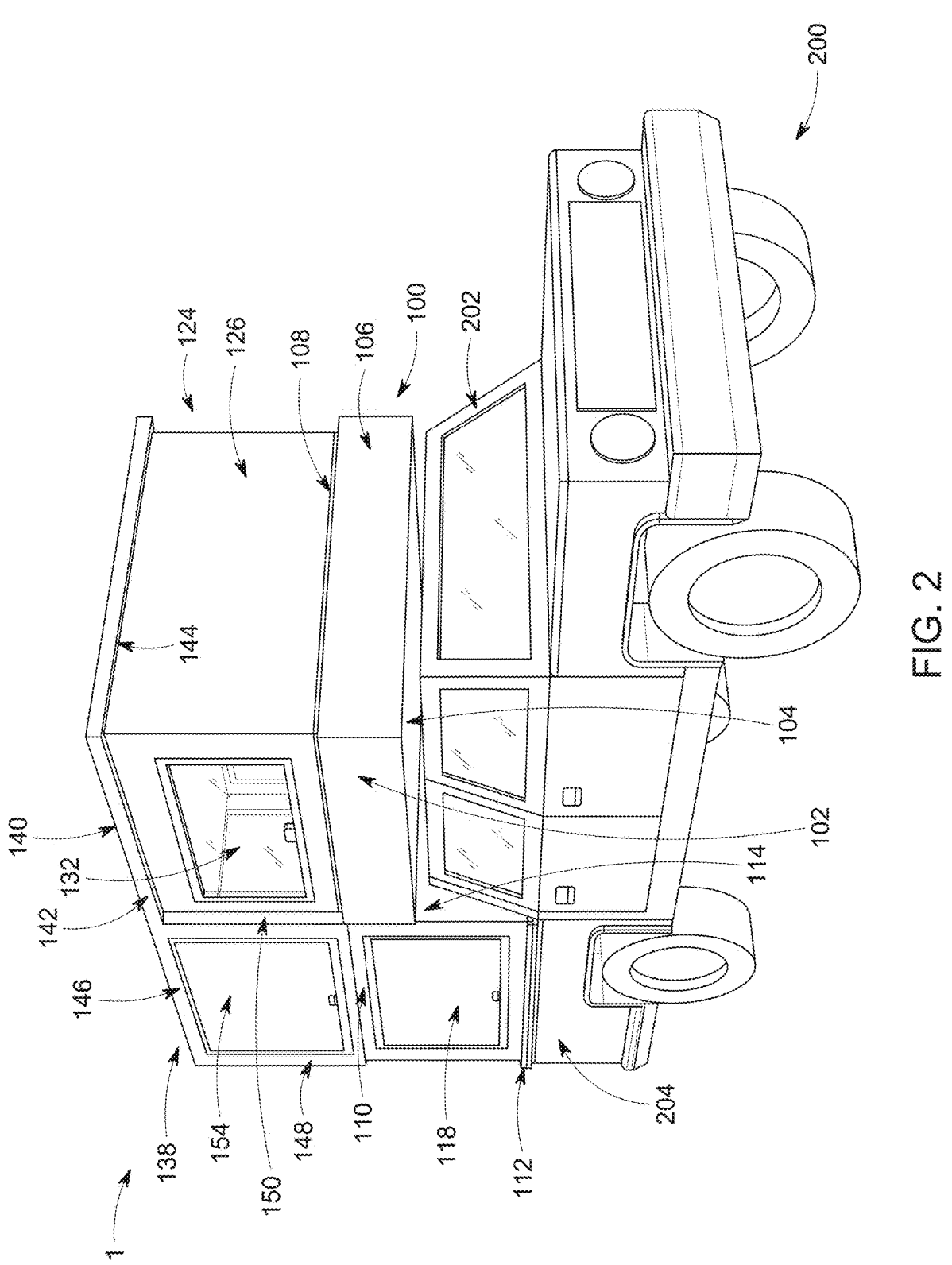
FIG. 2 shows a right, front perspective view of the camper and truck of FIG. 1.

Camper 1 in a collapsed configuration, as described, may have a lower profile height (e.g., as compared with non-pop, or fixed-height truck campers) that may allow a truck fitted with it to still be low enough to fit into or under certain structures and be more aerodynamic (e.g., as compared with non-pop, of fixed-height campers). FIGS. 1 and 2 show exemplary camper 1 attached to exemplary pickup truck 200 in an expanded position. FIG. 1 shows a left, rear perspective view of camper 1 in an expanded configuration fitted to exemplary truck 200, and FIG. 2 shows a right, front perspective view of camper 1 in an expanded configuration fitted to exemplary truck 200.

As shown in FIGS. 1 and 2, truck 200 may be a pickup truck with cab 202 and bed 204. As shown in FIGS. 1 and 2, camper 1 is composed of bottom section 100, middle section 124, and top section 138.

As further shown in FIGS. 1 and 2, a first main section of camper 1, bottom section 100, is composed of portion 102, which is a cab-over portion that is above cab 202 of exemplary truck 200; and portion 110, which is a bed portion that is attached to truck bed 204 of exemplary truck 200.

Cab-over portion 102 further consists of a floor, floor 104; short walls, walls 106, which may exist on three sides of cab-over portion 102 (i.e., on a left side, as shown in FIG. 1, and on right and front sides, as shown in FIG. 2). Cab-over portion 102 may also have a raised edge, edge 108 (which may be staggered, sloped or straight), that runs along the top of walls 106, on three sides: the left side, as shown in FIG. 1, and the right and front sides, as shown in FIG. 2.

Bed portion 110 of bottom section 100, as shown in FIGS. 1 and 2, further consists of flange 112, which may be a flange that runs along a bottom edge of bed portion 110, may exist on three sides of bed portion 110 (i.e., a left side, as shown in FIG. 1, a right side as shown in FIG. 2, and a front side, a small portion of which is also shown in FIG. 2). Flange 112, as shown in FIGS. 1 and 2, may overlap a top edge of the fixed sides of a pickup bed, bed 204 of exemplary truck 200.

Pickup beds typically have three fixed sides on the left, right, and front (i.e., the side adjacent to the cab of a pickup truck); and they may have a tailgate on a fourth side or rear side.

In some cases, the tailgate may be removed to accommodate truck caps or campers, particularly those with tall rear doors (e.g., doors that extend into the bed area of a pickup truck), as is the case with the exemplary truck, truck 200, as shown in FIGS. 1 and 2.

Flange 112 in bed portion 110 of camper 1 may be the attachment point to bed 204 of truck 200, as shown in FIGS. 1 and 2 (i.e., flange 112 may be where camper 1 may be temporarily, semi-permanently, or permanently attached to truck 200 by use of J-bolts, bolts, screws, nuts, clamps, brackets and/or other attachment mechanisms or combination of attachment mechanisms commonly used to secure truck caps, canopies, toppers, or camper shells to pickup truck beds, such as bed 204) and may provide an overlapped joint which may or may not be further sealed (e.g., a seal may or may not exist between flange 112 and bed 204) that helps prevent water from entering the bed or camper 1 through that joint.

Bed portion 110 further consists of tall walls, walls 114, which may exist on four sides of portion 110 (i.e., the left and rear sides, as shown in FIG. 1, and the right and front sides, as shown in FIG. 2); opening 116, as shown in FIG. 1, and opening 118, as shown in FIG. 2, which may both be side doors, windows, or hatches that, when opened, may provide access to bed portion 110 of camper 1 and bed 204 of exemplary truck 200; and door 120, which may be a tall rear door capable of extending from bed 204 to the top of walls 114 and, when opened, may provide access to the rear of camper 1 and bed 204.

As shown and described later, portion 102, the cab-over portion of bottom section 100 may be a sleeping area of camper 1 and may contain a mattress and other bedding, or maybe used for storage of other items.

Above portion 102 (e.g., in a camper 1 that is expanded for use) is middle section 124, as shown in FIGS. 1 and 2.

A second main section of camper 1, middle section 124, may be composed of walls 126, which may exist on three sides (i.e., a left side, as shown in FIG. 1, and right and front sides, as shown in FIG. 2); edge 128, which may be a straight, sloped, or staggered edge that runs along the bottom edge of each side of the walls, as later shown in FIG. 6, and overlaps with raised edge 108 of portion 102 of bottom section 100, with or without a seal between the two edges, creating a secure, weather-tight joint, as shown in FIGS. 1 and 2.

Opening 130, as shown in FIG. 1, and opening 132, as shown in FIG. 2, which may both be side windows, doors, or hatches that, when opened, may provide ventilation or access to a sleeping area in the cab-over portion of camper 1; and sliders (or components of a sliding mechanisms, such as t-slots, wheels, or other similar components capable of going into and sliding along a track or tracks), as later shown in FIG. 6 as short sliders 134 and long sliders 136, capable of sliding along tracks in top section 138, keeping bottom section 124 connected to (and held captive by) top section 138, but still capable of sliding back and forth along the tracks in section 138.

As shown in FIGS. 1 and 2, a third main section of camper 1 is top section 138, which may be composed of roof 140, which may provide a ceiling and exterior roof over the entire camper; tracks (or rails, guides, or components of tracks, rails, and/or guides capable of accepting sliders), as later shown in FIG. 7 as short tracks 158 and long tracks 160, which may be tracks in roof 140 that may be capable of accepting sliders 134 and 136 (shown in FIG. 6), respectively, of middle section 124.

A cab-over portion, portion 142, which may be the portion of top section 138 that extends over cab 202 of exemplary truck 200 and over other portions of camper 1, such as cab-over portion 102 of bottom section 100, and middle section 124, when it is positioned in the cab-over portion of camper 1 for use; bottom edge 144, which may be a dropped edge (that may be slopped, staggered, or straight) in cab-over portion 142 of top section 138 that overlaps the joint between top section 138 and middle section 124, with or without a seal, providing a weather-tight joint when camper 1 is in an expanded configuration; portion 146, which may be the bed portion of top section 138 that may exist over bed 204 of exemplary truck 200 and portion 110 of bottom section 100; walls 148, which may be tall walls that may exist on three sides of portion 146 (i.e., left and rear sides, as shown in FIG. 1, and a right side, as shown in FIG. 2); edges 150, which may be vertical edges that extend inward slightly, as more clearly shown in FIG. 2, such that they form a tight joint, with or without a seal, between walls 146 of top section 138 and walls 126 of middle section 124, when camper 1 is expanded for use; opening 152, as shown in FIG. 1, and opening 154, as shown in FIG. 2, which may both be side openings that may be doors, windows, or hatches that, when opened, may provide ventilation and/or access to the sides of the bed portion of camper 1 and/or bed 204 of exemplary truck 200; and opening 156, which may be a rear hatch, door, or window that, when opened, may provide ventilation and/or access to the rear of the bed portion of camper 1 or bed 204.

Camper 1 may be modular and may contain attachments or attachable extensions that may allow fitment of camper 1 to various types of truck and/or for various purposes. Bed portion 110 of bottom section 100 may further contain features or components that may allow it to be attachable directly, securely, and in a weather-tight manner to various accessory extensions and/or attachments that may allow camper 1 to be installed in a variety of ways such as: an adapter attachment for fitment on, and to account for differences in, various makes, models, and years of pickup trucks; a floor attachment to fully enclose camper 1 and separate its living area from the bed of a pickup truck; a slide-in attachment for slide-in mounting applications in a pickup truck bed; a flatbed attachment for mounting to a flatbed truck; and/or a chassis attachment for installation to the frame of a chassis-cab truck.

Recesses, slots, notches, flanges, brackets, supports, holes, hooks, tracks, rails, and/or other features, and/or portions of other features may exist on flange 112, walls 114 (e.g., a bottom portion of walls 114), and/or other portions (e.g., lower portions) of bed portion 110 of bottom section 100 that may allow a bottom or lower surface, side, or portion of bed portion 110 of bottom section 100 (e.g., by nuts, bolts, threaded inserts, clamps, adhesive, buckles, straps, other fasteners, and/or other fastening mechanisms) to be securely fastened to, fit onto or into, correspond to, and/or attach to various features such as raised edges, protrusions, studs, flanges, brackets, supports, holes, hooks, sliders, and/or other features, and/or portions of other features that may be exist on or through the upper surfaces, sides, or portions of each of the various attachments of camper 1 mentioned above, as will be shown in FIGS. 19-36 and described in further detail later.

Figure 3:
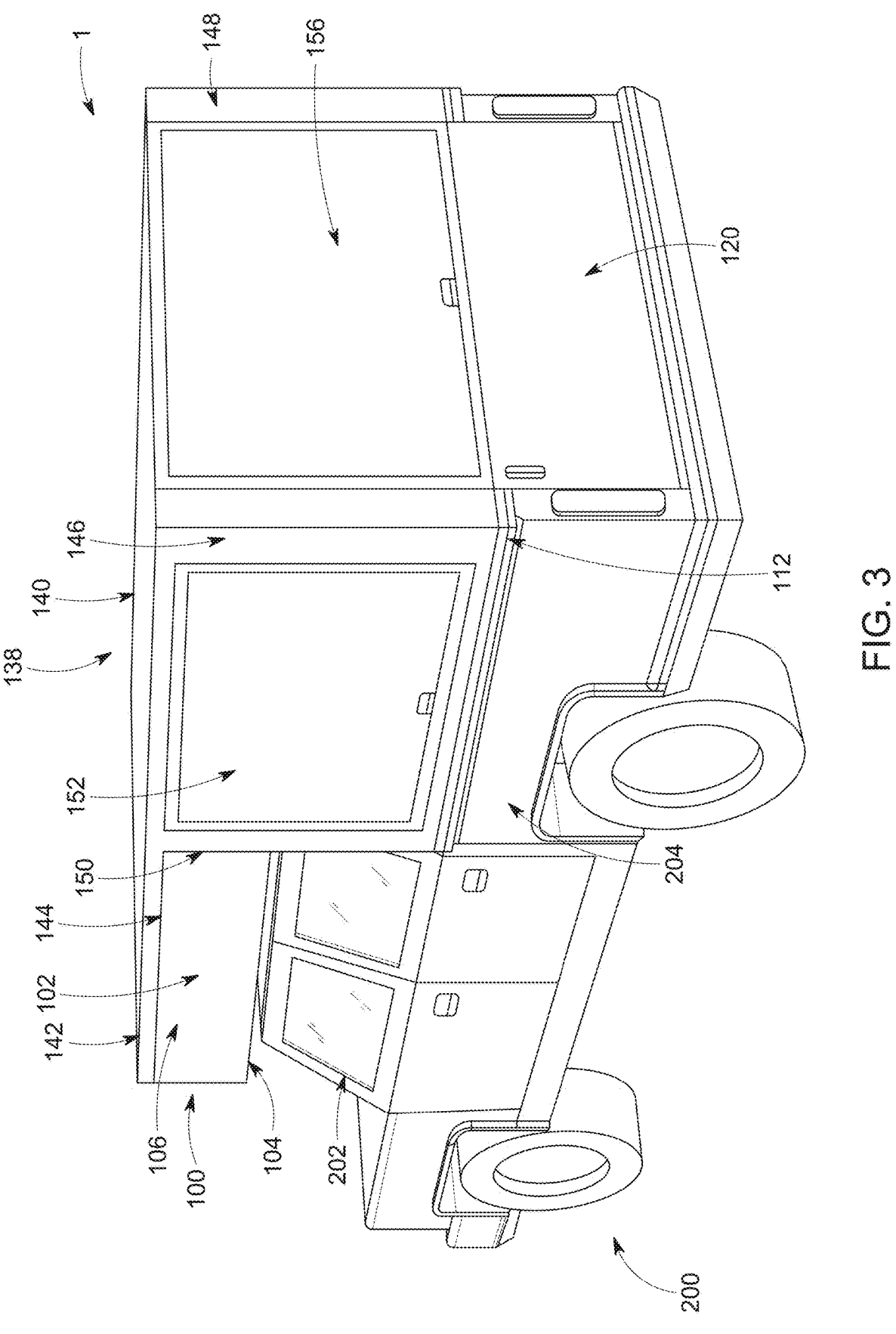
FIG. 3 shows a left, rear perspective view of the camper and truck of FIG. 1, with the camper being in a collapsed configuration.
Figure 4:
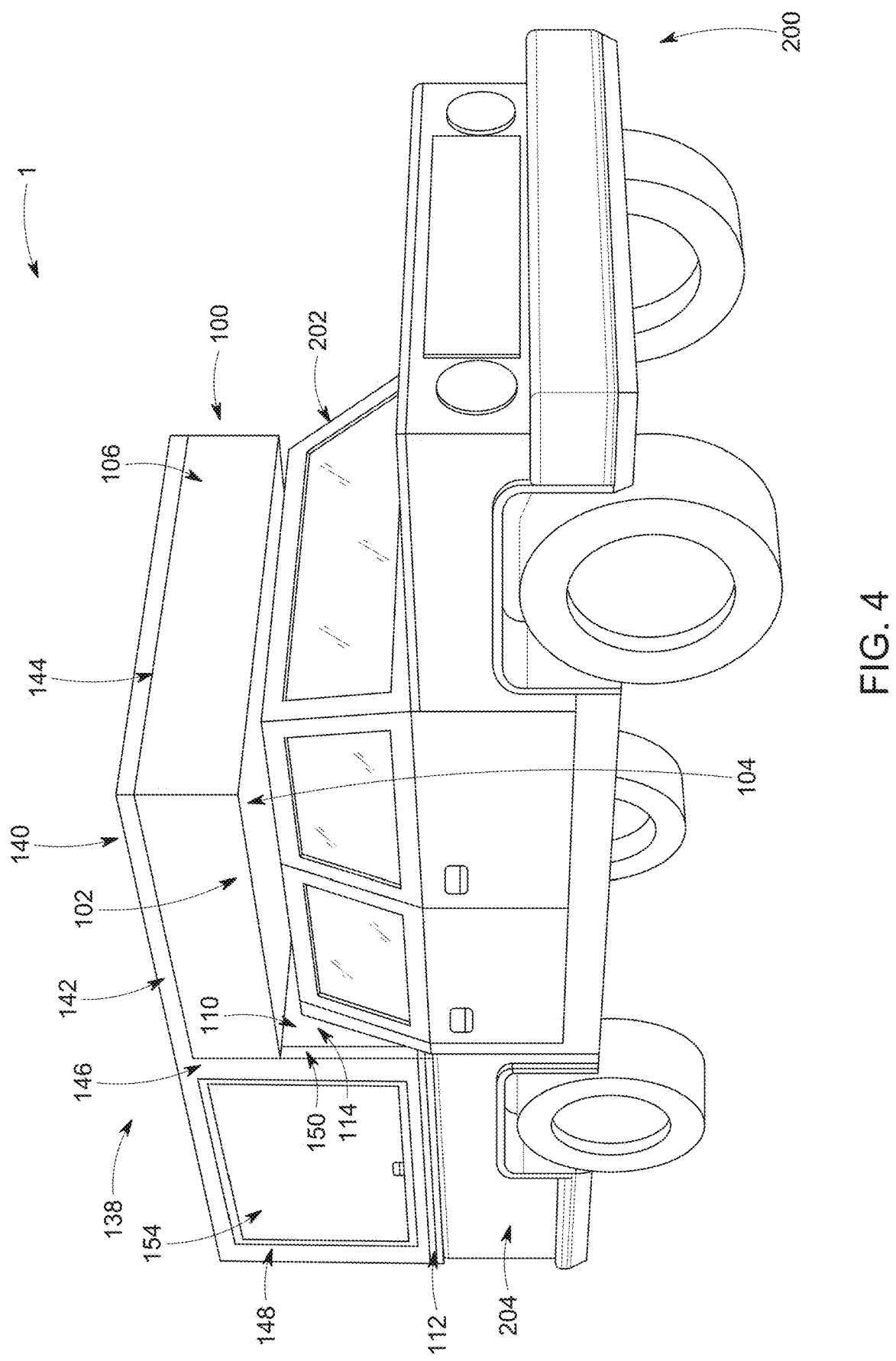
FIG. 4 shows a right, front perspective view of the camper and truck of FIG. 3.

FIGS. 3 and 4 show camper 1, described above and shown previously in FIGS. 1 and 2 in a collapsed configuration, when stored and not in use as a camper, and/or while in transit. When vertically and telescoping truck camper 1 is in a collapsed configuration, the three main sections are nested, such that middle section 124 is fully retracted into top section 138 and top section 138 is nested over bottom section 100.

As shown in FIGS. 3 and 4, bed portion 146 of top section 138 overlaps bed portion 110 of bottom section 100 (i.e., portion 110 is nested inside portion 146), such that only some of portion 110 of bottom section 100 is still visible from outside camper 1, such as flange 112, as shown in FIGS. 3 and 4, a portion of tall door 120, as shown in FIG. 3, and a portion of walls 114, as shown in FIG. 4. Edges 150 of top section 138 overlap walls 114 of bottom section 100, as shown more clearly in FIG. 4.

As shown in FIGS. 3 and 4, edge 144 in cab-over portion 142 of top section 138, overlaps portion 102 of bottom section 100, such that edge 144 covers, connects with, and/or touches raised edge 108 (which is not visible in FIGS. 3 and 4) on walls 106 of portion 102, with or without a seal, such that it forms a weather-tight joint.

Figure 5:
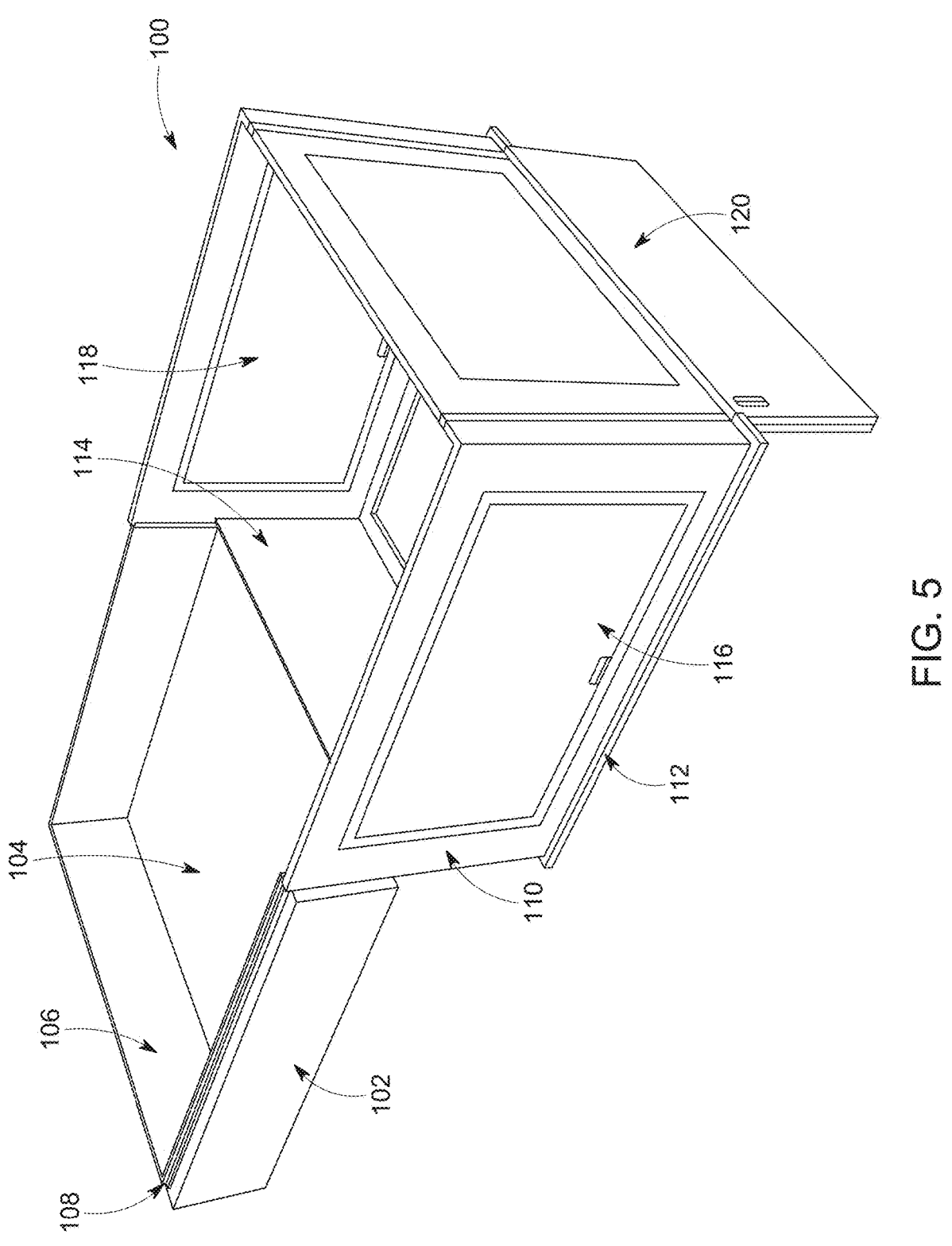
FIG. 5 shows a perspective view of a bottom section of an exemplary camper configured as a vertically and horizontally telescoping truck camper.

FIG. 5 shows an exemplary bottom section, section 100, of camper 1 in greater detail. As shown in FIG. 5 and as mentioned previously, bottom section 100 is composed of: cab-over portion 102, which contains floor 104, short walls 106, and raised edge 108; and bed portion 110, which contains flange 112, tall walls 114, side openings 116 and 118, and rear opening 120.

As shown in FIG. 5, the area bounded by floor 104 and three-sided walls, walls 106, provides a raised area in the cab-over portion, portion 102, of camper 1. As also shown in FIG. 5, the area bounded by four-sided walls, walls 114, does not have a floor and, when attached to a pickup bed, by and/or through flange 112, as described above, the bed of the pickup may form the floor for bed portion, portion 110, of camper 1.

As shown in FIG. 5, the top edges of walls 106 in portion 102 are at the same or roughly the same height as three of the four sides of walls 114 (i.e., the left, right, and rear sides) in portion 110; and one of the four sides, the front side, of walls 114 in portion 110 is shorter, reaching the height of and connecting with floor 104 in portion 102. This configuration allows portion 102, the cab-over portion, to be accessed from inside camper 1 by a person standing in portion 110, the bed portion.

Bottom section 100 may be composed of plastic, fiberglass, carbon fiber, metal, rigid foam, other composite material, other material, or a combination of materials. The openings in bottom section 100 may be composed of the same material as the rest of bottom section 100 and may be solid, or they may be or may contain windows composed of glass, plexiglass, acrylic, other material, and/or a combination of materials. The openings may contain latches that may be lockable or not, and openable from the inside and/or outside. The openings may further contain insect screens.

Figure 6:
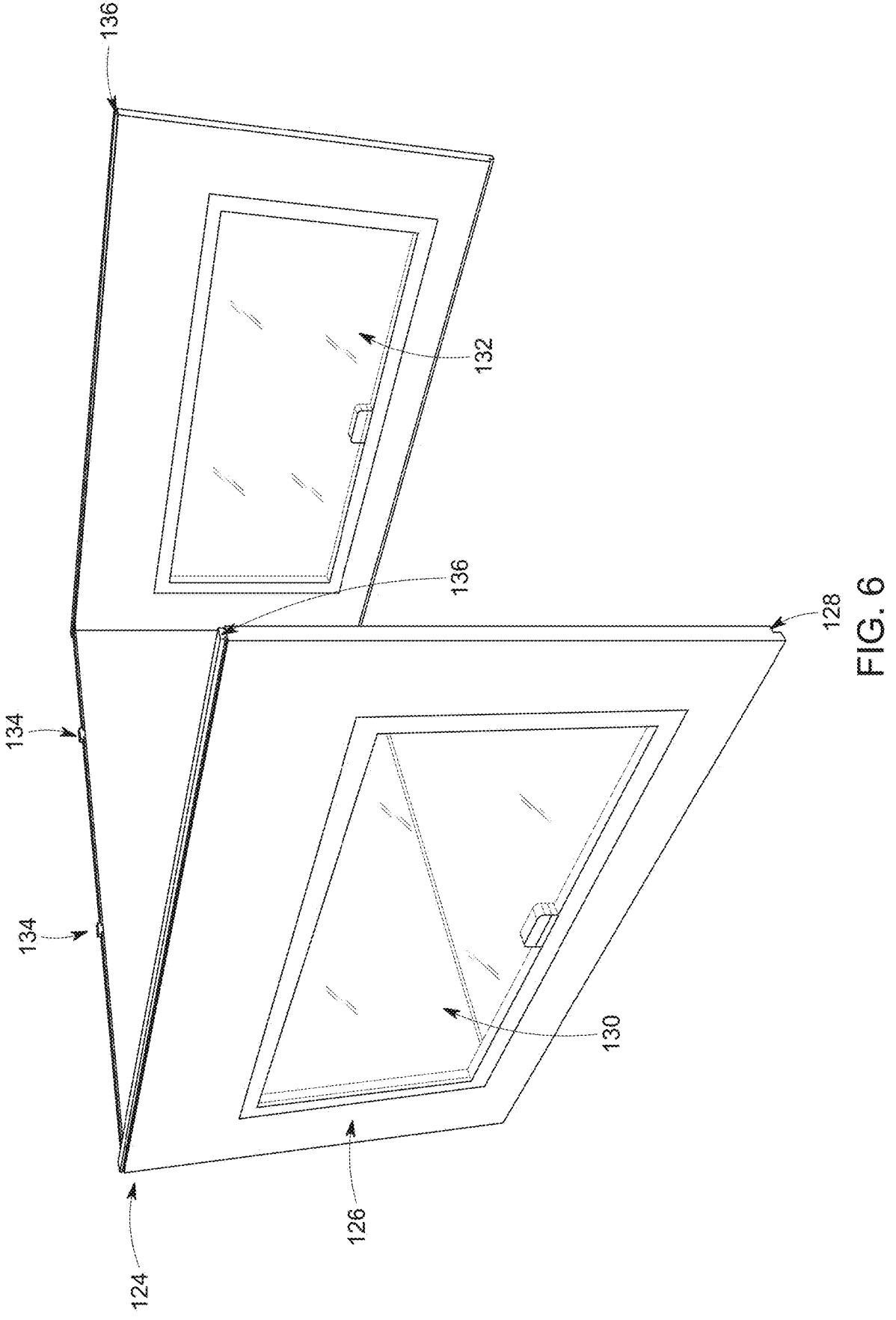
FIG. 6 shows a perspective view of a middle section of an exemplary camper configured as a vertically and horizontally telescoping truck camper.

FIG. 6 shows an exemplary middle section, section 124, of camper 1 in greater detail. As shown in FIG. 6 and mentioned previously, middle section 124 is composed of: walls 126, bottom edge 128, side openings 130 and 132, and sliders 134 and 136.

Sliders 134 may be short sliders and sliders 136 may be long sliders as shown in FIG. 6. Short sliders 134 may exist on the top edge of the front side of walls 126 and long sliders 136 may exist along the top edge of the left and right sides of walls 126, as shown in FIG. 6. Short sliders 134 may be configured to fit into and slide along short tracks 158 in top section 138 and long sliders 136 may be configured to fit into and slide along long tracks 160 in top section 138. Walls 126 may also be configured to optionally contain an opening on its front side; however, a solid front side of walls 126 is shown in FIG. 6. Middle section 124 may be composed of plastic, fiberglass, carbon fiber, metal, rigid foam, other composite material, other material, or a combination of materials.

The openings in middle section 124 may be comprised of the same material as the rest of middle section 124 and may be solid, or they may be or may contain windows composed of glass, plexiglass, acrylic, other material, and/or a combination of materials. The openings may contain latches that may be lockable or not, and openable from the inside and/or outside. The openings may further contain insect screens.

Figure 7:
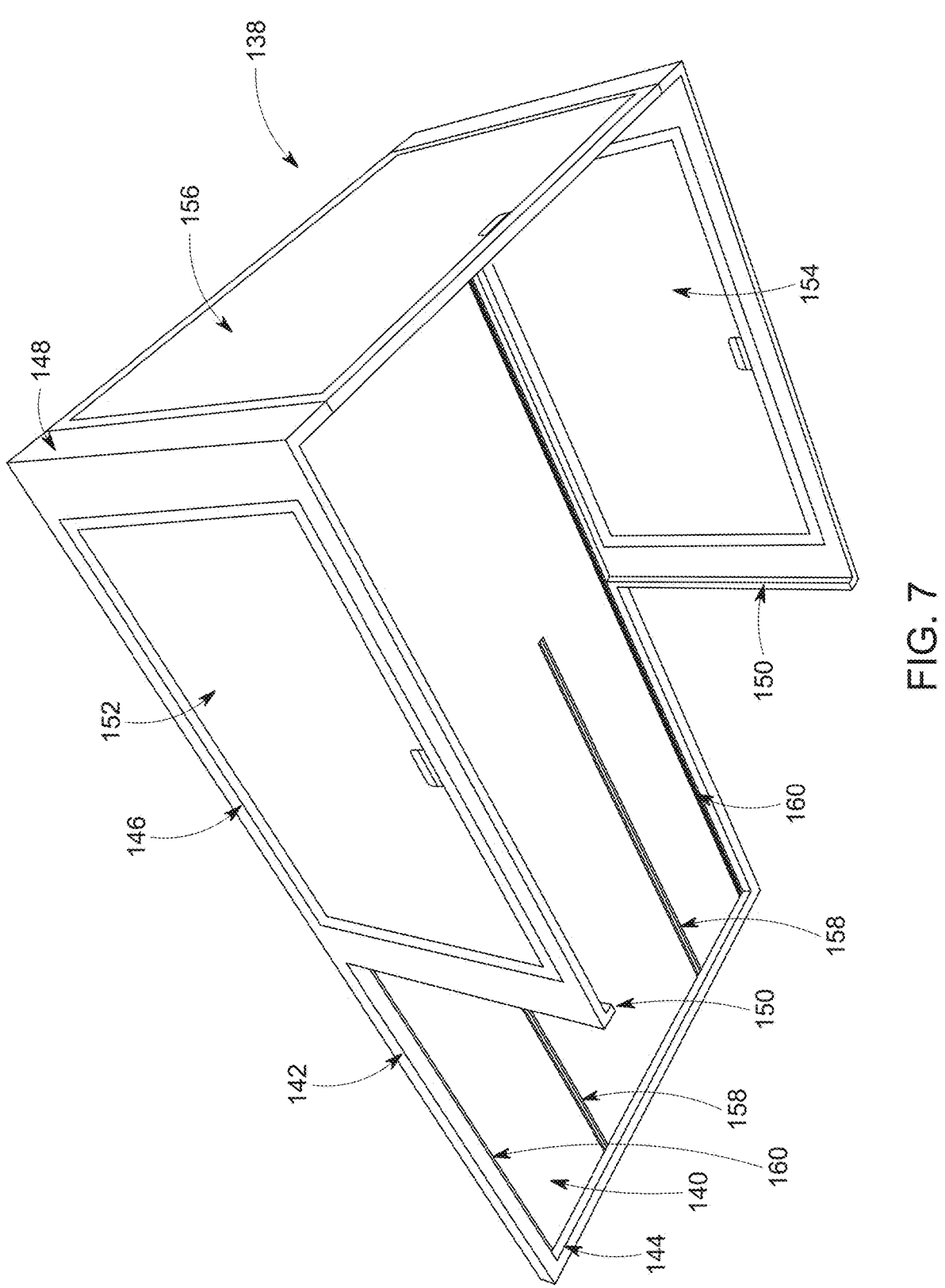
FIG. 7 shows a perspective view of a top section of an exemplary camper configured as vertically and horizontally telescoping truck camper.

FIG. 7 shows an exemplary top section, section 138, of camper 1 in greater detail. As shown in FIG. 7 and mentioned previously, top section 138 is composed of: roof 140, which contains short tracks 158 and long tracks 160; cab-over portion 142, which contains dropped edge 144; and bed portion 146, which contains walls 148, vertical edges 150, side openings 152 and 154, and rear opening 156. Short tracks 158 may be configured to accept into it short sliders 134 in middle section 124 and long tracks 160 may be configured to accept into it long sliders 136 in middle section 124. Top section 138 may be composed of plastic, fiberglass, carbon fiber, metal, rigid foam, other composite material, other material, or a combination of materials.

The openings in middle section 138 may be comprised of the same material as the rest of middle section 138 and may be solid, or they may be or may contain windows composed of glass, plexiglass, acrylic, other material, and/or a combination of materials. The openings may contain latches that may be lockable or not, and openable from the inside and/or outside. The openings may further contain insect screens.

Figure 8:
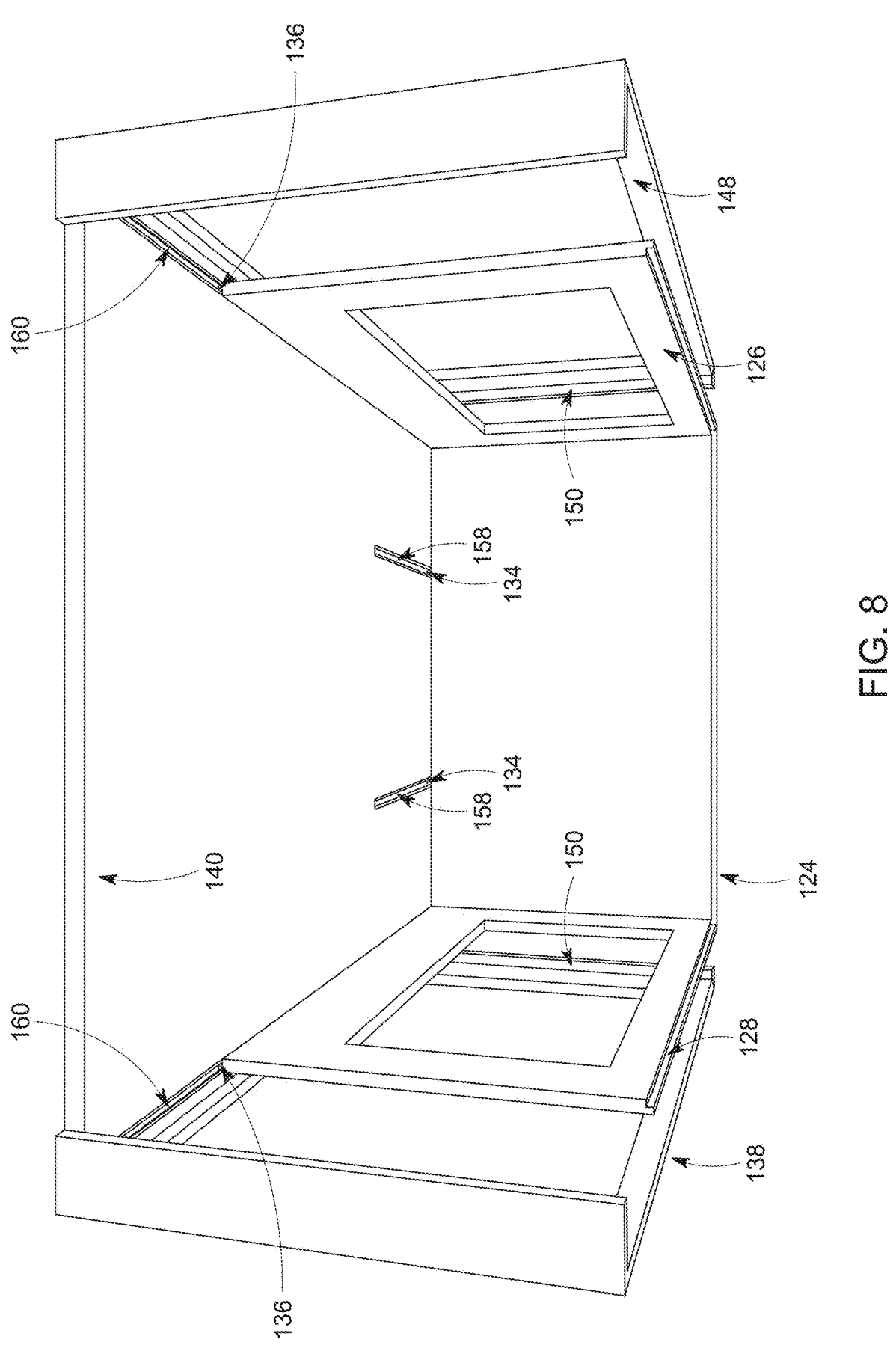
FIG. 8 shows a rear perspective view of the middle section of FIG. 6 in transition of sliding into or out of the top section of FIG. 7, with the doors and/or windows of each section not shown for clarity.
Figure 9:
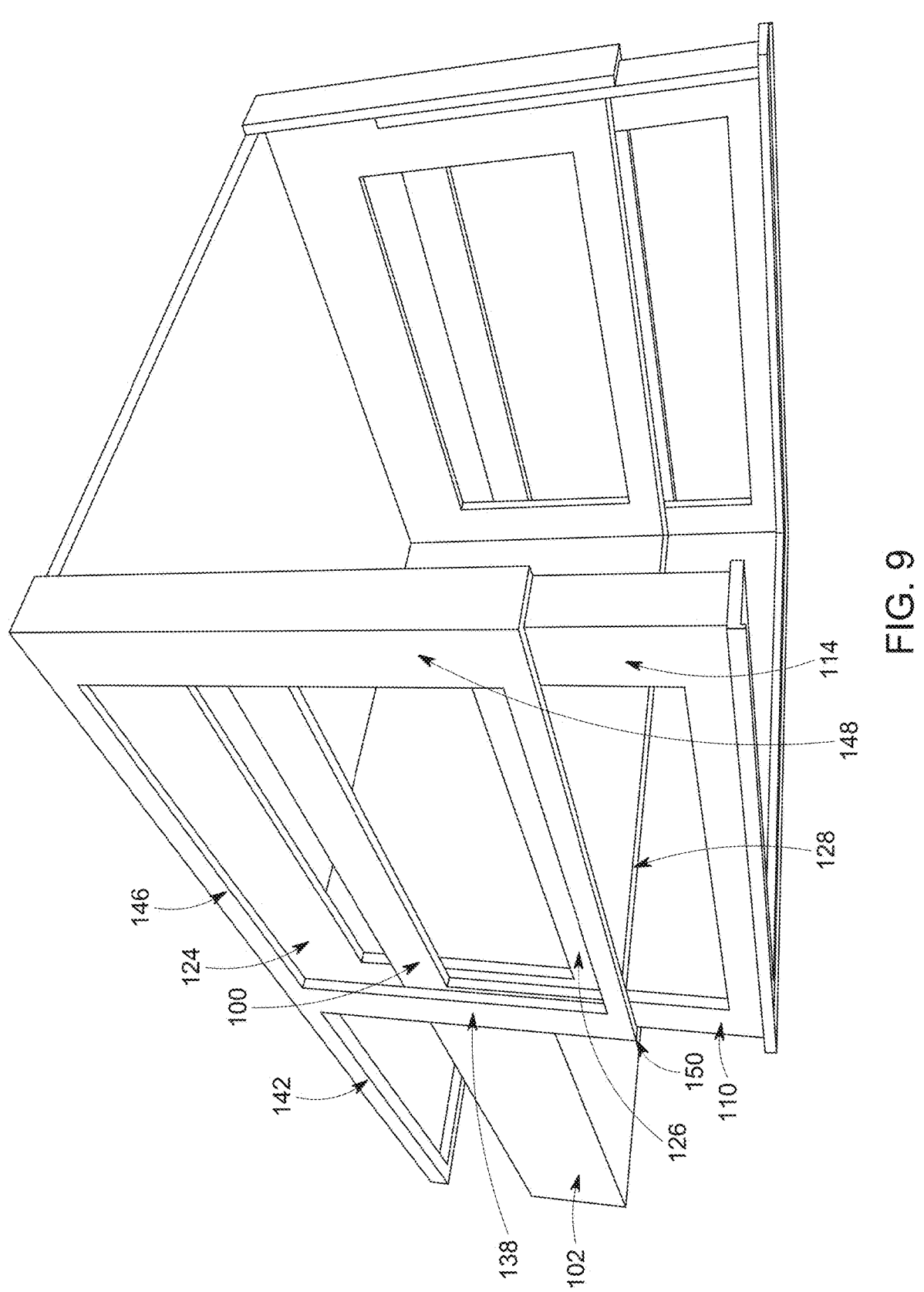
FIG. 9 shows a left, rear perspective view of the top section of FIG. 7 in transition of sliding downward or upward over the bottom section of FIG. 5, causing the middle section of FIG. 6 to slide into or out of, respectively, the bottom section, with the doors and/or windows of each section not shown for clarity.

FIGS. 8 and 9 show in greater detail how the main sections of camper 1 may fit together. FIGS. 8 and 9 show the main sections without their openings, doors, windows, and/or hatches for greater clarity into how the sections may fit together. FIG. 8 shows how middle section 124 fits into top section 138. Sliders 134 and 136, shown previously in FIG. 6, fit into tracks 158 and 160, respectively, as shown in FIG. 8. Sliders 134 and 136 on walls 126 of middle section 124 keep middle section 124 attached to top section 138, but still allow middle section 124 to horizontally move back and forth, slide in or out, or telescope or retract along tracks 158 and 160, respectively, in roof 140 of top section 138, as shown in transition in FIG. 8, of middle section 124 sliding along top section 138. This configuration allows middle section 124 to move or slide upward or downward, or telescope upward or retract downward, as top section 138 moves upward or downward, or telescopes upward or retracts downward.

FIG. 9 shows middle section 124 fully retracted into, or in its most inward position in, top section 138, and top section 138 together with middle section 124 in transition of moving or sliding upward or downward, or telescoping upward or retracting downward. Middle section 124 in its most inward (e.g., most rearward position) may allow the front side of walls 126 to clear the front side of walls 114 in bed portion 110 of bottom section 100, as shown in FIG. 9. As shown in FIG. 9, when top section 138 and middle section 124 are in transition of sliding upward or downward, or are in their lowest position (e.g., for closing or collapsing of camper 1), bed portion 146 of top section 138 is on the outside of bed portion 110 of bottom section 100 and bed portion 110 of bottom section 100 is on the outside of middle section 124 (i.e., middle section 124 is nested inside bed portion 110 of bottom section 100 which, in turn, is nested inside bed portion 146 of top section 138).

When top section 138 together with middle section 124 are in transition of sliding upward or downward, as shown in FIG. 9, or are in their lowest position, walls 126 of middle section 124 are the innermost walls, walls 114 of bottom section 100 are the middle set of walls (i.e., between walls 126 and walls 148), and walls 148 of top section 138 are the outer most walls. For middle section 124 to nest inside bed portion 110 of bottom section 100 while bed portion 110 of bottom section 100 nests inside bed portion 146 of top section 138, a gap must exist between walls 126 of middle section 124 and walls 148 of top section 138 on the left and right sides of each section.

As shown in FIG. 8, a gap exists between the left and right sides of walls 126 of bottom section 124 and walls 148 in bed portion 146 of top section 138. This gap is where walls 114 in bed portion 110 of bottom section 100 fits into when top section 138 and middle section 124 are in transition of sliding upward or downward or are in their lowest position for storage or collapsing of camper 1. When camper 1 is in an expanded position for use and middle section 124 has moved from the bed portion of camper 1 into the cab-over portion of camper 1, as shown in FIGS. 1 and 2, the gap that exists between walls 126 of middle section 124 and walls 148 of top section 138 must be closed otherwise a vertical gap may exist between the walls of fully expanded camper 1.

Figure 10:
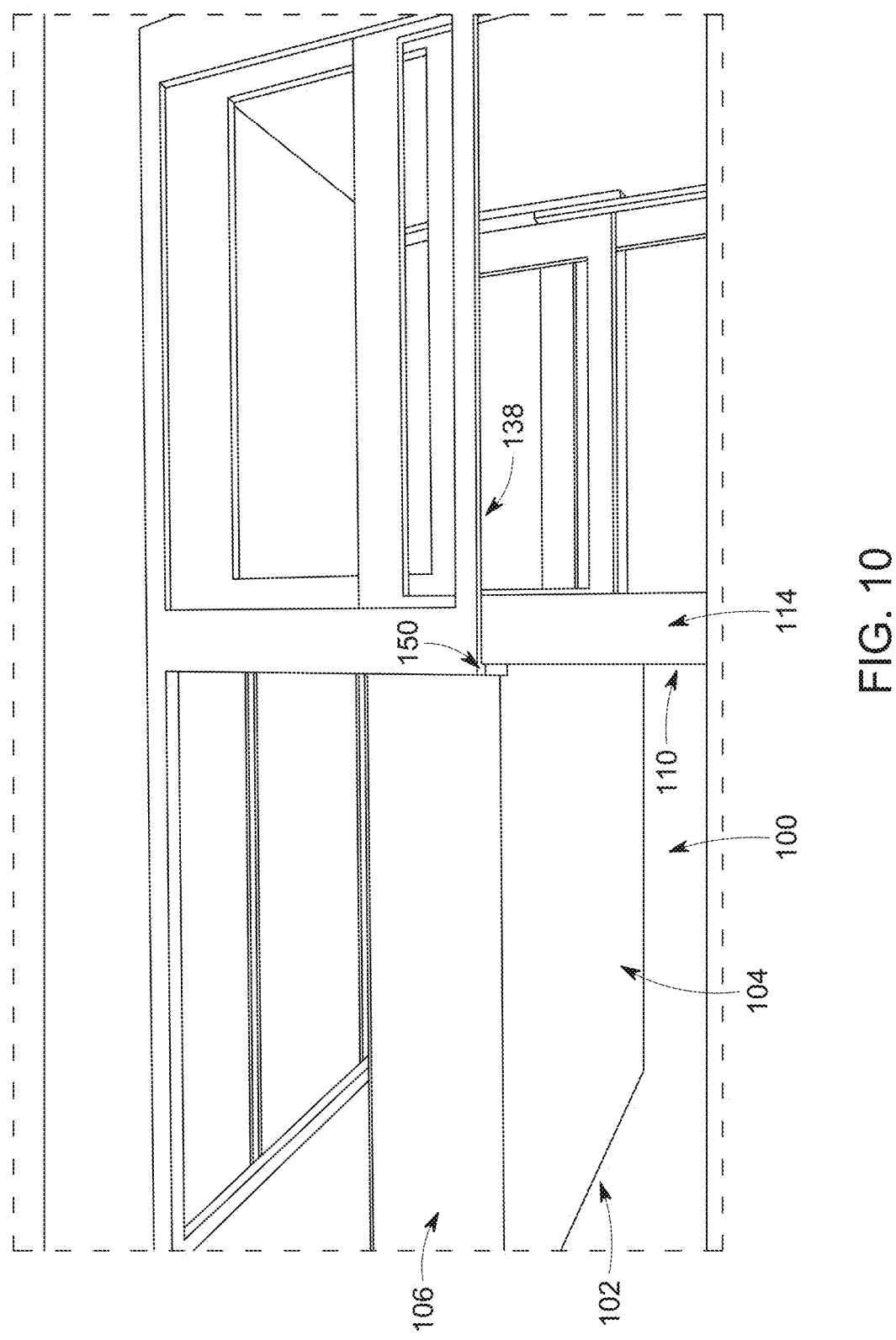
FIG. 10 shows a left perspective view of an edge of the top section in transition of sliding through a gap between a cab-over portion and a bed portion of the bottom section of FIG. 9.

This gap is closed by vertical edges 150 that may exist on the left front and right front corners of bed portion 146 of top section 138, as shown in FIGS. 1, 2, 7, 8, and 9. Edges 150, with or without a seal on them, may form a weather-tight joint between walls 148 of top section 138 and walls 126 of middle section 124 when camper 1 is in an expanded position for use. When camper 1 is in a collapsed position for storage or transit or when top section 138 is in transition of sliding upward or downward over bottom section 100, edges 150 in top section 138 may slide in between a small gap that may exist on the exterior left and right sides between cab-over portion 102 and bed portion 110 of bottom section 100 (i.e., a gap may exist between walls 106 in cab-over portion 102 and walls 114 in bed portion 110 along their exterior surfaces and the gap may be an indentation in floor 104 on both the left and right sides of bottom section 100, to allow edge 150 of top section 138 to slide in between them) as shown in FIGS. 3, 4, 5, and 9, and in a close-up, left side view in FIG. 10 (the same gap would exist on the right side, as mentioned).

Edges 150 in top section 138 would also form a weather-tight vertical joint between top section 138 and bottom section 100, when camper 1 is in a closed or collapsed position, as shown in FIGS. 3 and 4 (i.e., since walls 148 of top section 138 exist on three sides (i.e., the left, right, and rear sides), edges 150 of top section 138, with or without a seal, may form a vertical, weather-tight joint between walls 114 in bed portion 110 of bottom section 100, as shown in a front, right view in FIG. 4).

As further shown in FIG. 5, portion 102 has an interior width that is slightly less wide than the interior width of portion 110 yet has an exterior width that is slightly greater than the exterior width of portion 110. As shown in FIG. 5, the interior side of the left and right sides of walls 106 in cab-over portion 102 is further inward than the interior side of the left and right sides of walls 114 in bed portion 110 of bottom section 100. And as also shown in FIG. 5, this configuration allows raised edge 108 to be offset toward the inner sides of walls 106.

This configuration allows raised edge 108 to line up with a bottom edge of middle section 124. Because middle section 124 has a narrower width and shorter length (as shown in FIGS. 1, 2, and 9) so that it may nest inside bed portion 110 of bottom section 100 (as shown in FIG. 9) when camper 1 is in a closed position for storage or transit, or partially nested when the sections are in transition (i.e., middle section 124 is narrower and shorter than bed portion 110 of bottom section 100), walls 106 in cab-over portion 102 of bottom section 100 have narrower inner sides (i.e., the interior width and length of cab-over portion 102 formed by the left, right, and front interior sides of walls 106 is narrower and shorter, respectively) such that raised edge 108 (as shown in FIG. 5), running along the top (i.e., along the left, right and front sides) of walls 106 is offset towards the inside, such that it may line up with edge 128 (as shown in FIGS. 6, 8, and 9) running along the bottom (i.e., along the left, right, and front sides) of walls 126 of middle section 124, when camper 1 is configured for use (as shown in FIGS. 1 and 2). And since walls 114 in bed portion 110 of bottom section 100 nests within walls 148 of bed portion 146 in top section 138, when camper 1 is in a stored or collapsed position, as shown in FIGS. 3 and 4, or when the sections are in transition, as shown in FIG. 9, walls 114 may be narrower (i.e., the exterior width from the left to right sides formed by walls 114 may be narrower) than walls 148 (i.e., than the interior width from left to right sides formed by walls 148).

However, cab-over portion 142 of top section 138 must also form a weather-tight seal with cab-over portion 102 of bottom section 100, when camper 1 is in a closed or collapsed position, as shown in FIGS. 3 and 4. For this reason, walls 106 of cab-over portion 102 must be wide and long enough on their exterior sides (i.e., the exterior dimensions formed by the left, right, and front exterior sides of walls 106) in the cab-over portion of camper 1, as shown in FIG. 5, to line up with or form a weather-tight joint with dropped edge 144 in cab-over portion 142 of top section 138. As shown in FIG. 5 and described above, walls 106 in cab-over portion 102 of bottom section 100 must have a narrower internal side so that edge raised edge 108 forms a weather-tight joint with bottom edge 128 of middle section 124 and must have a wider external side so that dropped edge 144 in cab-over portion 142 of top section 138 forms a weather tight joint with cab-over portion 102 of bottom section 100.

Dropped edge 144 in top section 138 can either fully overlap raised edge 108 in cab-over portion 102 of bottom section 100 or a portion of it can be on top of raised edge 108 while a portion overlaps it when camper 1 is in a closed or collapsed configuration, as shown in FIGS. 3 and 4, and, similarly, dropped edge 144 can either fully overlap a top edge of walls 126 of middle section 124 or a portion of it can be on top of a top edge of walls 126 while a portion overlaps it when camper 1 is in an expanded position, as shown in FIGS. 1 and 2. If the top edges fully overlap the bottom edges or partially overlap the bottom edges, whether seals between the edges exist or not, each joint (i.e., the joint between the top and bottom sections, the top and middle sections, or the middle and bottom sections) can be configured to be weather-tight, water-tight, and capable of preventing insects from entering, creating a fully enclosed camper on a pickup truck in both closed or collapsed, or open or expanded positions.

Camper 1 may be configured to open and/or close manually, mechanically with or without manual assistance, or automatically by a powered means. Top section 138 (along with middle section 124) may be pushed up manually, and/or pulled down manually and/or by gravity to facilitate expanding and/or collapsing of camper 1. Similarly, middle section 124 may be pushed out and/or pulled in manually to facilitate expanding and/or collapsing of camper 1. For example, a person standing inside the bed portion of camper 1 (or from outside) may be able to manually expand camper 1 for use or manually collapse it for storage or transit. Alternatively, camper 1 may contain gas springs or gas struts that may be attached to or near the interior or exterior corners of bed portion 146 in top section 138 on one of their ends and attached to or pressing against some object that does not move when section 138 moves, such as bottom section 100 or a pickup bed, on the other of their ends such that when they are extended or released and allowed to extend, top section 138 (together with middle section 124) may be pushed upward mechanically and pulled downward manually and/or by gravity to facilitate expanding and/or collapsing of camper 1. Similarly, middle section 124 may also be attached to gas struts or gas springs (e.g., that are fixed on one end to a portion of middle section 124 and fixed to or pressing against another object, such as a portion of top section 138, that will not move as middle section 124 moves) that, when extended or released and allowed to extend, may cause middle section 124 to be mechanically pushed outward to facilitate expanding of camper 1 and may be manually pulled inward to facilitate collapsing of camper 1; or the gas springs or struts may mechanically pull middle section 124 inward to facilitate collapsing of camper 1, which may be manually pushed outward to facilitate expanding of camper 1.

Camper 1 may also be expanded and/or collapsed by powered means, such as by powered linear actuators in place of gas struts or gas springs that may be capable of moving top section 138 (along with middle section 124) upward and/or downward, and/or middle section 124 outward and/or inward to facilitate expanding and/or collapsing of camper 1. Other methods of moving top section 138 upward and/or downward and/or moving middle section outward and/or inward to facilitate expanding and/or collapsing of camper 1 may be used such as cables (powered or manual), levers (powered or manual), hydraulics, or other methods, or combinations of methods.

The main sections of camper 1 (i.e., the bottom section 100, middle section 124, and top section 138) may be latched to each other in either expanded or collapsed positions to prevent unwanted movement. Top section 138 may be latched to bottom section 100, either on the interior or exterior of cab-over portions 142 and 102, respectively, and/or on the interior or exterior of bed portions 146 and 110, respectively, when camper 1 is in a closed or collapsed position. When camper 1 is in an expanded position, bed portion 146 of top section 138 may be latched to bed portion 110 of bottom section 100 (e.g., at a higher location than where portion 146 is latched to portion 110 for collapsing of camper 1) and middle section 124 may be latched to cab-over portion 102 of bottom section 100.

Latching, if necessary, may be manual, manual with mechanical assistance, spring-loaded, automatic, and/or powered. If top section 138 is latched to bottom section 100 when camper 1 is in a collapsed position, to expand camper 1 for use top section 138 may be unlatched fully from bottom section 100, so that it and middle section 124 may telescope or move upward. If middle section 124 is latched in its stored position (e.g., at the most rearward position inside top section 138), then it may be unlatched so that it may slide to its most forward position. Then middle section 124 (after sections 124 and 138 are lowered slightly to close any gap with section 100) may be latched to cab-over portion 102 of bottom section 100 and bed portion 146 of top section 138 may be relatched to bed-portion 110 of bottom section 100 (e.g., except at a higher position) to complete expansion of camper 1, if latching is at all necessary (e.g., if powered linear actuators are used for expanding and collapsing camper 1 they may be able to move top section 138 together with middle section 124 down slightly so that they form tight, secure joints with bottom section 100 that may not require latching when camper 1 is in an expanded position).

Figure 11:
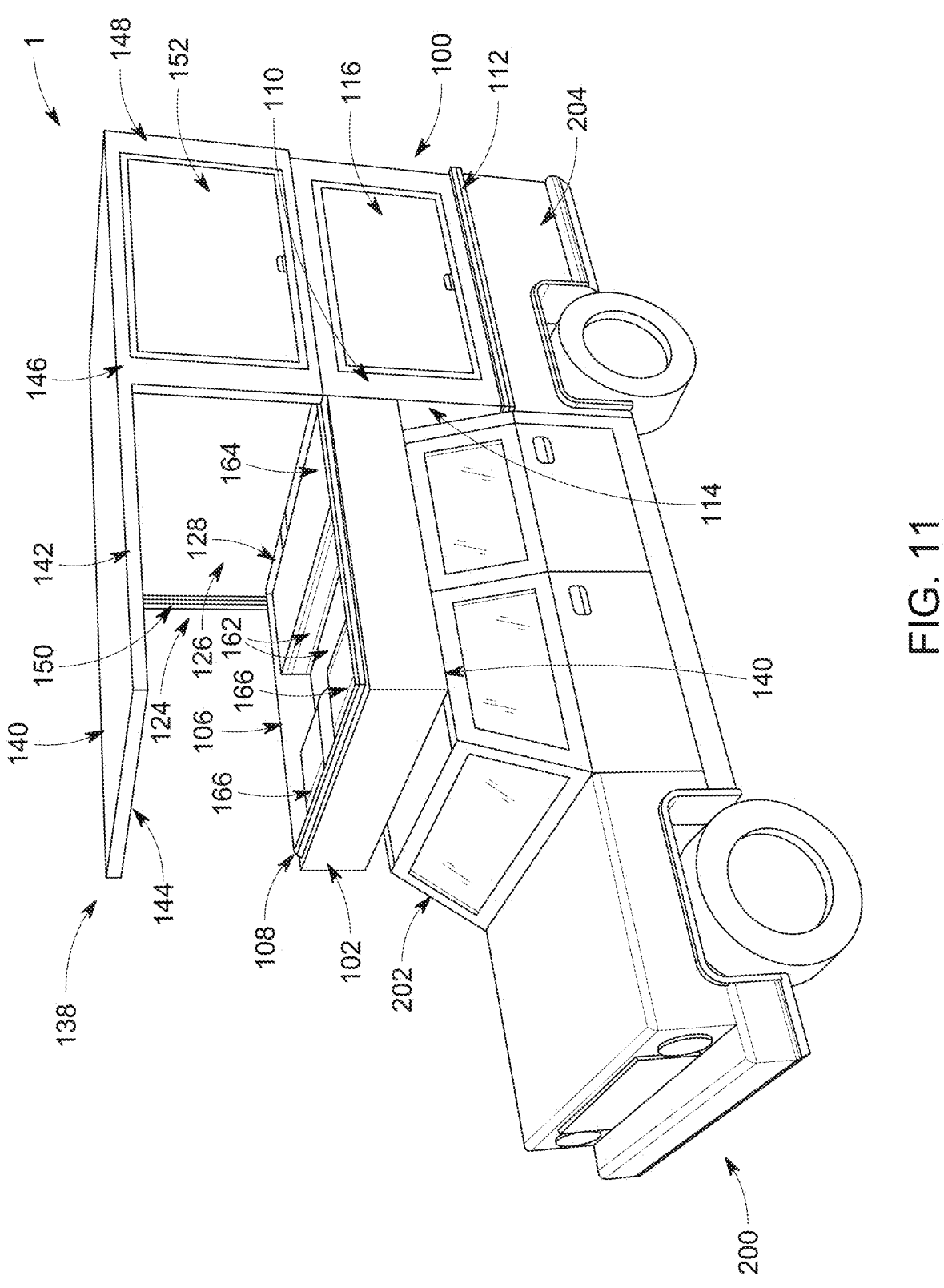
FIG. 11 shows a perspective view of the exemplary campers and trucks of FIGS. 3 and 4, with the camper being in a first transition from a collapsed configuration to an expanded configuration and/or of the exemplary campers and trucks of FIGS. 1 and 2, with the camper being in a third transition from an expanded configuration to a collapsed configuration.

If some or all the sections of camper 1 (i.e., top section 138, middle section 124, and bottom section 100) contain latches or portions of latches or are latched when camper 1 is in closed position, they may first be unlatched to expand camper 1. FIG. 11 shows camper 1 in a first transition from a closed or collapsed configuration (as shown previously in FIGS. 3 and 4) with middle section 124 and top section 138 moved or telescoped together fully upward to their highest positions. As shown in FIG. 11, cab-over portion 142 of top section 138 fully separates from cab-over portion 102 of bottom section 100 while bed portion 146 of top section 138 remains connected to and overlapped with bed portion 110 of bottom section 100 (i.e., a bottom edge of portion 146 continues to overlap a top edge of portion 110, continuing to maintain a weather-tight joint between the bed portions of top section 138 and bottom section 100). As further shown in FIG. 11 (and previously shown empty in FIG. 5), the area bounded by floor 104 and walls 106 in cab-over portion 102 of bottom section 100 may provide an area for storage of bedding such as: mattress 162, which may be foldable, as shown, (e.g., if the cab-over portion 102 is not long enough to store a full-length mattress, then having a foldable mattress may be necessary); mattress platform 164, which may be a rigid platform capable of supporting the extended, unfolded mattress (as later shown in FIG. 14); and pillows 166.

Figure 12:
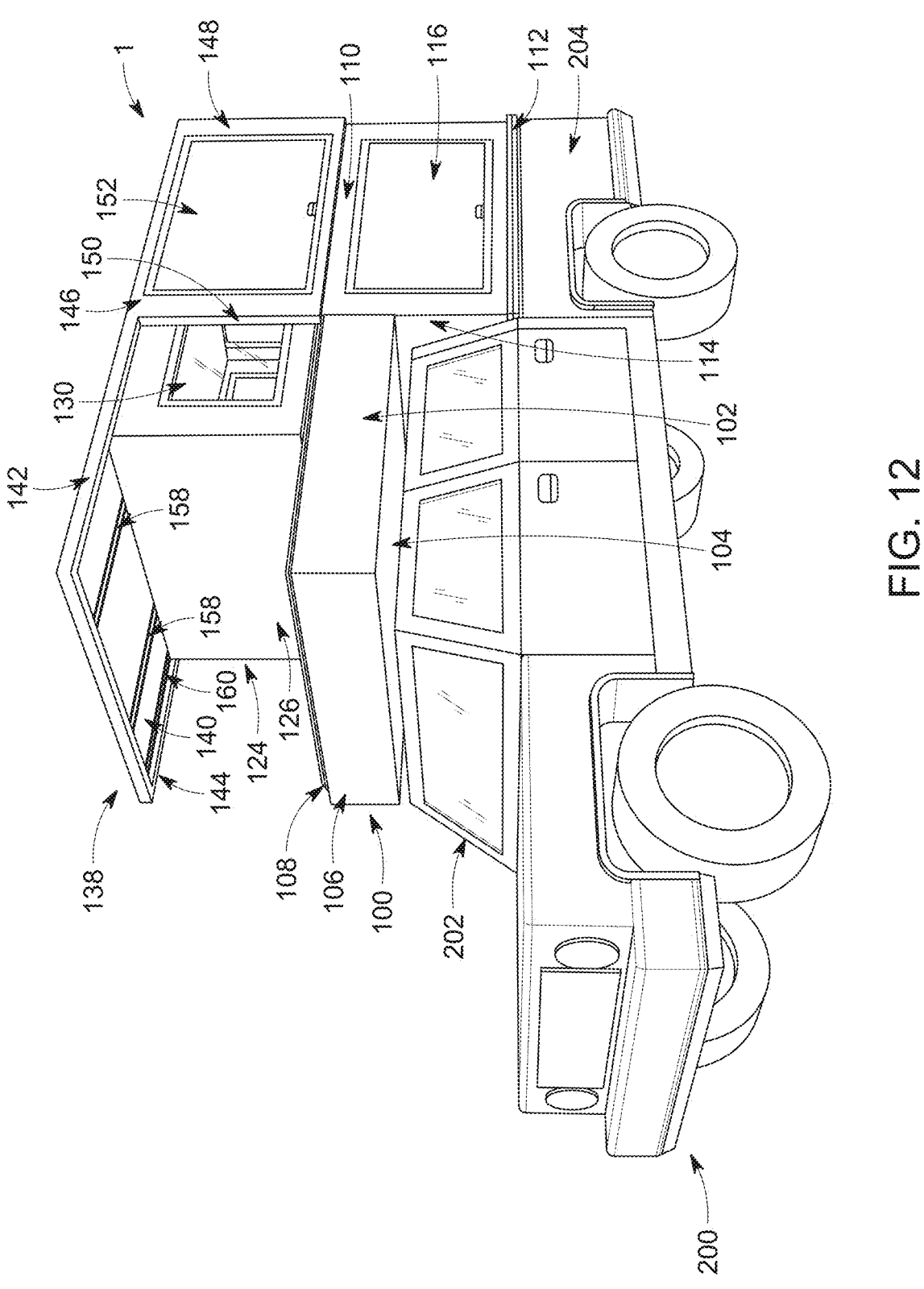
FIG. 12 shows a perspective view of the exemplary campers and trucks of FIGS. 3 and 4, with the camper being in a second transition from a collapsed configuration to an expanded configuration and/or of the exemplary campers and trucks of FIGS. 1 and 2, with the camper being in a second transition from an expanded configuration to a collapsed configuration.
Figure 13:
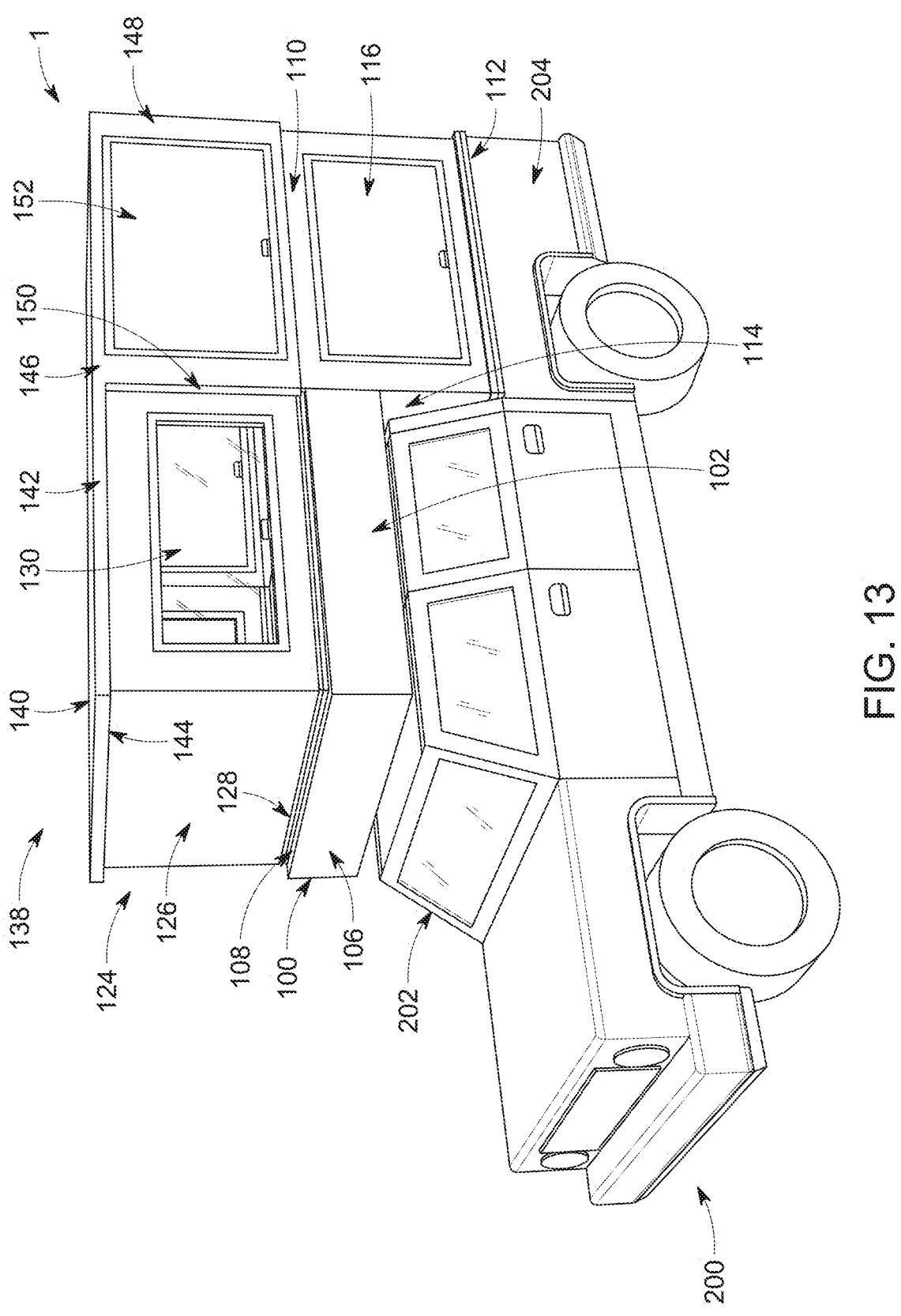
FIG. 13 shows a perspective view of the exemplary campers and trucks of FIGS. 3 and 4, with the camper being in a third transition from a collapsed configuration to an expanded configuration and/or of the exemplary campers and trucks of FIGS. 1 and 2, with the camper being in a first transition from an expanded configuration to a collapsed configuration.

With top section 138 along with middle section 124, in their highest position, as shown in FIG. 11, middle section 124 may telescope horizontally (i.e., outward or in a forward direction), over cab-over portion 102 of bottom section 100, clearing walls 106 and any items stored in cab-over portion 102. FIG. 12 shows camper 1 in a second transition from a collapsed position to an expanded position, with middle section 124 in transition of telescoping horizontally (i.e., outward or in a forward direction) from the bed portion of camper 1 to the cab-over portion of camper 1 along tracks 158 and 160 in roof 140 of top section 138. FIG. 13 shows camper 1 in a third transition from a collapsed configuration to an expanded configuration with middle section 124 in its furthest forward position and still at its highest position.

As shown in FIG. 13, with top section 138 and middle section 124 still at their highest positions, there may exist a small gap between bottom edge 128 on walls 126 of middle section 124 and raised edge 108 on walls 106 in cab-over portion 102 of bottom section 100. As a last step to transition the major sections of camper 1 to a fully expanded position for use, top section 138 together with middle section 124 may lower slightly so that edge 128 on walls 126 in middle section 124 can connect with, join with, or touch raised edge 108 on walls 106 in cab-over portion 102 in bottom section 100, such that the joint between middle section 124 and bottom section 100 is fully closed, as shown in FIGS. 1 and 2. Middle section 124 and/or top section 138 may then be latched, if necessary and if latches or portions of latches exist in some or all sections, to bottom section 100 to ensure a tight fit between sections when camper 1 is expanded for use.

Figure 14:
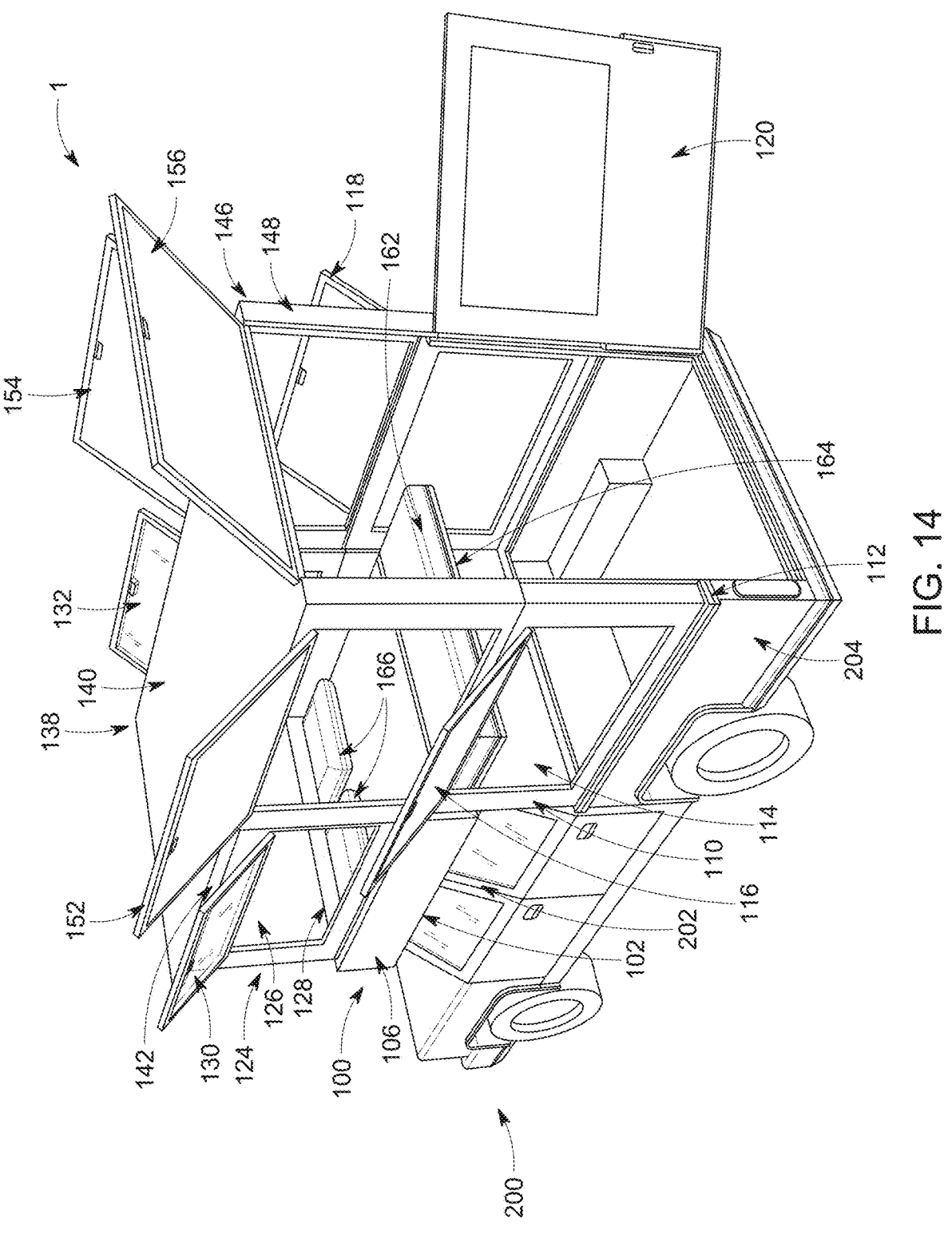
FIG. 14 shows a perspective view of the exemplary camper and truck of FIG. 1 with certain doors and windows of the camper in an open configuration.

As shown in FIG. 14, with camper 1 in a fully expanded position for use, mattress platform 164 may be repositioned (e.g., by resting on or attaching to support brackets, straps, hooks, notches, or other support mechanism that may exist on walls 114 in bed portion 110 of bottom section 100) so that mattress 162 may be unfolded, if necessary, from its stored position. In this position, a bed comprised of mattress 162, platform 164, and pillows 166 may now be used. With top section 138 and middle section 124 in their expanded positions (i.e., top section 138 and middle section 124 are telescoped upward and middle section 124 is telescoped outward, then lowered slightly to connect with bottom section 100) when camper 1 is positioned for use, there may now exist enough headroom in the cab-over portion of camper 1 for sleeping, sitting, and possibly standing (e.g., on mattress 162), and in the bed portion for sleeping, sitting, and standing (e.g., by a person sleeping, sitting, or standing on a mattress or seating in bed 204 and/or directly on bed 204 of exemplary truck 200), as shown in FIG. 14.

FIG. 14 further shows how door 120 in bed portion 110 of bottom section 100 and opening 156 in bed portion 146 of top section 138 may, together, be opened to gain full-height access to camper 1 and/or to ventilate camper 1. Or opening 156 may alone be opened while door 120 remains closed however, opening 156 may have to be opened to open door 120 since opening 156 may overlap door 120 when the doors and/or openings are closed in either expanded (i.e., a bottom edge of opening 156 may overlap a top edge of door 120, as shown previously in FIG. 1) or collapsed (i.e., opening 156 may substantially overlap door 120, as previously shown in FIG. 3) positions maintaining a weather-tight joint between the openings in both positions. And openings 116 and 118 in bed portion 110 of bottom section 100, openings 130 and 132 of middle section 124, and openings 152 and 154 in bed portion 146 of top section 138 may further be used to gain access to the sides of camper 1 and/or bed 204 of exemplary truck 200 and/or to ventilate camper 1, as shown in FIG. 14.

To close camper 1 for storage or transit, the reverse of the steps described above may be used and FIGS. 11-13 depicting camper 1 in transition from a collapsed position to an expanded position may also depict camper 1 in transition from an expanded position to a collapsed position in reverse order of the figures shown and as described below. If latches or portions of latches exist and are latched in some or all sections of camper 1, when camper 1 is in an expanded position, then those latches may be unlatched, if necessary. With camper 1 in a fully expanded position as shown in FIGS. 1 and 2, mattress 162 may be folded, if necessary, mattress platform 164 may be repositioned for storage, and pillows 166 may be left in place (as those components were previously shown stored in cab-over portion 102 of bottom section 100 in FIG. 11). In a first transition (e.g., of the major sections) of camper 1 from an expanded position for use to a collapsed position for storage and/or transit, top section 138 together with middle section 124 may be raised or lifted slightly to their highest positions to separate bottom edge 128 on walls 126 of middle section 124 from raised edge 108 on walls 106 in cab-over portion 102 of bottom section 100, such that there now exists a gap between sections 124 and 100, as shown in FIG. 13.

Next, middle section 124 may be retracted, pushed or pulled in a backward direction, or slid into top section 138 along tracks 158 and 160 in roof 140 of top section 138, clearing walls 106 in cab-over portion 102 of bottom section 100 and any items stored in cab-over portion 102, as shown in transition in FIG. 12. When middle section 124 is in its furthest retracted or backward position, as shown in FIG. 11, it and top section 138, together, may be lowered until they are in their lowest positions and camper 1 is in a collapsed position, as shown in FIGS. 3 and 4. Portions 142 and 146 of top section 138 may then be latched to portions 102 and 110, respectively, of bottom section 100, if latches or portions of latches exist, are latched, and if necessary, to secure camper 1 in a collapsed position for storage and/or transit.

With camper 1 in a collapsed position, the bed portion of camper 1 or bed 204 of exemplary truck 200 may be accessed from the sides by opening the openings on the sides of each of the major sections (i.e., top section 138, bottom section 100, and middle section 124), which may be in alignment on each side. For example, and as shown in FIG. 15, on the left side of camper 1, opening 130 may be in alignment with and smaller than opening 116 which may be in alignment with and smaller than opening 152, such that when all three openings are opened, the bed portion of camper 1 or bed 204 of exemplary truck 200 may be accessed from the left side.

Figure 15:
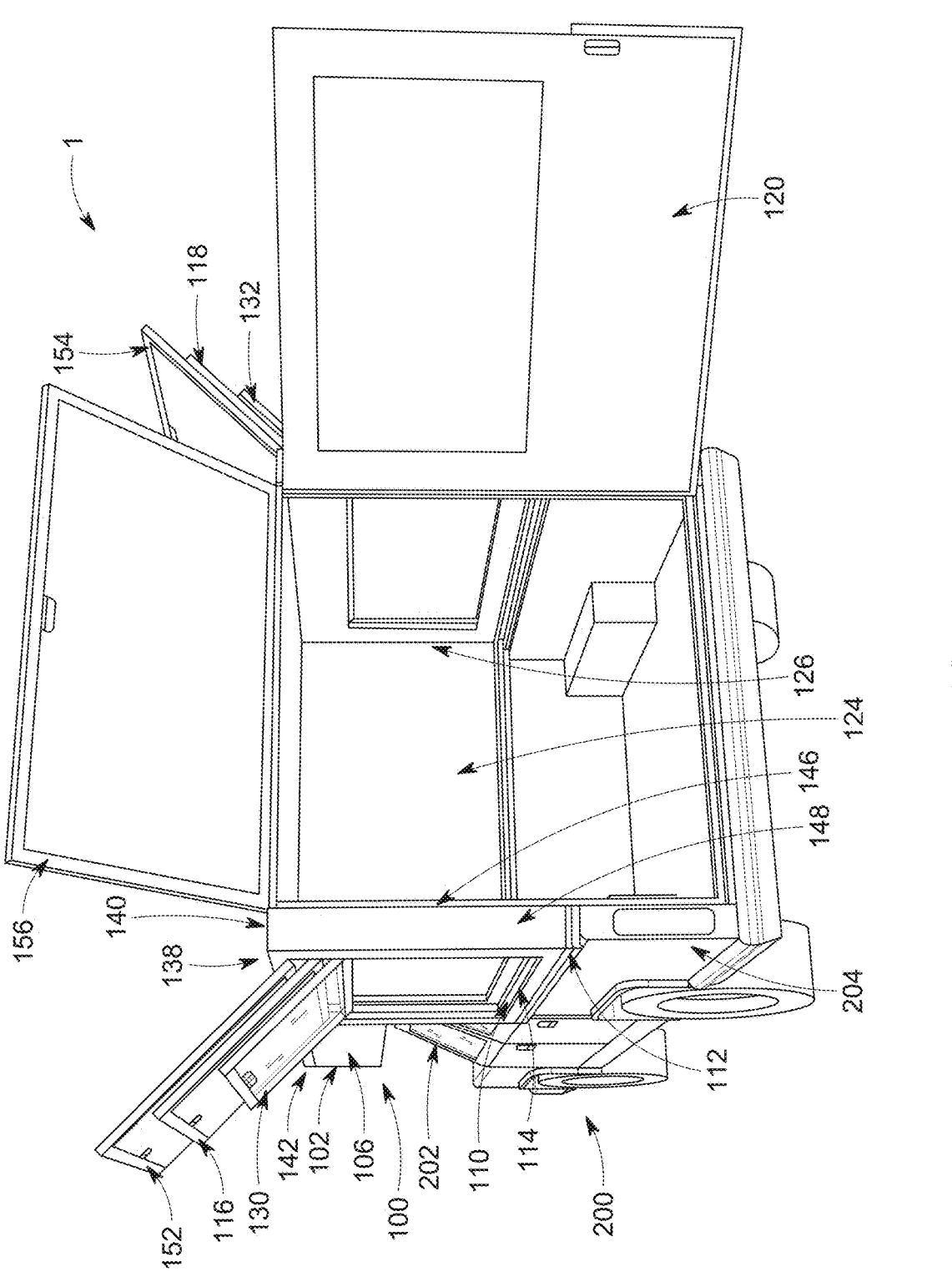
FIG. 15 shows a perspective view of the exemplary camper and truck of FIG. 3 with certain doors and windows of the camper in an open configuration.

Similarly, and as also shown in FIG. 15, on the right side of camper 1, opening 132 may be in alignment with and smaller than opening 118 which may be in alignment with and smaller than opening 154, such that when all three openings are opened, the bed portion of camper 1 or bed 204 of exemplary truck 200 may be accessed from the right side. The rear of camper 1 or bed 204 of exemplary truck 200 may be accessed by opening both rear openings. For example, opening 156 may first be opened to gain access to door 120, which may then be opened to gain access to the bed portion of camper 1 or bed 204 of exemplary truck 200, as also shown in FIG. 15.

Camper 1 may be configured to be modular so as to contain various attachable and/or detachable components or attachments for various installation types (e.g., on pickup trucks with or without tailgates, or for slide-in applications); for fitment (e.g., to account for slight variations in dimensions and/or other various features) on various makes, models, and years of pickup trucks with the same nominal bed length (e.g., 4 foot, 4.5 foot, 5 foot, 5.5 foot, 6 foot, 6.5 foot, 7 foot, or 8 foot beds) and in the same category of pickup truck (e.g., compact, mid-size, or full-size pickup trucks); or for attachment to other types of trucks such as flatbed trucks, or chassis-cab trucks.

Camper 1 may be fitted with long rear door 120, as shown previously in FIGS. 1, 3, 5, 14, and 15; short rear door 122, as described in detail below and shown in FIGS. 16-24; or no rear door attached to bottom section 100 since a rear door may be an integrated component of another section or attachment (i.e., door 176 in attachment 172 shown in FIGS. 25-28, door 182 in attachment 180 shown in FIGS. 29-32, and door 188 in attachment 184 shown in FIG. 33-36), as explained in further detail below. Attachments configured to fit between bottom section 100 of camper 1 and a truck that may be used to connect camper 1 to various trucks (i.e., attachment 168 of FIGS. 19-21, attachment 170 of FIGS. 22-24, attachment 172 of FIGS. 25-28, attachment 178 of FIGS. 29-32, and attachment 184 of FIGS. 33-36) may be interchangeable or swappable because their upper surfaces, sides, or portions may be configured to be the same or similar such that they may each fit into, be attachable to, or connect with a portion of bottom section 100 such as flange 112, walls 114, and/or another portion of bottom section 100 for campers of a similar length and width (i.e., camper 1 in its bed portion my interface with the various attachments configured to be used with a camper 1 of that size), as described below. The attachments' lower surfaces, sides, or portions that may interface with a truck, however, may be configured differently for different trucks and/or different purposes as described below.

Figure 16:
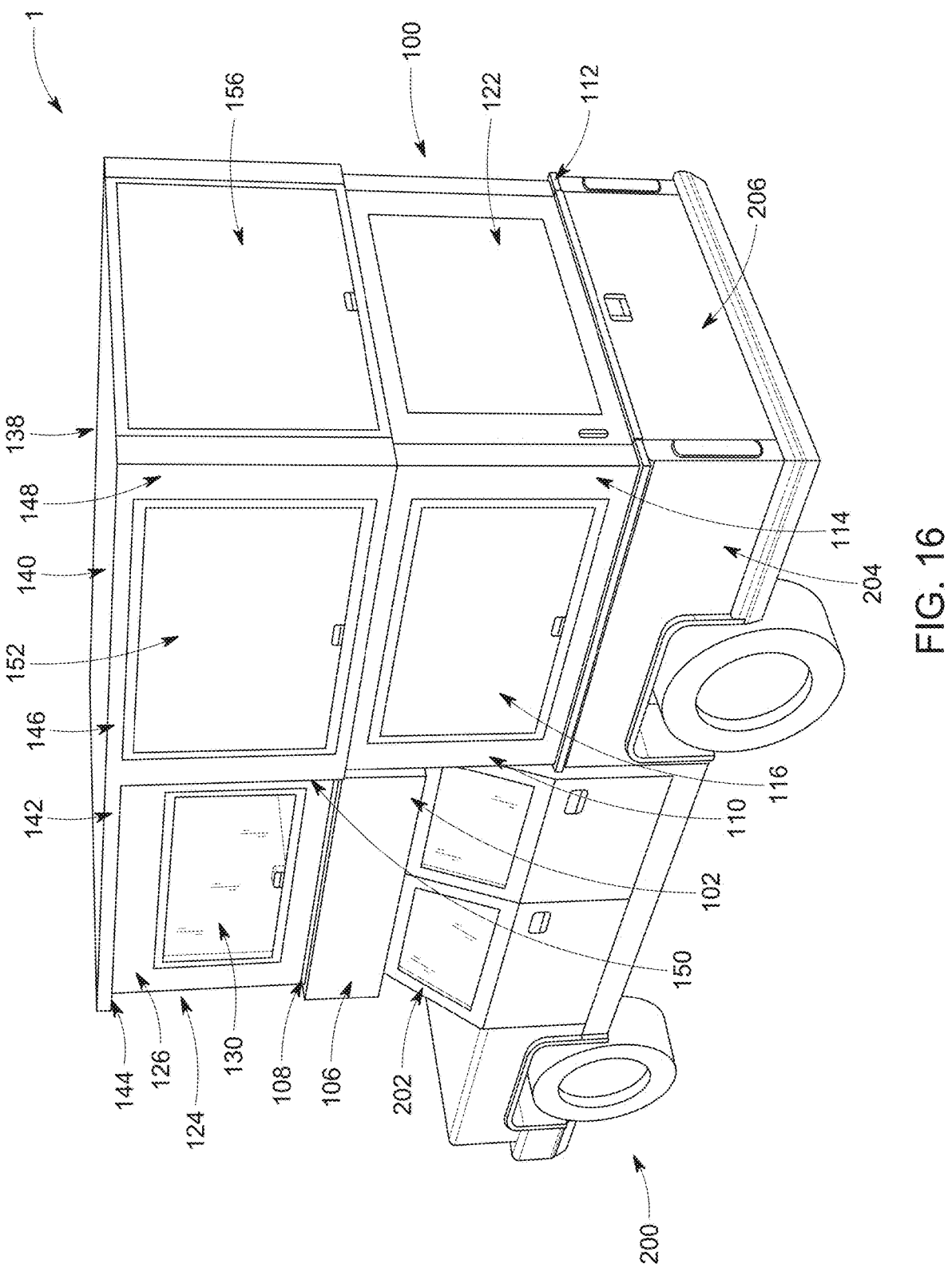
FIG. 16 shows a perspective view the exemplary camper of FIG. 1 configured to be used with a short rear door on an exemplary pickup truck with a tailgate.

As mentioned above, camper 1 may optionally be configured to have a short rear door for use with a pickup truck that may retain its original tailgate. As shown in FIG. 16, exemplary truck 200 with bed 204 is configured to contain tailgate 206. As further shown in FIG. 16, bed portion 110 in bottom section 100 of camper 1 may be configured with a short rear door, door 122, which may be compatible with factory tailgate, tailgate 206, of exemplary truck 200. A bottom edge of short rear door 122, may overlap a top edge of tailgate 206 to create a weather-tight joint between the door and tailgate, similar to how many rear doors, hatches, or openings of many existing truck caps, canopies, toppers, camper shells, or campers designed to be used with pickups that have retained their factory tailgates may overlap those tailgates slightly.

Figure 17:
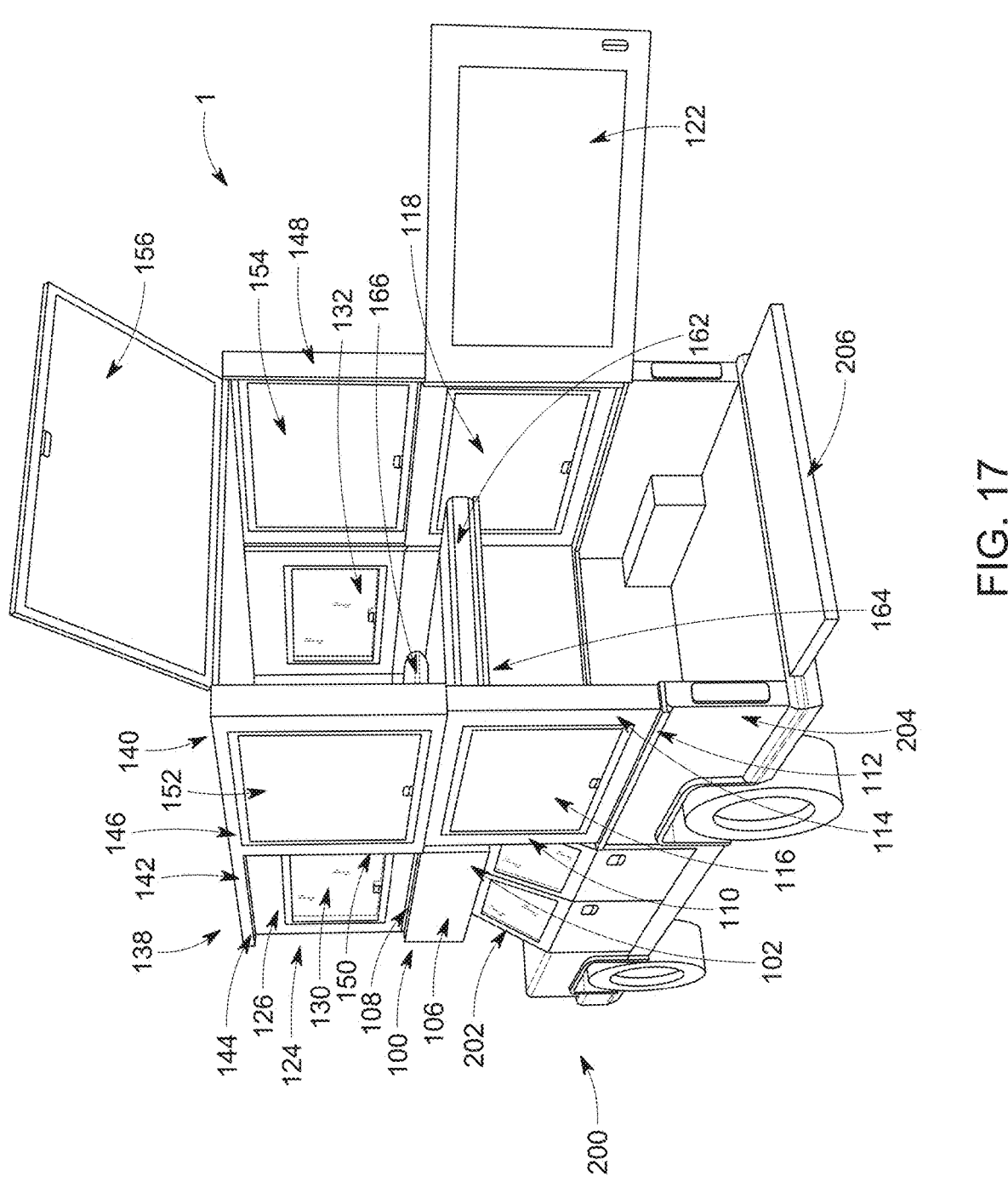
FIG. 17 shows a perspective view of the exemplary camper and truck of FIG. 16 with the rear doors of the camper in an open position and the tailgate of the truck in open position.
Figure 18:
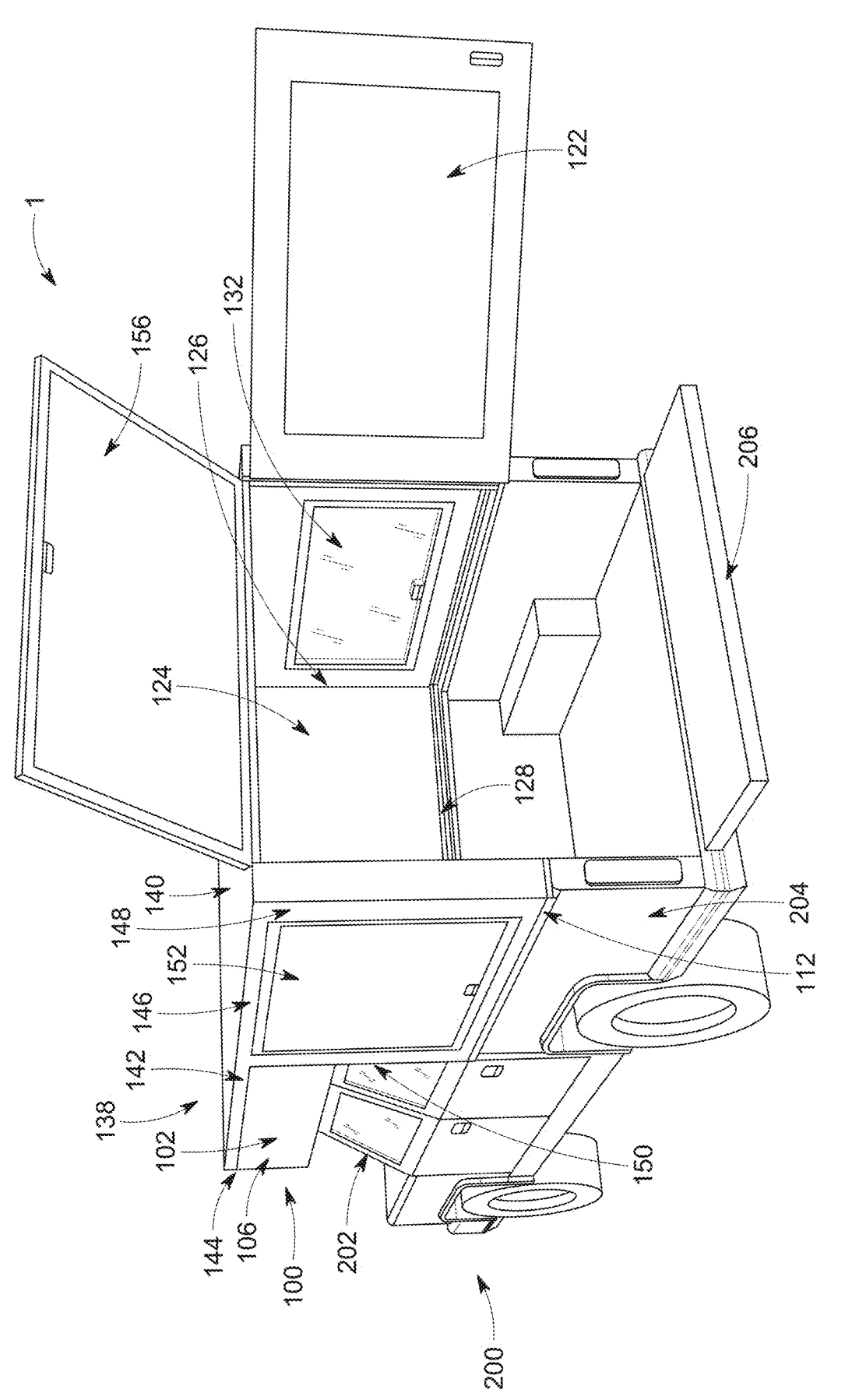
FIG. 18 show a perspective view of the exemplary camper and truck of FIG. 17 in a collapsed configuration.

To access the rear of camper 1 and/or the rear of bed 204 of exemplary truck 200, first opening 156 in top section 138 may be opened (because it may overlap the joint between it and door 122 of bottom section 100), then door 122 of bottom section 100 may be opened, lastly tailgate 206 of exemplary truck 200 may be lowered or opened, as shown in FIG. 17. To access the rear of camper 1 and/or the rear of bed 204 of exemplary truck 200 when camper 1 is in a collapsed position, as shown in FIG. 18, opening 156 may first be opened, door 122 may next be opened, then tailgate 206 of exemplary truck 200 may lastly be lowered or opened.

As mentioned above, camper 1 may contain attachments for fitment (e.g., to account for slight variations in dimensions and/or other various features) on various makes, models, and years of pickup trucks with the same nominal bed length (e.g., 4 foot, 4.5 foot, 5 foot, 5.5 foot, 6 foot, 6.5 foot, 7 foot, or 8 foot beds) and in the same category of pickup truck (e.g., compact, mid-size, or full-size trucks). Camper 1 may be configured to generally fit trucks in certain categories or classes and nominal bed lengths but may be fitted to specific trucks by use of an adaptor, if necessary. For example, a version of camper 1 may be configured to generally fit all mid-size pickup trucks with a 5-foot bed, a common truck type and length of bed. In this case, camper 1 may be roughly 5 to 5½ feet, or more or less, long and roughly the same width as or slightly greater than most mid-size pickup trucks so that it may be capable of fitting on most trucks in this category and size.

However, camper 1 may be configured to fit each specific make, model, and year of mid-size pickup truck with a 5-foot bed by having an adapter configured to fit each specific pickup truck, if necessary. Camper 1 may be configured with attachment 168, as shown in FIG. 19, which may be an adapter attachment configured to fit a specific make, model, year, and nominal bed length of pickup truck that may run along 3 sides (e.g., left, right, and front sides), and possibly along a 4$^{th}$, rear side (e.g., corresponding to the tailgate side), if necessary.

Figure 19:
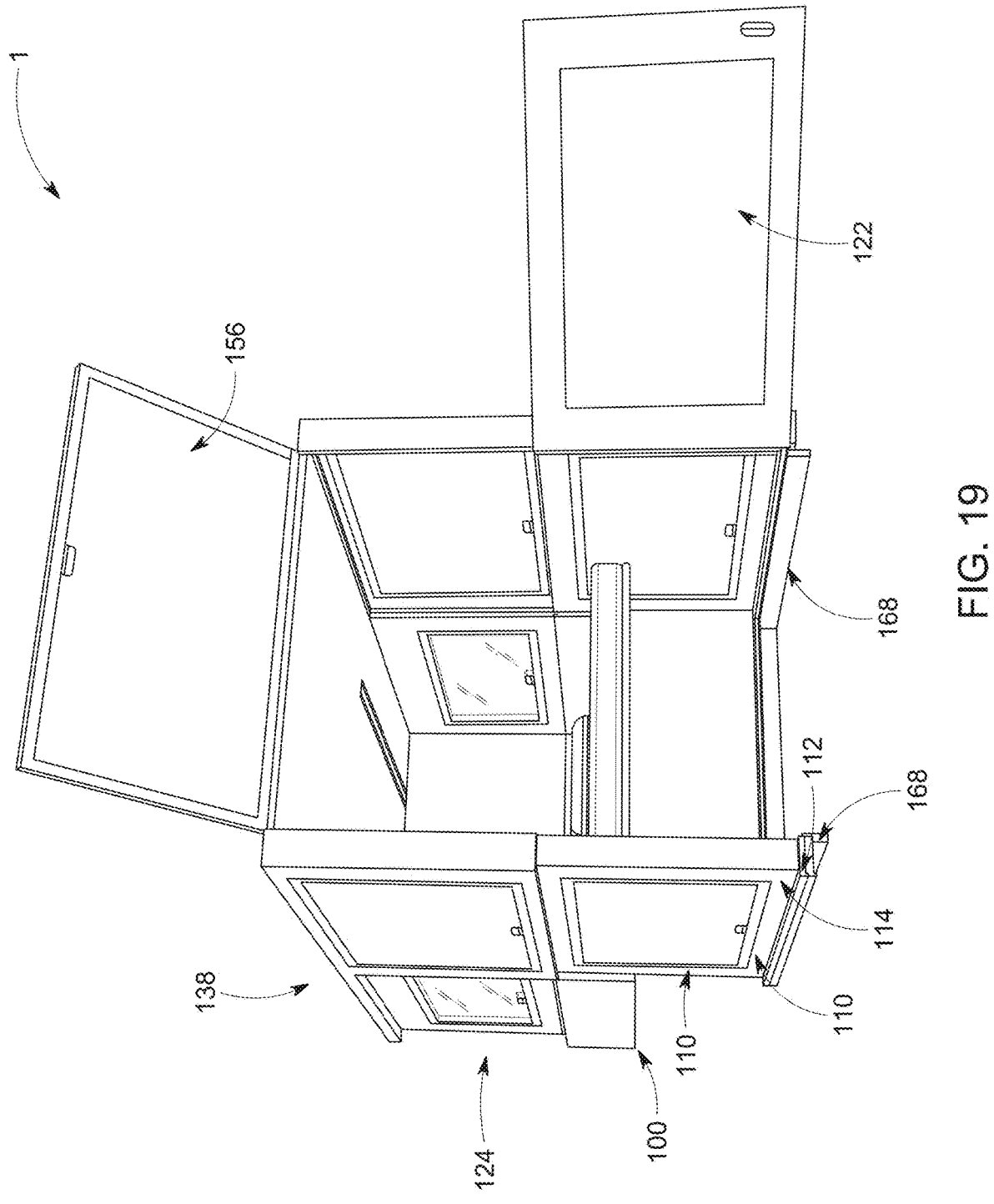
FIG. 19 shows a perspective view of the exemplary camper of FIG. 17 configured to be used with an exemplary bed adapter attachment.

Adapter attachment 168 of camper 1 may contain features on or through its upper surface, side, or portion (e.g., a portion of adapter attachment 168 that may attach to bed portion 110 of bottom section 100) such as raised edges, protrusions, studs, flanges, brackets, supports, holes, hooks, sliders, and/or other features, and/or portions of other features that may correspond to, fit into, and/or attach to recesses, slots, notches, flanges, brackets, supports, holes, hooks, tracks, rails, and/or other features, and/or portions of other features that may exist on flange 112, walls 114, and/or other portions of bed portion 110 of bottom section 100 that may allow bed portion 110 of bottom section 100 to be fastened securely (e.g., by nuts, bolts, threaded inserts, clamps, adhesive, buckles, straps, other fasteners, and/or other fastening mechanisms) to adapter attachment 168, as shown in FIG. 19; and adapter attachment 168 may contain features on or through its lower surface, side, or portion (e.g. a portion of adapter attachment 168 that may attach to a bed of a pickup truck) such as dropped edges, protrusions, studs, flanges, brackets, supports, holes, hooks, sliders, rails, tracks, tie-downs, and/or other features, and/or portions of other features that may correspond to, fit into, and/or attach to specific features on each make, model, year, and nominal bed length of pickup truck that may allow camper 1 by or through adapter attachment 168, if necessary, to be fastened securely (e.g., by nuts, bolts, threaded inserts, clamps, adhesive, buckles, straps, other fasteners, and/or other fastening mechanisms) to a pickup bed.

Attachment 168, configured as an adapter, may be configured to be the same on its upper surface, side, or portion (e.g., a portion of adapter attachment 168 that may attach to some portion of bed portion 110 in bottom section 100) however, its lower surface, side, or portion (e.g., a portion of adapter attachment 168 that may attach to a bed of a pickup) may be configured differently for each specific make, model, year, and nominal bed length of pickup truck to allow camper 1, without any modifications, any major modifications, or other variances, to fit various makes, models, and years of pickup truck with the same nominal bed length.

Figure 20:
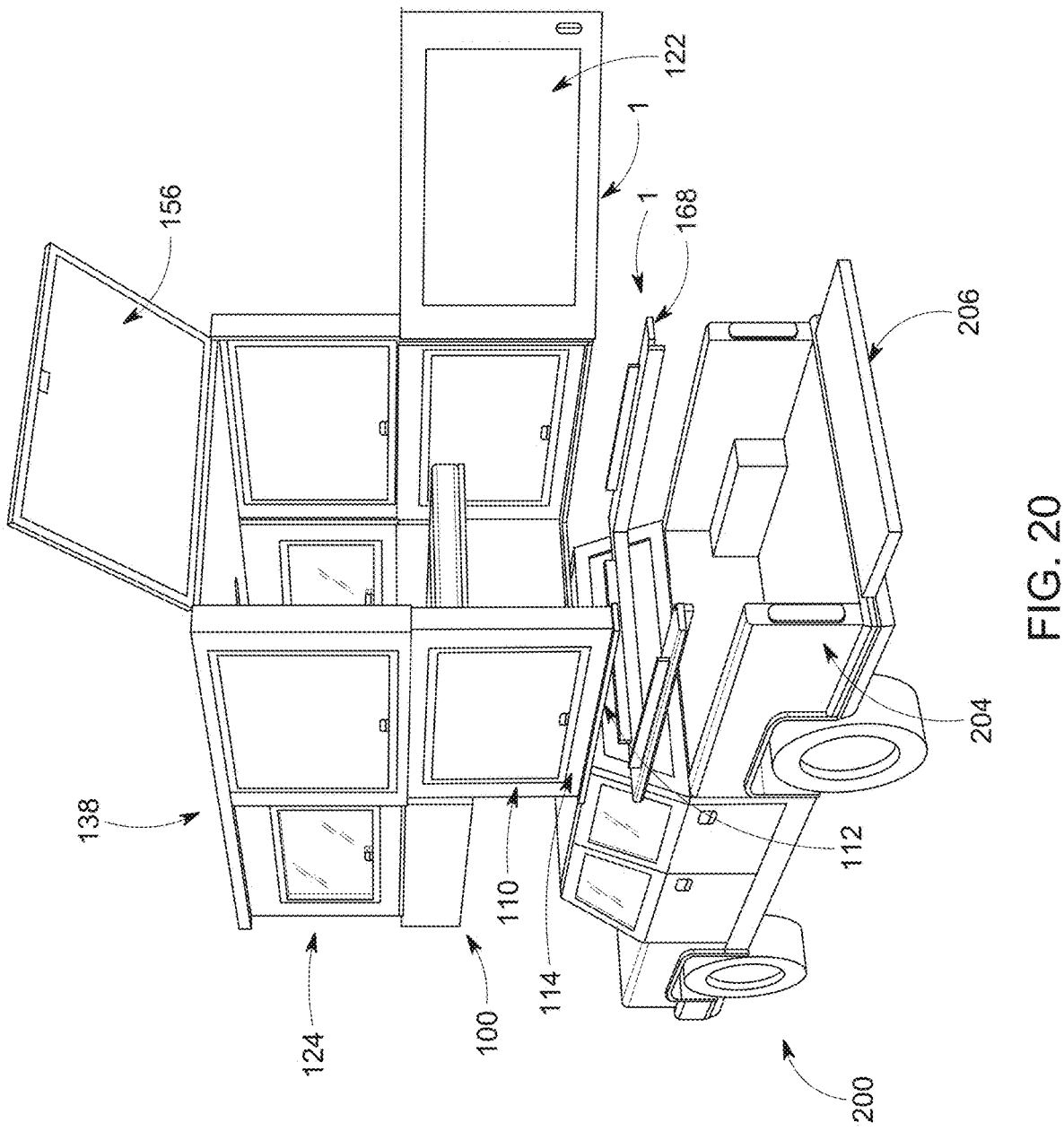
FIG. 20 shows an exploded view of how the exemplary camper of FIG. 19 may be fixed to an exemplary truck.

FIG. 20 shows an exploded view of how adapter attachment 168 may be used to connect bottom section 100 (e.g., to or through flange 112, walls 114, and/or other portions of bed portion 110) to bed 204 of exemplary truck 200.

Figure 21:
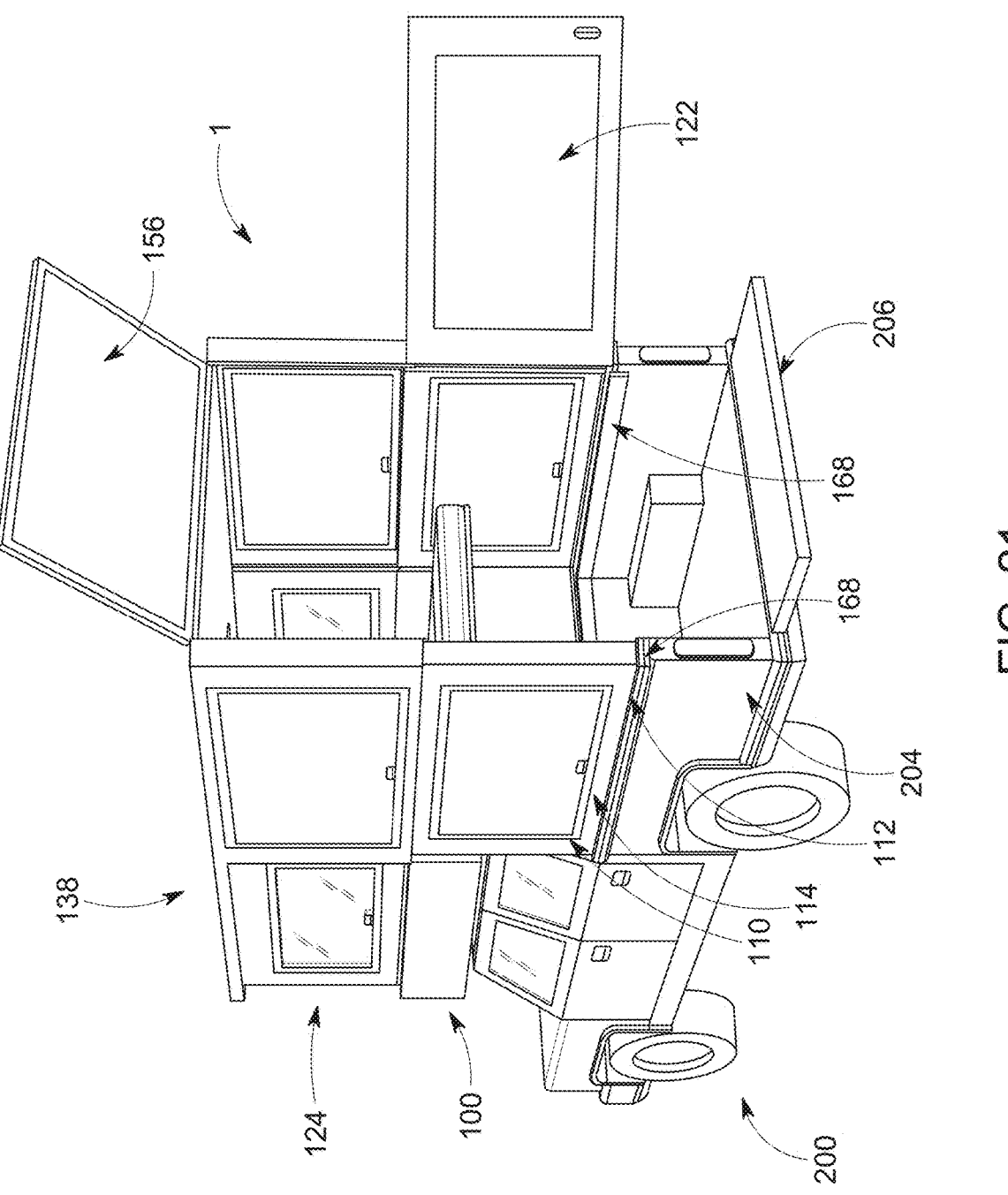
FIG. 21 shows a perspective view of the exemplary camper and truck of FIG. 20 fixed to each other.

FIG. 21 shows bed portion 110 of bottom section 100 of camper 1 connected by adapter attachment 168 to bed 204 of exemplary truck 200. By configuring camper 1 to be longer and/or wider and/or by configuring certain components of camper 1 such as bottom section 100, middle section 124, top section 138, and/or adapter attachment 168 to be longer and/or wider, camper 1 may be made to fit various categories of pickup trucks (e.g., compact, mid-size, or full-size trucks) and/or various nominal bed lengths of pickup trucks (e.g., 4 foot, 4.5 foot, 5 foot, 5.5 foot, 6 foot, 6.5 foot, 7 foot, or 8 foot beds) however, as mentioned, adapter attachment 168 may further be configured to match each specific make, model, and year of pickup in the same category and nominal bed length.

Figure 22:
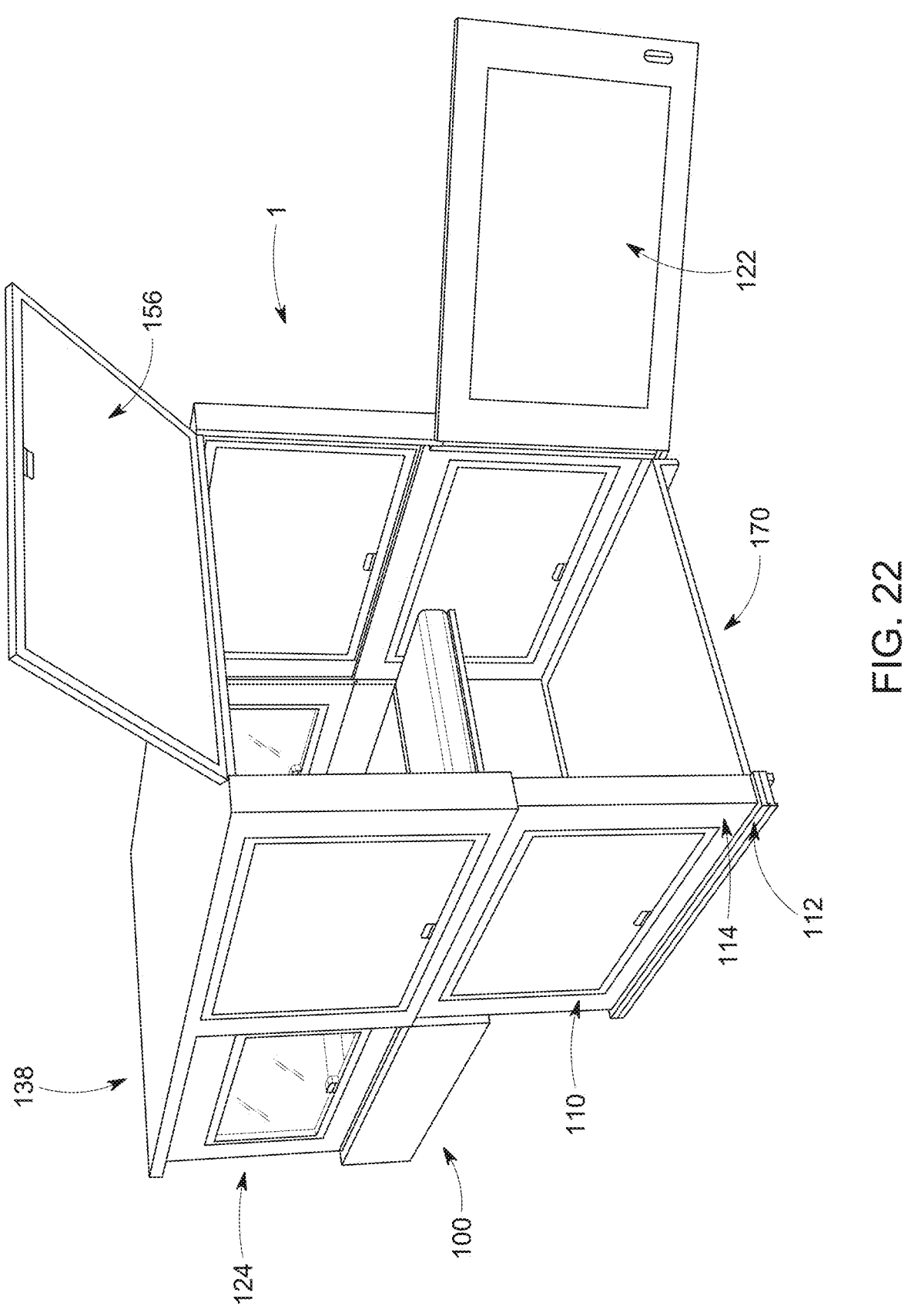
FIG. 22 shows a perspective view of the exemplary camper of FIG. 17 configured to be used with an exemplary floor attachment.

Camper 1 may be configured with short door 122 and attachment 170, which may be configured as a floor attachment that may add a floor (e.g., an elevated floor) to camper 1, as shown in FIG. 22. Floor attachment 170 of camper 1, like adapter attachment 168 mentioned above, may contain features on or through its upper surface, side, or portion (e.g., a portion of floor attachment 170 that may attach to bed portion 110 of bottom section 100) such as raised edges, protrusions, studs, flanges, brackets, supports, holes, hooks, sliders, and/or other features, and/or portions of other features that may correspond to, fit into, and/or attach to recesses, slots, notches, flanges, brackets, supports, holes, hooks, tracks, rails, and/or other features, and/or portions of other features that may exist on flange 112, walls 114, and/or other portions of bed portion 110 of bottom section 100 that may allow bed portion 110 of bottom section 100 to be fastened securely (e.g., by nuts, bolts, threaded inserts, clamps, adhesive, buckles, straps, other fasteners, and/or other fastening mechanisms) to floor attachment 170, as shown in FIG. 22; and floor attachment 170 may contain features on or through its lower surface, side, or portion (e.g. a portion of floor attachment 170 that may attach to a bed of a pickup truck) such as dropped edges, protrusions, studs, flanges, brackets, supports, holes, hooks, sliders, rails, tracks, tic-downs, and/or other features, and/or portions of other features that may correspond to, fit into, and/or attach to specific features on each make, model, year, and nominal bed length of pickup truck that may allow camper 1 by or through floor attachment 170 to be fastened securely (e.g., by nuts, bolts, threaded inserts, buckles, clamps, adhesive, straps, other fasteners, and/or other fastening mechanisms) to a pickup bed. Floor attachment 170 may be configured to be the same on its upper surface, side, or portion (e.g., a portion of floor attachment 170 that may attach to some portion of bed portion 110 in bottom section 100) however, its lower surface, side, or portion (e.g., a portion of floor attachment 170 that may attach to a bed of a pickup) may be configured differently for each specific make, model, year, and nominal bed length of pickup truck to allow camper 1, without any modifications, any major modifications, or other variances, to fit various makes, models, and years of pickup truck with the same nominal bed length.

Figure 23:
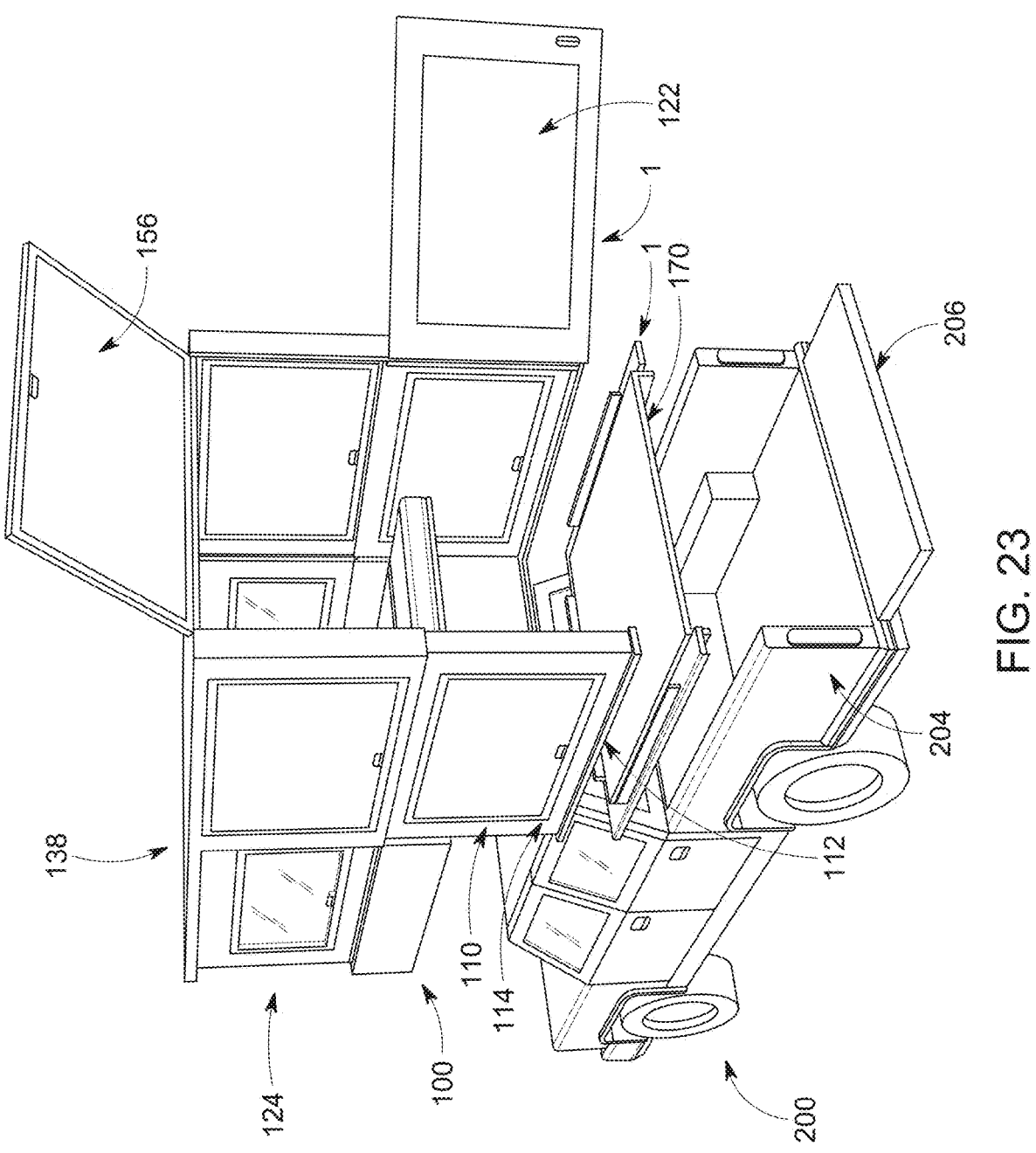
FIG. 23 shows an exploded view of how the exemplary camper of FIG. 22 may be fixed to an exemplary truck.

FIG. 23 shows an exploded view of how floor attachment 170 may be used to connect bottom section 100 (e.g., to or through flange 112, walls 114, and/or other portions of bed portion 110) to bed 204 of exemplary truck 200.

Figure 24:
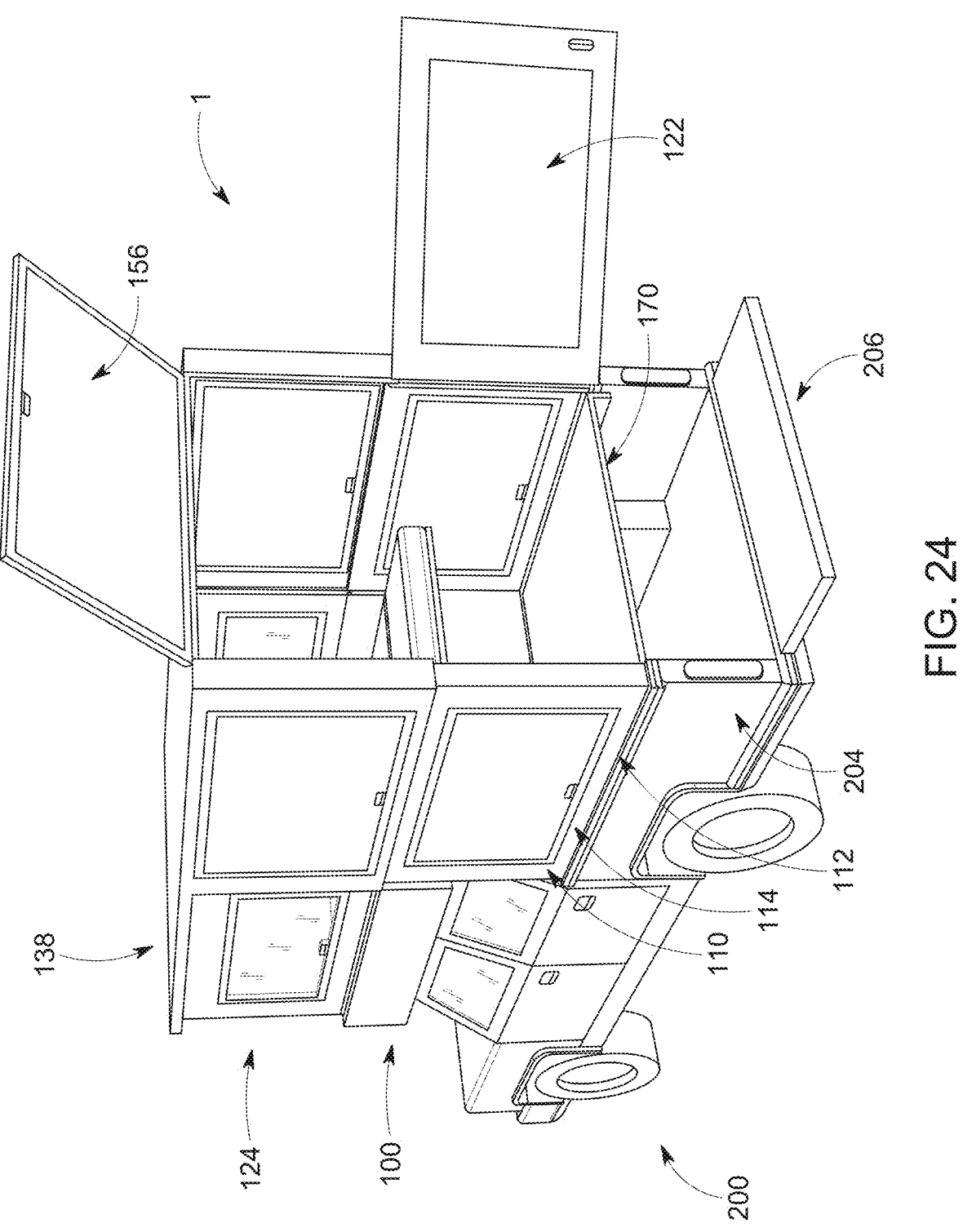
FIG. 24 shows a perspective view of the exemplary camper and truck of FIG. 23 fixed to each other.

FIG. 24 shows bed portion 110 of bottom section 100 of camper 1 connected by floor attachment 170 to bed 204 of exemplary truck 200. By configuring camper 1 to be longer and/or wider and/or by configuring certain components of camper 1 such as bottom section 100, middle section 124, top section 138, and/or floor attachment 170 to be longer and/or wider, camper 1 may be made to fit various categories of pickup trucks (e.g., compact, mid-size, or full-size trucks) and/or various nominal bed lengths of pickup trucks (e.g., 4 foot, 4.5 foot, 5 foot, 5.5 foot, 6 foot, 6.5 foot, 7 foot, or 8 foot beds) however, as mentioned, floor attachment 170 may further be configured to match each specific make, model, and year of pickup in the same category and nominal bed length. Floor attachment 170 may further serve as an elevated floor of camper 1, as mentioned and shown in FIGS. 22-24, by providing a level surface above pickup bed 204 of exemplary truck 200, as shown in FIG. 24. Camper 1 configured with floor attachment 170 may separate the living area of camper 1 from the cargo area of bed 204 of exemplary truck 200. With camper 1 configured with short door 122 and floor attachment 170 all, or the majority, of its components may sit above bed 204 of exemplary truck 200, in such a way that camper 1 may not affect the normal function of bed 204 (e.g., to carry cargo), except that it may not be able to carry cargo that is taller than the available height of bed 204 with floor attachment 170 of camper 1 above it.

Camper 1 configured with floor attachment 170 may also have a shorter interior height in its bed portion however, it may still be tall enough for a person to sleep, sit, and/or stand in the bed portion of camper 1 and the interior height of the cab-over portion would not be affected by floor 170. Since the living area of camper 1 may be fully separated from the cargo area of bed 204 of exemplary truck 200, camper 1 may be better sealed from the elements and insects (e.g., by being fully enclosed) since many pickup beds are often not completely sealed or well-sealed. Access to the rear of camper 1 configured with short door 122 and floor attachment 170, may be through opening 156, door 122, and by lowering or opening tailgate 206 so that it may be used as a step, if desired, as shown in FIG. 24. However, opening tailgate 206 of exemplary truck 200 and/or using any other part of bed 204 to access camper 1 configured with short door 122 and floor attachment 170 may not be necessary since camper 1, in this configuration, is fully enclosed and self-contained with an interior that is separated from exemplary truck 200.

Typical slide-in or demountable truck campers, particularly for the same category of truck (e.g., compact, mid-size, or full-size), often: 1) have bottom portions that are narrower than most pickup truck rear wheel wells; 2) have bottom portions that are designed to be taller than most pickup truck bedsides; 3) have upper portions that are designed to be wider than most pickup truck bedsides; and 4) are often fully enclosed. This allows the same slide-in or demountable truck camper to be used with various makes, models, years, and even bed lengths of trucks because the camper does not need to precisely fit each pickup truck bed and instead the bottom portion may slide between most pickup truck rear wheel wells, while the top portion slides over most pickup truck bedsides, and, because the campers are self-contained, they may extend beyond most pickup truck tailgates and or beyond the beds of most truck beds, if they do not have tailgates, or they may not take up the full length or width of pickup truck beds. Typical slide-in or demountable truck campers may be demounted and used without the truck because they're fully enclosed.

Figure 25:
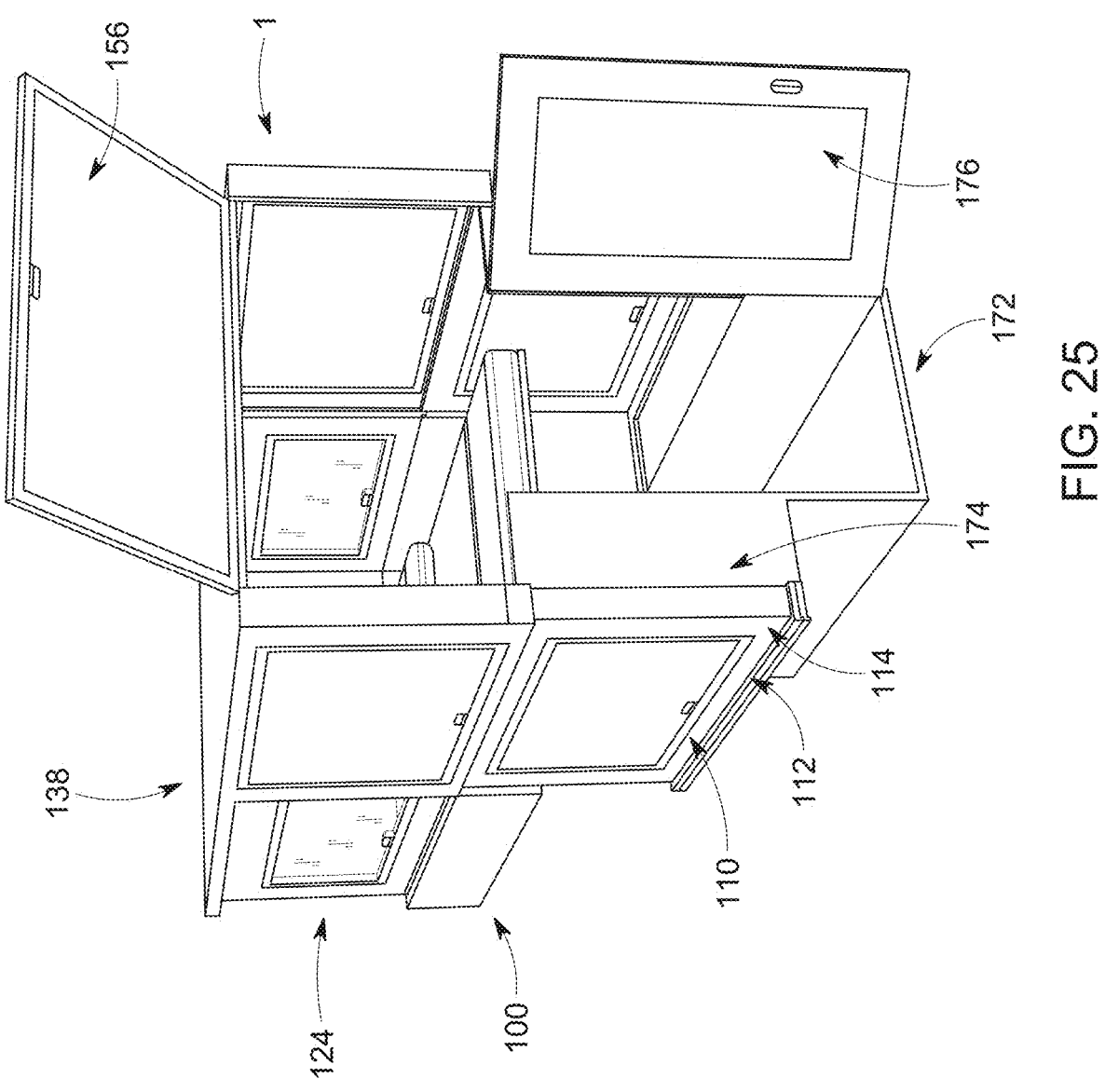
FIG. 25 shows a perspective view of the exemplary camper of FIG. 17 configured without a short rear door and configured to be used with an exemplary slide-in attachment.
Figure 26:
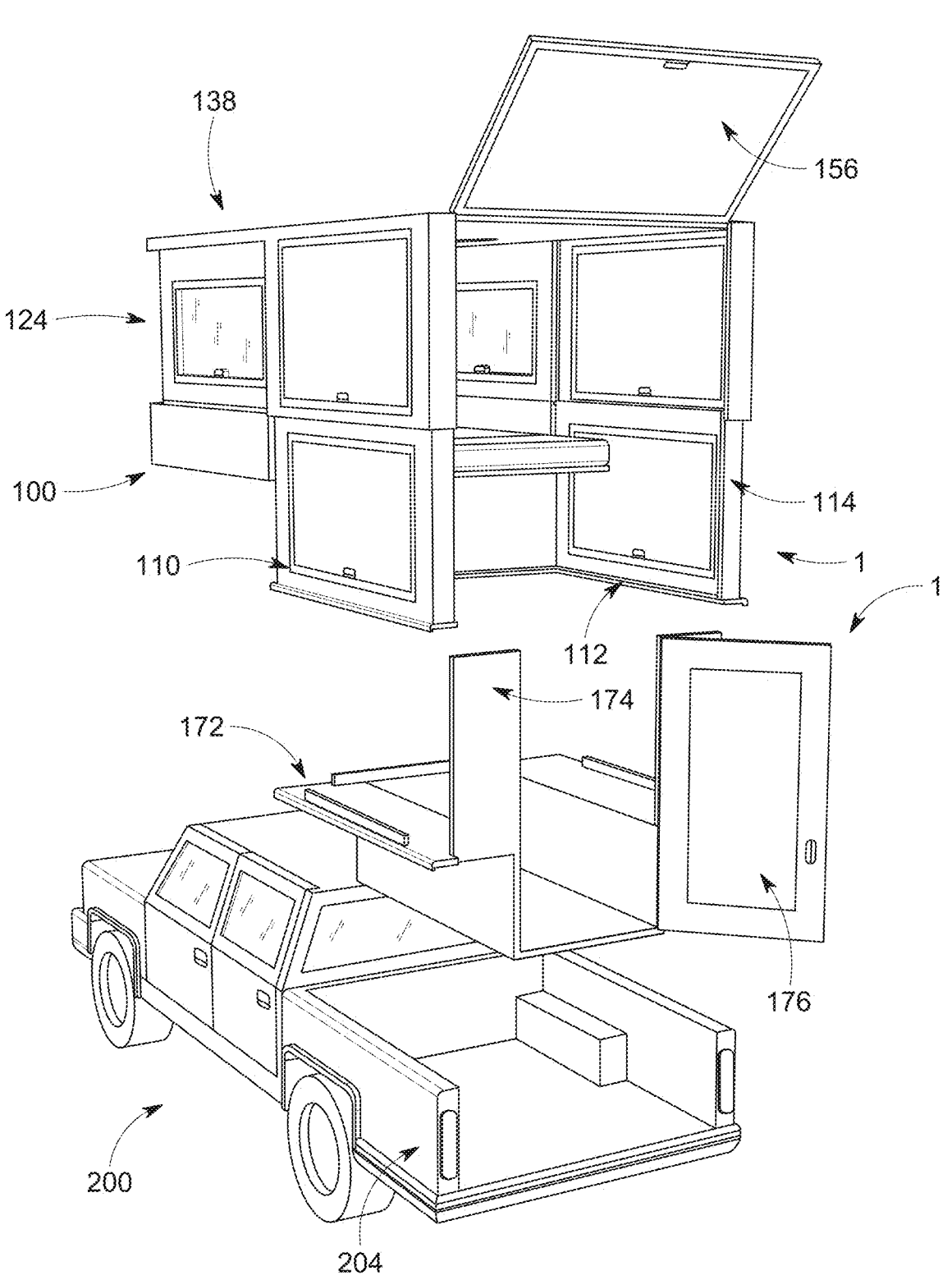
FIG. 26 shows an exploded view of how the exemplary camper of FIG. 25 may be fixed to an exemplary truck.
Figure 27:
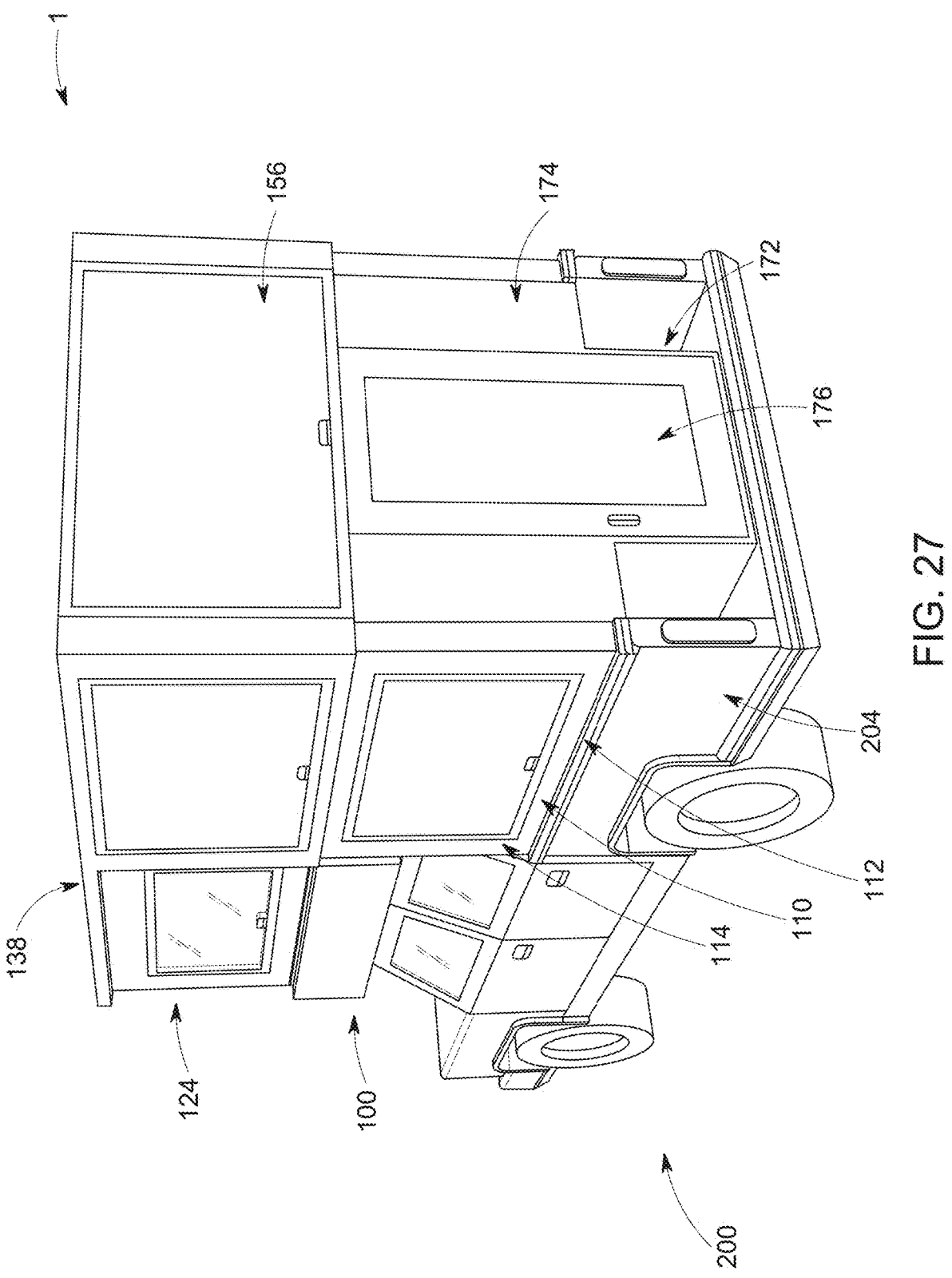
FIG. 27 shows a perspective view of the exemplary camper and truck of FIG. 26 fixed to each other, with all doors closed.
Figure 28:
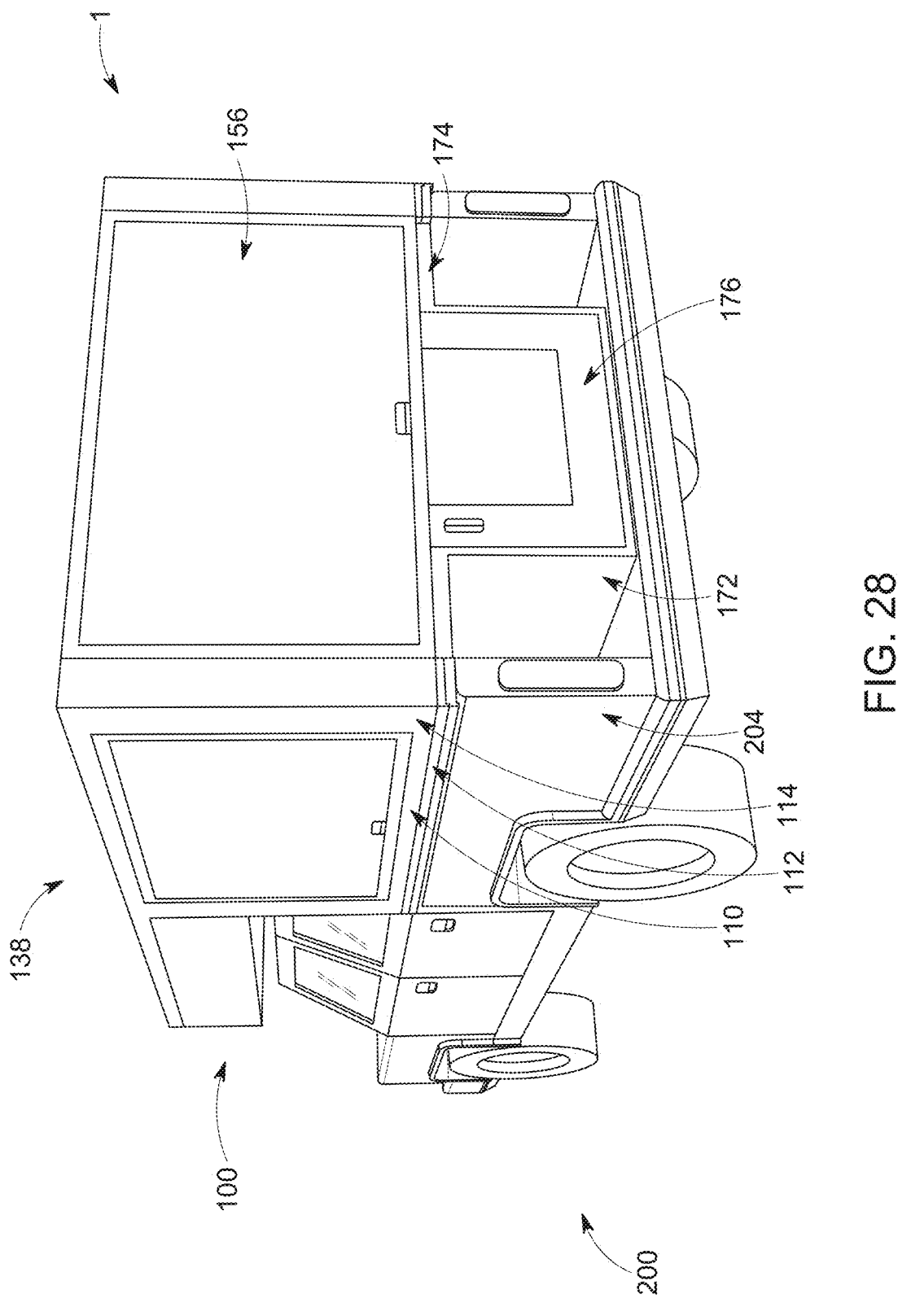
FIG. 28 shows a perspective view of the exemplary camper and truck of FIG. 27, with the camper being in a collapsed configuration.

Camper 1 may be configured with bottom section 100 having no rear door, and with attachment 172 which may be a slide-in attachment, with rear walls 174 and door 176, as shown in FIG. 25, which may allow camper 1 to be installed and used as a slide-in or demountable truck camper (i.e., a camper that may slide into or onto the bed of a pickup truck without being configured to precisely fit the bed or fit onto the bed, and may also be used without, or independently of, the truck), as shown in FIGS. 26-28 on or in exemplary truck 200. Slide-in attachment 172 of camper 1, like attachments 168 and 170 mentioned above, may contain features on or through its upper surface, side, or portion (e.g., a portion of slide-in attachment 172 that may attach to bed portion 110 of bottom section 100) such as raised edges, protrusions, studs, flanges, brackets, supports, holes, hooks, sliders, and/or other features, and/or portions of other features that may correspond to, fit into, and/or attach to recesses, slots, notches, flanges, brackets, supports, holes, hooks, tracks, rails, and/or other features, and/or portions of other features that may exist on flange 112, walls 114, and/or other portions of bed portion 110 of bottom section 100 that may allow bed portion 110 of bottom section 100 to be fastened securely (e.g., by nuts, bolts, threaded inserts, clamps, adhesive, buckles, straps, other fasteners, and/or other fastening mechanisms) to slide-in attachment 172, as shown in FIG. 25; and slide-in attachment 172 may contain features on or through its lower surface, side, or portion (e.g. a portion of slide-in attachment 172 that may be placed in or on a bed of a pickup truck) such as dropped edges, protrusions, studs, flanges, brackets, supports, holes, hooks, sliders, rails, tracks, tie-downs, and/or other features, and/or portions of other features that may securely attach (e.g., by nuts, bolts, buckles, clamps, straps, other fasteners, and/or other fastening mechanisms) to features in or on a pickup truck bed or elsewhere in or on a pickup truck such as bed tie-downs, frame tie-downs, bed rails, slide-in camper brackets, and or other tie-downs and/or brackets.

Slide-in attachment 172 may be configured to have an upper surface, side, or portion that attaches to some portion of bed portion 110 in bottom section 100 and may be configured to have a lower surface, side, or portion that is generally narrow enough to fit between most pickup truck rear wheel wells (or fit in the narrowest part of a pickup truck bed) and may taller than most pickup truck bedsides such that camper 1, configured with slide-in attachment 172, may slide into or be placed in or on a pickup truck bed without being obstructed by rear wheel wells and/or pickup truck bedsides (particularly if configured for pickup trucks in the same category: compact, mid-size, and full-size). FIG. 26 shows an exploded view of how camper 1 configured with slide-in attachment 172 may fit in or on bed 204 of exemplary truck 200.

FIG. 27 shows camper 1 with slide-in attachment 172 in or on bed 204 of exemplary truck 200 and, as shown, a gap may exist between the exterior sides of slide-in attachment 172 and the wider parts of bed 204 (since slide-in attachment 172 is configured to slide between the wheels wells of exemplary truck 200 and/or the narrowest part of its bed, bed 204). Because slide-in attachment 172 with walls 174 and door 176 fully encloses camper 1, it may be used as a camper in bed 204 of exemplary truck 200 or it may be demounted and used off or independently of truck 200. As with typical slide-in campers, camper 1 (i.e., configured with slide-in attachment 172), may be used with jacks or stands to raise camper 1 for placement in or removal from a pickup truck bed, and/or for use or storage independently of a pickup truck. Jack stands may be a component attached to slide-in attachment 172 (e.g., on or near 4 exterior corners) or may be separate components attachable to (e.g., 4 exterior corners or near 4 exterior corners of) slide-in attachment 172, bottom section 100, and/or another portion of camper 1. When all rear doors and/or openings of camper 1 are closed, as shown in FIG. 27, opening 156 of top section 138 overlaps walls 174 and door 176 of slide-in attachment 172, creating a weather tight joint. Access to camper 1 configured with slide-in attachment 172, whether it is on or off a truck, may be through opening 156 in top section 138 by opening it first, then opening door 176 in slide-in attachment 172, as shown in FIGS. 25 and 26.

FIG. 28 shows camper 1 configured with slide-in attachment 172 in a closed or collapsed configuration, with top section 138 substantially overlapping walls 174 and door 176 of slide-in attachment 172, creating a weather tight joint. Whether stored on or in exemplary truck 200, as shown in FIG. 28, or demounted from and stored independently of truck 200, camper 1 with slide-in attachment 172 may continue to remain fully enclosed in a collapsed position.

Some trucks may be configured to have a flatbed, also called a tray (e.g., in place of a pickup bed) and some truck campers may be mountable to the flatbed or tray, which is often flat and does not have sidewalls or has very short sidewalls. This may allow the camper to be demounted, as with slide-in truck campers, so that the flatbed or tray of the truck may be used to haul cargo. In some cases, the flatbed or tray may have drawers or other storage below the upper flat surface. Truck campers designed to be used with flatbed trucks are often flat on the bottom so that they can be mounted and/or secured to the tray.

Figure 29:
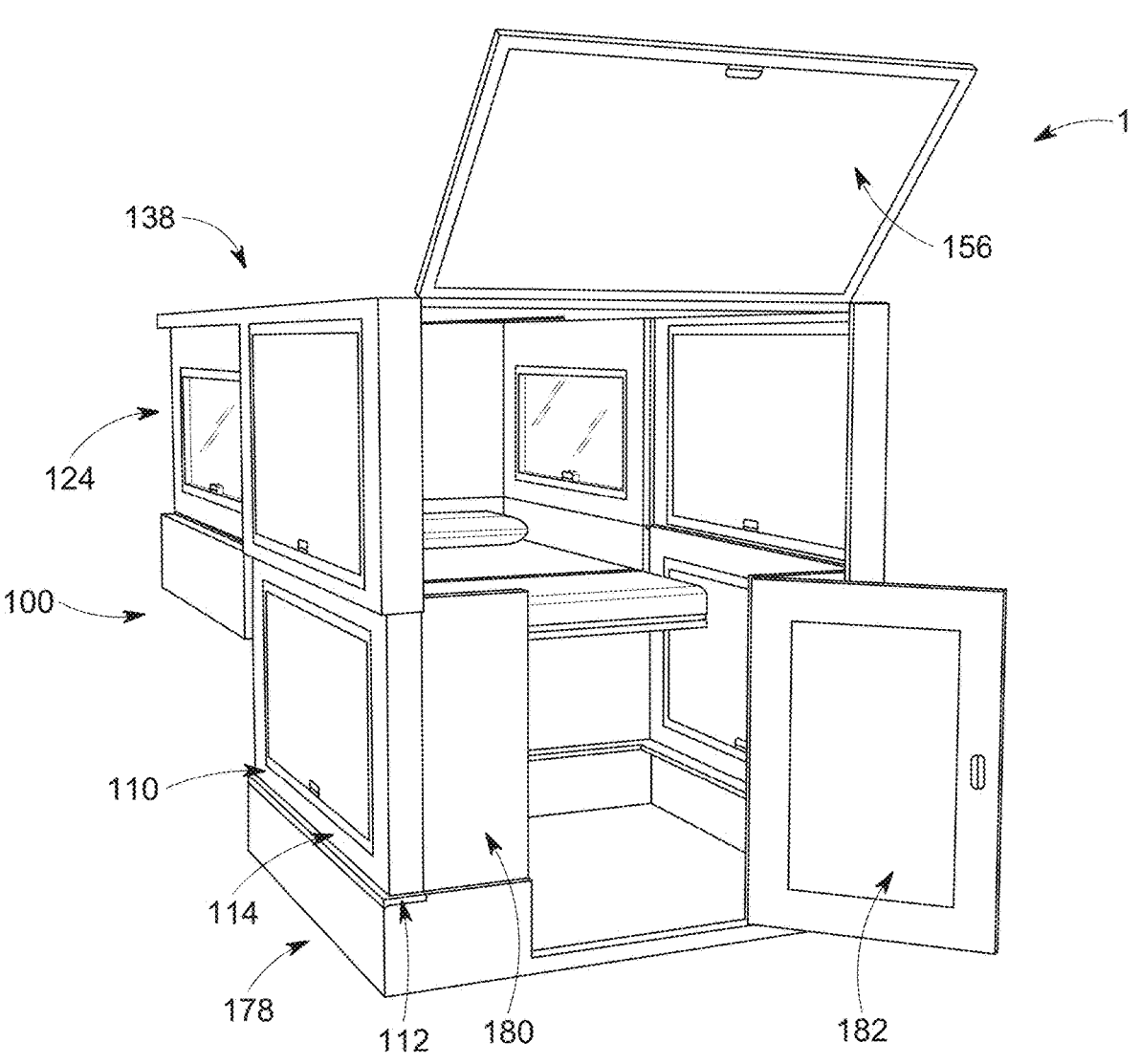
FIG. 29 shows a perspective view of the exemplary camper of FIG. 17 configured without a short rear door and configured to be used with an exemplary flatbed attachment.
Figure 30:
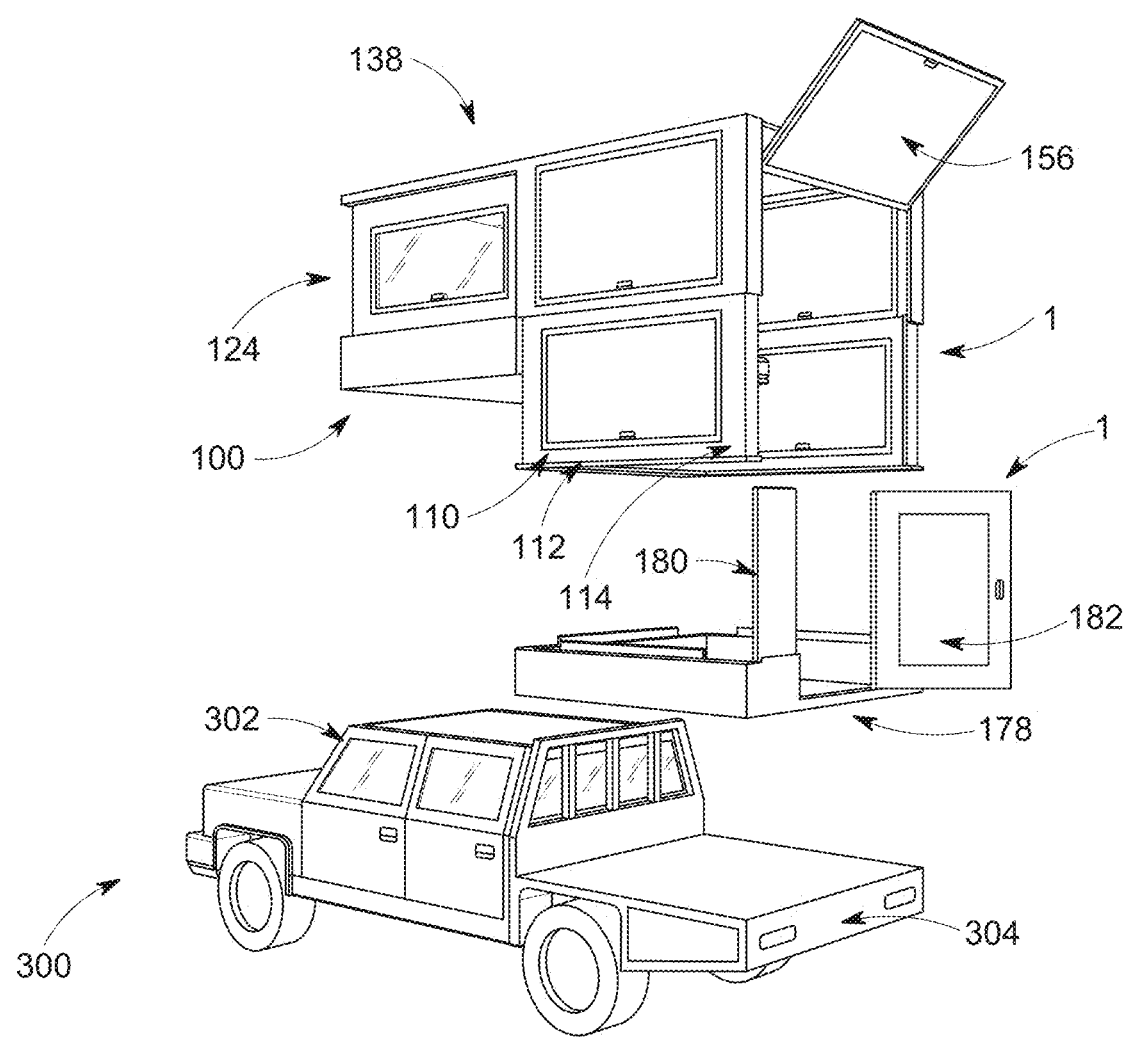
FIG. 30 shows an exploded view of how the exemplary camper of FIG. 29 may be fixed to an exemplary flatbed truck.
Figure 31:
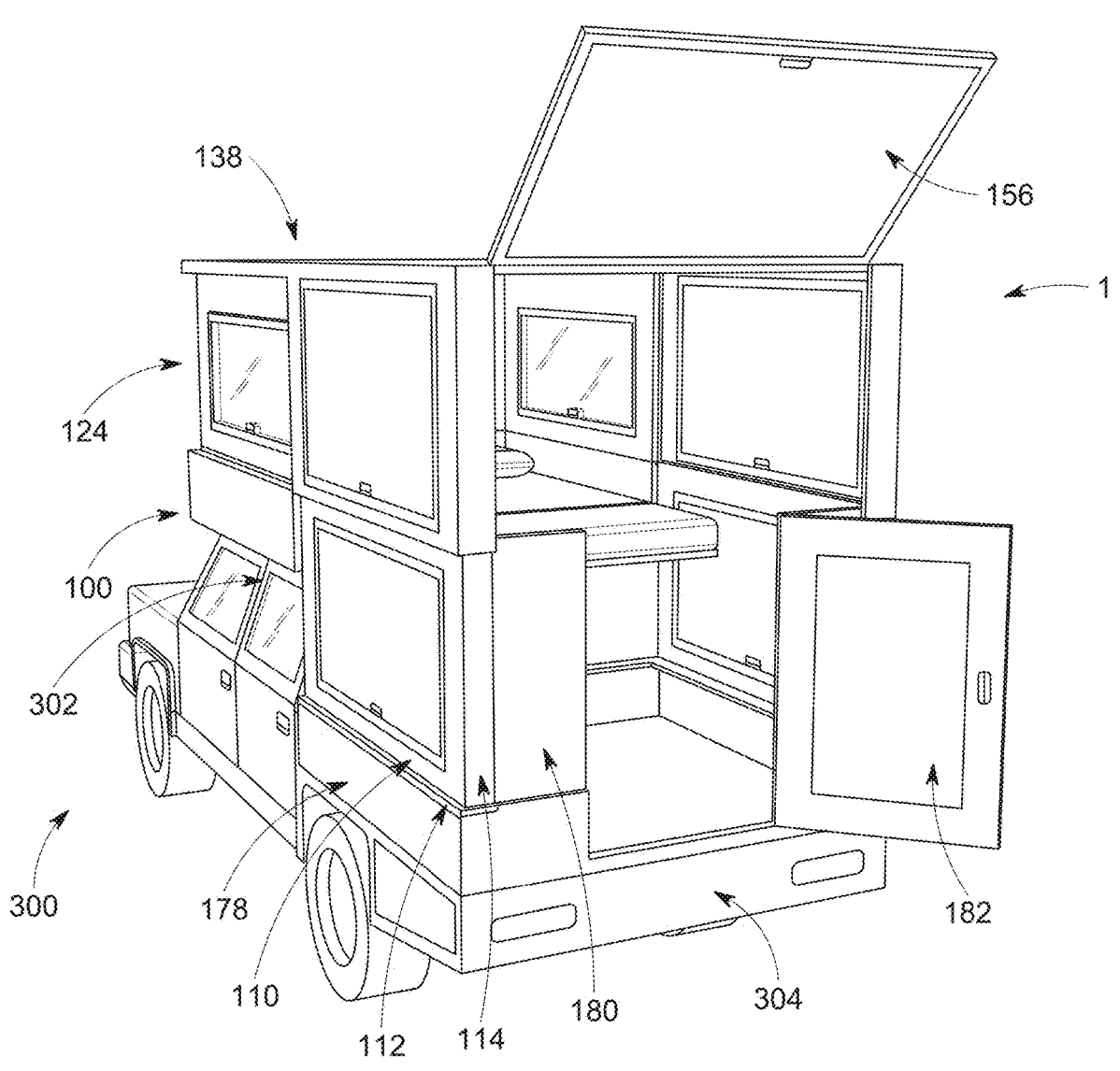
FIG. 31 shows the exemplary camper and truck of FIG. 30 fixed to each other.
Figure 32:
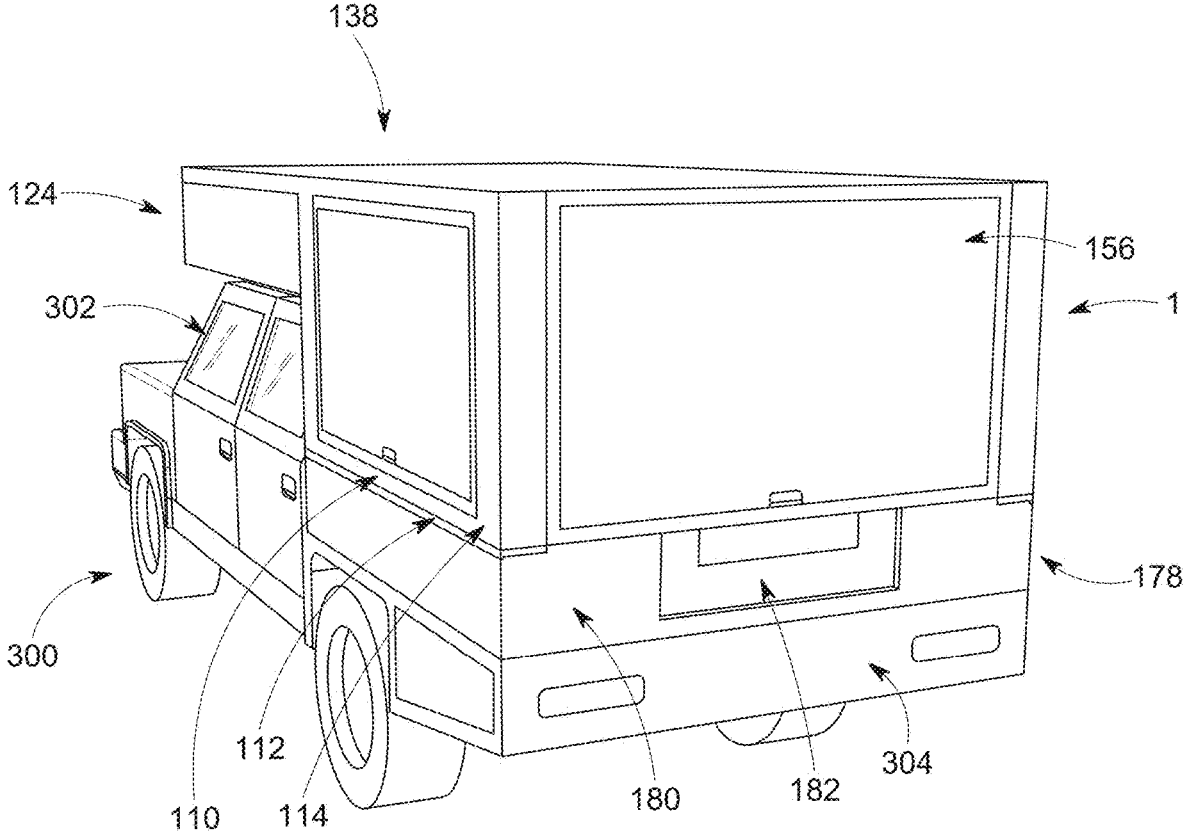
FIG. 32 shows the exemplary camper and truck of FIG. 31, with the camper being in a collapsed configuration and all doors closed.

Camper 1 may be configured with bottom section 100 having no rear door, and with attachment 178, which may be a flatbed attachment with rear walls 180 and door 182, as shown in FIG. 29, which may allow camper 1 to be installed and used as a flatbed camper (i.e., a camper that may be mounted to the flatbed or tray of a flatbed truck), as shown in FIGS. 30-32 on exemplary truck 300, which may be composed of cab 302 and flatbed 304, which may be configured as a flatbed or tray. Flatbed attachment 178 of camper 1, like attachments 168, 170, and 172 mentioned above, may contain features on or through its upper surface, side, or portion (e.g., a portion of flatbed attachment 178 that may attach to bed portion 110 of bottom section 100) such as raised edges, protrusions, studs, flanges, brackets, supports, holes, hooks, sliders, and/or other features, and/or portions of other features that may correspond to, fit into, and/or attach to recesses, slots, notches, flanges, brackets, supports, holes, hooks, tracks, rails, and/or other features, and/or portions of other features that may exist on flange 112, walls 114, and/or other portions of bed portion 110 of bottom section 100 that may allow bed portion 110 of bottom section 100 to be fastened securely (e.g., by nuts, bolts, threaded inserts, clamps, adhesive, buckles, straps, other fasteners, and/or other fastening mechanisms) to flatbed attachment 178, as shown in FIG. 29; and flatbed attachment 178 may contain features on or through its lower surface, side, or portion (e.g. a portion of flatbed attachment 178 that may be placed on a tray or flat bed of a flatbed truck) such as flanges, brackets, supports, holes, hooks, sliders, rails, tracks, tie-downs, and/or other features, and/or portions of other features that may securely attach (e.g., by nuts, bolts, buckles, clamps, straps, other fasteners, and/or other fastening mechanisms) to features in or on a truck flatbed or tray or elsewhere in or on a flatbed truck such as bed tie-downs, frame tie-downs, other tie-downs, rails, brackets, and or other features.

Slide-in attachment 178 may be configured to have an upper surface, side, or portion that attaches to some portion of bed portion 110 in bottom section 100 and may be configured to have a lower surface, side, or portion that is generally flat on the bottom and has a roughly similar length and width as the tray of a flatbed truck such that camper 1, configured with flatbed attachment 178, may be placed on a truck with a flatbed or tray that can sufficiently support camper 1 (e.g., is sufficiently long and wide enough, even if not precisely the same length and width as the bottom of flatbed attachment 178).

FIG. 30 shows an exploded view of how camper 1 configured with flatbed attachment 178 may fit in or on flatbed 304 of exemplary truck 300.

FIG. 31 shows camper 1 with flatbed attachment 178 on and attached to flatbed 304 of exemplary truck 300. Because flatbed attachment 178 with walls 180 and door 182 fully encloses camper 1, it may be used as a camper on flatbed 304 of exemplary truck 300 or it may be demounted and used off or independently of truck 300. As with some existing flatbed campers, camper 1 (i.e., configured with flatbed attachment 178), may be used with jacks or stands to raise camper 1 for placement on or removal from a truck flatbed or tray, and/or for use or storage independently of a flatbed truck. Jack stands may be a component attached to flatbed attachment 178 (e.g., on or near 4 exterior corners) or may be separate components attachable to (e.g., 4 exterior corners or near 4 exterior corners of) flatbed attachment 178, bottom section 100, and/or another portion of camper 1. When all rear doors and/or openings of camper 1 are closed, opening 156 of top section 138 may overlap walls 180 and door 182 of flatbed attachment 178, creating a weather tight joint. Access to camper 1 configured with flatbed attachment 178, whether it is on or off a truck, may be through opening 156 in top section 138 by opening it first, then opening door 182 in flatbed attachment 178, as shown in FIGS. 29-31.

FIG. 32 shows camper 1 configured with flatbed attachment 178 in a closed or collapsed configuration, with top section 138 substantially overlapping walls 180 and door 182 of slide-in attachment 178, creating a weather tight joint. Whether stored on exemplary truck 300, as shown in FIG. 32, or demounted from and stored independently of truck 300, camper 1 with flatbed attachment 178 may continue to remain fully enclosed in a collapsed position.

A truck may be configured as a chassis-cab truck that has no bed (e.g., no pickup bed or flatbed). It may be composed of just a cab and a bare frame or chassis toward the rear, behind the cab. This is a common configuration for many commercial trucks or reconverted pickup trucks (e.g., by removal of the pickup beds) that may then be fitted with aftermarket bodies to the rear of their frames, behind the cab, to convert the trucks to various types for various uses such as: box trucks and flatbed trucks for cargo hauling; buses for transporting people; commercial trucks for service, utility, construction, or a wide range of other commercial purposes; or full-time campers, among other types and uses.

A fully enclosed or fully boxed (e.g., self-contained and enclosed, except for a possible pass-through to the cab of the truck) camper mounted directly to the frame of a chassis-cab truck may not be as dependent on the length, width, and/or other features of the truck body which may be the case for campers configured for use with pickup trucks and/or flatbed trucks. Campers designed to be mounted directly to the frame of a chassis-cab truck may be as long and as wide as the truck may support. The camper may also have a sturdier frame (particularly at the bottom) than campers designed to be supported by a pickup bed or flatbed while in transit or use. Often the camper portion of a chassis-cab truck camper may comprise the entire rear end of the truck and, therefore, may contain other features that may be required for the truck to be street legal such as lights, bumpers, and/or other legally required features.

Figure 33:
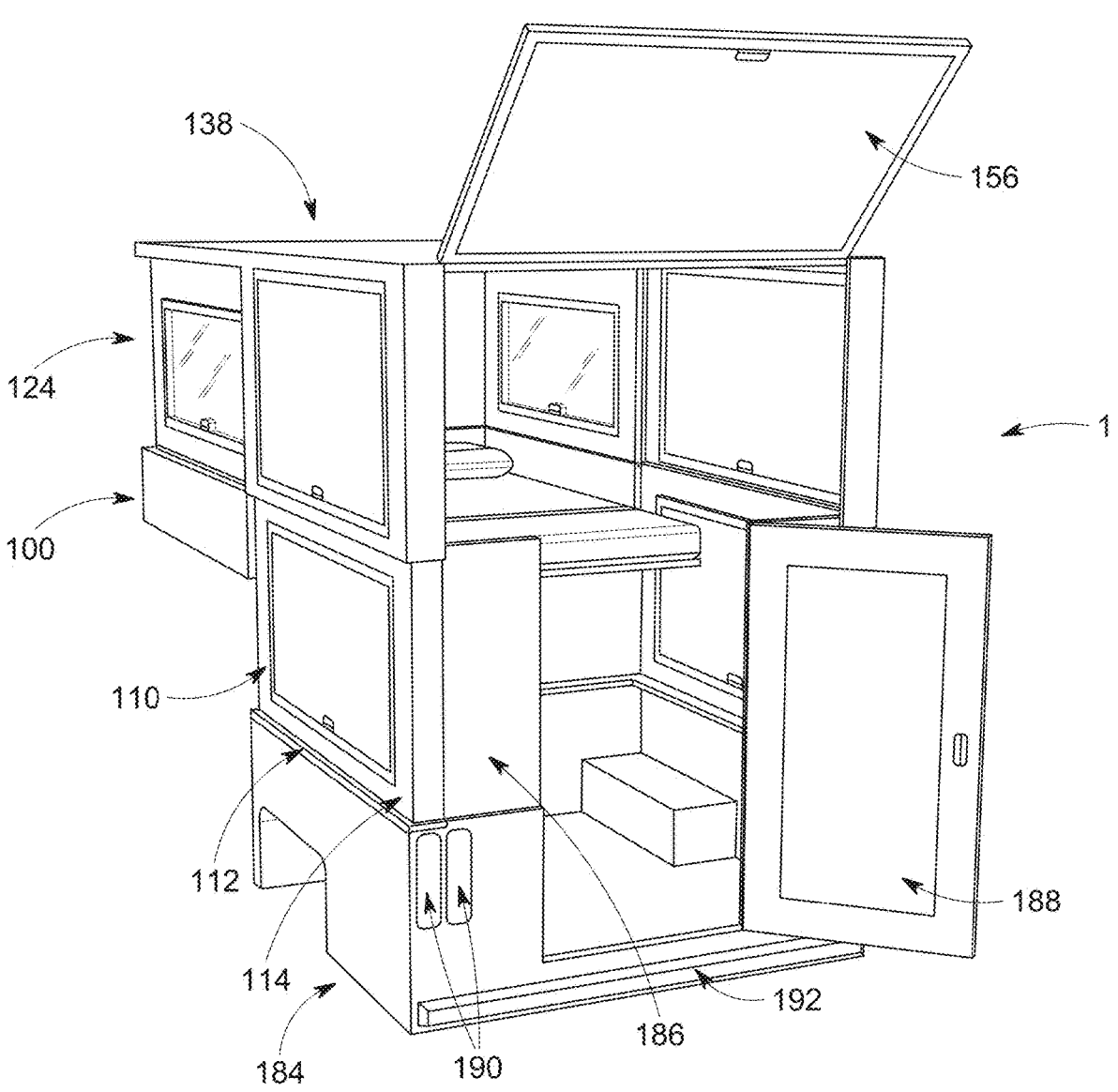
FIG. 33 shows a perspective view of the exemplary camper of FIG. 17 configured without a short rear door and configured to be used with an exemplary chassis attachment.

Camper 1 may be configured with bottom section 100 having no rear door, and with attachment 184, which may be a chassis attachment with rear walls 186, door 188, lights 190, and bumper 192, as shown in FIG. 33, which may allow camper 1 to be installed directly on or to the frame of a chassis-cab truck (e.g., behind the cab), thereby converting, often permanently, the truck to a chassis-cab truck camper (i.e., a truck with a camper box mounted directly to its frame).

Figure 34:
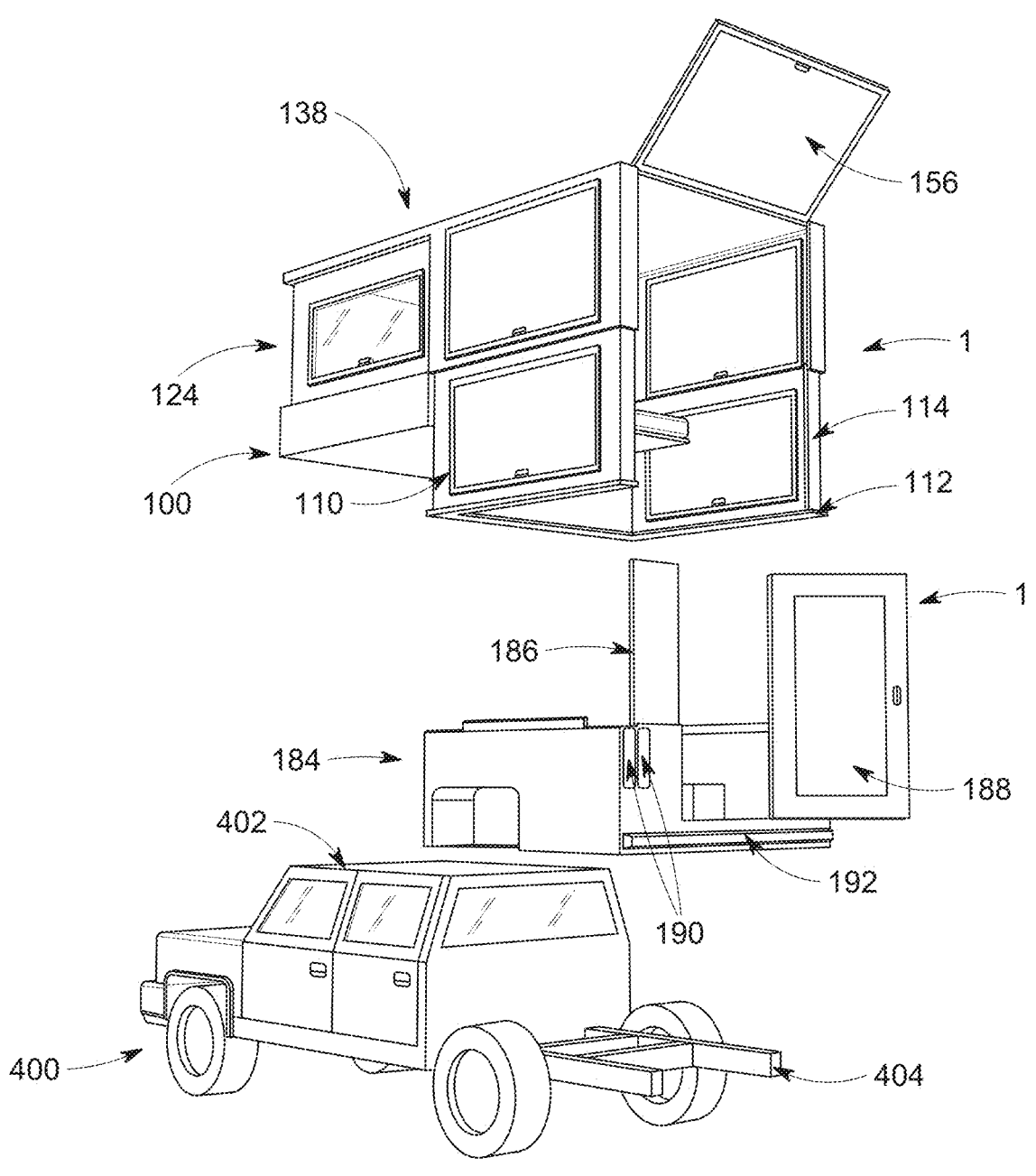
FIG. 34 shows an exploded view of how the exemplary camper of FIG. 33 may be fixed on an exemplary chassis-cab truck.
Figure 35:
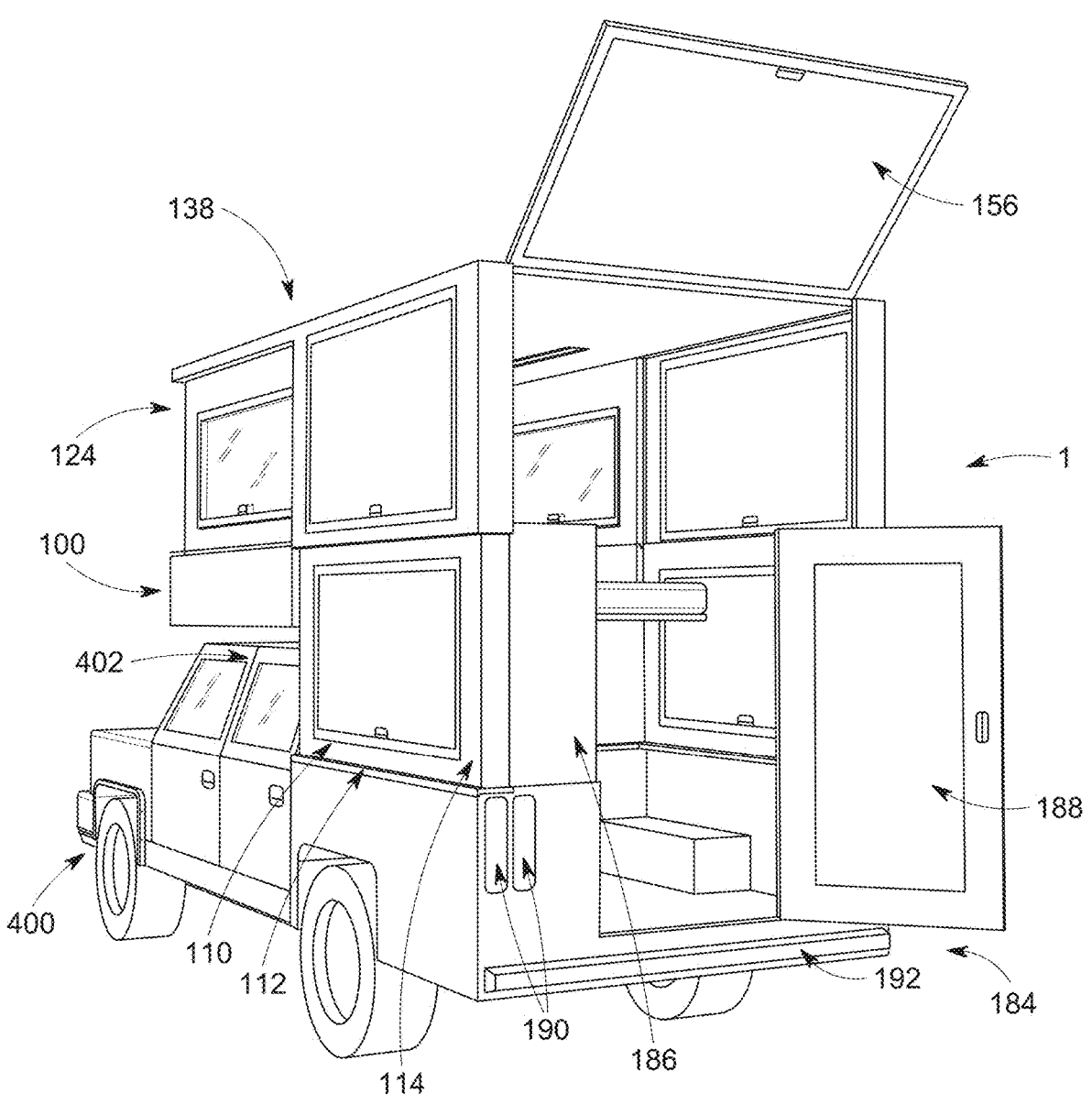
FIG. 35 shows the exemplary camper and truck of FIG. 34 fixed to each other.
Figure 36:
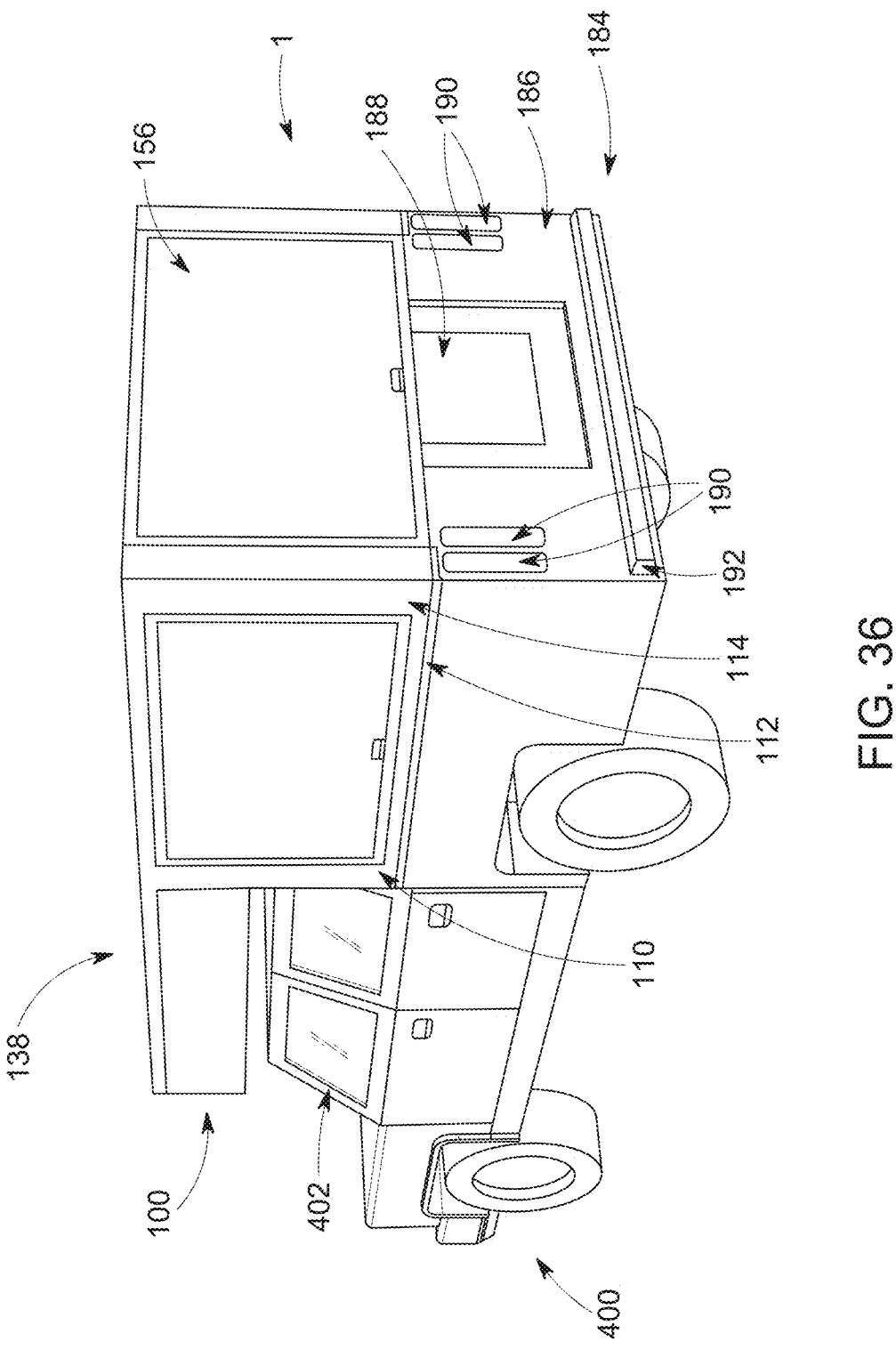
FIG. 36 shows the exemplary camper and truck of FIG. 35 with the camper being in a collapsed configuration and all doors closed.

Camper 1 with attachment 184 is shown in FIGS. 34-36 on exemplary truck 400, which may be composed of cab 402 and frame 404, which may be configured as a bare portion of the truck frame or chassis behind cab 402. Chassis attachment 184 of camper 1, like attachments 168, 170, 172, and 178 mentioned above, may contain features on or through its upper surface, side, or portion (e.g., a portion of chassis attachment 184 that may attach to bed portion 110 of bottom section 100) such as raised edges, protrusions, studs, flanges, brackets, supports, holes, hooks, sliders, and/or other features, and/or portions of other features that may correspond to, fit into, and/or attach to recesses, slots, notches, flanges, brackets, supports, holes, hooks, tracks, rails, and/or other features, and/or portions of other features that may exist on flange 112, walls 114, and/or other portions of bed portion 110 of bottom section 100 that may allow bed portion 110 of bottom section 100 to be fastened securely (e.g., by nuts, bolts, threaded inserts, clamps, adhesive, buckles, straps, other fasteners, and/or other fastening mechanisms) to chassis attachment 184, as shown in FIG. 33; and chassis attachment 184 may contain features on or through its lower surface, side, or portion (e.g. a portion of chassis attachment 184 that may be installed directly to the frame of a chassis-cab truck) such as a frame or components of a frame, flanges, brackets, supports, holes, suspension components, and/or other features, and/or portions of other features that may permanently or semi-permanently attach (e.g., by nuts, bolts, adhesive, welding, other fasteners, and/or other fastening mechanisms or methods) camper 1 directly to the frame of a chassis-cab truck behind its cab.

Chassis attachment 184 may be configured to have: an upper surface, side, or portion that attaches to some portion of bed portion 110 in bottom section 100; a lower surface, side, or portion that is attachable (e.g., permanently or semi-permanently) to a chassis-cab truck frame and may have wheel wells to go over a truck's rear tires; and a rear surface, side, or portion that may have features required to make the chassis-cab truck camper street legal such as lights (e.g., brake and reverse lights), a rear bumper, and/or other legally required features; and/or desired features.

FIG. 34 shows an exploded view of how camper 1 configured with chassis attachment 184 may be installed on frame 404 of exemplary truck 400 and FIG. 35 shows camper 1 with chassis attachment 184 installed on frame 404 of exemplary truck 400. When all rear doors and/or openings of camper 1 are closed, opening 156 of top section 138 may overlap walls 186 and door 188 of chassis attachment 184, creating a weather tight joint. Access to camper 1 configured with chassis attachment 184 may be through opening 156 in top section 138 by opening it first, then opening door 188 in chassis attachment 184, as shown in FIGS. 33-35. FIG. 36 shows camper 1 configured with chassis attachment 184 in a closed or collapsed configuration, with top section 138 substantially overlapping walls 186 and door 188 of chassis attachment 184, creating a weather tight joint.

What is claimed is:

1. A truck camper comprising:
a top section;
a bottom section comprising a cab-over portion over a cab of a truck, the bottom section being configured to be vertically retracted into or extended from the top section and configured to be attached to a bed or frame of the truck; and
a middle section configured to be horizontally retracted into or extended from the top section,
wherein in a fully expanded configuration, the bottom section is extended from the top section, and the middle section is extended from the top section; and
wherein in a fully collapsed configuration, the bottom section is retracted into the top section, and the middle section is retracted into the top section.

2. The truck camper of claim 1, wherein the top section comprises two side walls, a rear wall, and a roof that provides a ceiling over the truck camper.

3. The truck camper of claim 2, wherein at least one of the side walls and the rear wall comprises an opening.

4. The truck camper of claim 1, wherein the middle section comprises two sidewalls and a front wall.

5. The truck camper of claim 4, wherein at least one of the side walls and the front wall comprises an opening.

6. The truck camper of claim 1, wherein the bottom section further comprises a bed portion attached to the bed or frame of the truck.

7. The truck camper of claim 6, wherein the top section comprises two side walls, a rear wall, and a roof that provides a ceiling over the top section and the cab-over portion.

8. The truck camper of claim 6, wherein the cab-over portion comprises two side walls and a front wall.

9. The truck camper of claim 6, wherein the bed portion comprises two side walls, a front wall, and a rear wall.

10. The truck camper of claim 6, wherein in the fully expanded configuration, two sidewalls, a front wall, and a rear wall of the bed portion; two side walls, a rear wall, and a roof of the top section; two side walls and a front wall of the cab-over portion; and a rear door of the truck form an enclosure.

11. The truck camper of claim 6, wherein in the fully collapsed configuration, two sidewalls, a front wall, and a rear wall of the bed portion; a roof of the top section; two side walls and a front wall of the cab-over portion; and a rear door of the truck form an enclosure.

12. The truck camper of claim 6, wherein the top section comprises two side walls and a rear wall.

13. The truck camper of claim 6, wherein a part of the roof is positioned over the cab-over portion.

14. The truck camper of claim 6, wherein the middle section is configured to be horizontally retracted into or extended from the top section via a track system of the roof.

15. The truck camper of claim 6, wherein the middle section is configured to be horizontally retracted into or extended from the top section via two short tracks and two long tracks of the roof.

16. The truck camper of claim 6 further comprising an attachment configured to fit between the bed portion and the truck.

17. The truck camper of claim 16 wherein the attachment comprises a door or a wall configured to form an enclosure with the bottom section, the top section, and the middle section in the fully expanded configuration.

18. The truck camper of claim 16 wherein the attachment comprises a door or a wall configured to form an enclosure with the bottom section, and the top section in the fully collapsed configuration.

19. A truck comprising the truck camper of claim 1.

* * * * *